(12) United States Patent
Durkin et al.

(10) Patent No.: US 12,460,371 B2
(45) Date of Patent: Nov. 4, 2025

(54) ELECTRICALLY POWERED POWER MACHINE

(71) Applicant: Doosan Bobcat North America, Inc., West Fargo, ND (US)

(72) Inventors: Brent Durkin, Bismarck, ND (US); John Pfaff, Bismarck, ND (US); Dennis Agnew, Moffit, ND (US); Matthew Sagaser, Bismarck, ND (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 0 days.

(21) Appl. No.: 18/823,273

(22) Filed: Sep. 3, 2024

(65) Prior Publication Data
US 2024/0426075 A1    Dec. 26, 2024

Related U.S. Application Data

(63) Continuation of application No. 17/190,234, filed on Mar. 2, 2021, now Pat. No. 12,180,672.

(60) Provisional application No. 62/984,058, filed on Mar. 2, 2020.

(51) Int. Cl.
| | | |
|---|---|---|
| *E02F 9/20* | (2006.01) | |
| *E02F 3/34* | (2006.01) | |
| *E02F 3/42* | (2006.01) | |
| *B60K 1/04* | (2019.01) | |

(52) U.S. Cl.
CPC ............ *E02F 3/3414* (2013.01); *E02F 3/422* (2013.01); *E02F 9/207* (2013.01); *B60K 1/04* (2013.01)

(58) Field of Classification Search
CPC .......... E02F 3/3414; E02F 3/422; E02F 9/207
See application file for complete search history.

(56) References Cited

U.S. PATENT DOCUMENTS

| | | |
|---|---|---|
| 3,585,473 A | 6/1971 | Huxtable et al. |
| 5,509,491 A | 4/1996 | Hall |
| 5,647,721 A | 7/1997 | Rohrbaugh |
| 5,884,204 A | 3/1999 | Orbach et al. |
| 6,061,617 A | 5/2000 | Berger et al. |
| 6,078,855 A | 6/2000 | Kinugawa et al. |

(Continued)

FOREIGN PATENT DOCUMENTS

| | | |
|---|---|---|
| WO | 2011158618 A1 | 12/2011 |
| WO | 2013114451 A1 | 8/2013 |

(Continued)

OTHER PUBLICATIONS

International Searching Authority. International Search Report and Written Opinion for application PCT/US2021/020525. Mailed on Oct. 8, 2021. 25 pages.

(Continued)

*Primary Examiner* — Gerald McClain
(74) *Attorney, Agent, or Firm* — Quarles & Brady LLP

(57) ABSTRACT

A power machine can include a frame, a lift arm, and one or more electrical devices for control of one or more work elements. An electrical tilt actuator can be secured to the lift arm to change an attitude of an implement carrier, an electrical lift actuator can be secured to the frame to raise and lower a lift arm, an electrical drive motor can be mounted to a track frame to move a track, or a battery assembly and electrical control module can be secured to the frame, including rearward of an operator station.

16 Claims, 30 Drawing Sheets

(56) References Cited

U.S. PATENT DOCUMENTS

| | | | |
|---|---|---|---|
| 6,140,787 A | 10/2000 | Lokhorst et al. |
| 6,273,198 B1 | 8/2001 | Bauer et al. |
| 6,286,236 B1 | 9/2001 | Bowers |
| 6,832,659 B1 | 12/2004 | Bares et al. |
| 7,058,495 B2 | 6/2006 | Budde et al. |
| RE39,179 E | 7/2006 | Naunheimer et al. |
| 7,326,141 B2 | 2/2008 | Lyons et al. |
| 7,443,122 B2 | 10/2008 | Tate et al. |
| 7,493,205 B2 | 2/2009 | Du et al. |
| 7,511,449 B2 | 3/2009 | Speckhart et al. |
| 7,657,841 B2 | 2/2010 | Shibamori et al. |
| 7,658,250 B2 | 2/2010 | Betz et al. |
| 7,673,402 B2 | 3/2010 | Wakitani et al. |
| 7,779,616 B2 | 8/2010 | Sheidler et al. |
| 7,779,947 B2 | 8/2010 | Stratton |
| 7,900,722 B2 * | 3/2011 | Shimada ............... E02F 9/207 180/6.7 |
| 7,904,224 B2 | 3/2011 | Kanayama et al. |
| 7,950,481 B2 | 5/2011 | Betz et al. |
| 8,100,210 B2 | 1/2012 | Takeuchi et al. |
| 8,125,105 B2 | 2/2012 | Ishida et al. |
| 8,219,273 B2 | 7/2012 | Bissontz |
| 8,478,470 B1 | 7/2013 | Meads et al. |
| 8,485,286 B2 | 7/2013 | Thompson |
| 8,589,037 B2 | 11/2013 | Jensen |
| 8,606,442 B2 | 12/2013 | Kang et al. |
| 8,631,890 B2 | 1/2014 | Noguchi et al. |
| 8,672,069 B2 | 3/2014 | Cherney et al. |
| 8,727,055 B2 | 5/2014 | Matsumura et al. |
| 8,773,056 B2 | 7/2014 | Gerdes et al. |
| 8,798,875 B2 | 8/2014 | Yanagisawa et al. |
| 8,855,875 B2 | 10/2014 | Frank et al. |
| 8,909,434 B2 | 12/2014 | Anders et al. |
| 8,972,121 B2 | 3/2015 | Kurikuma et al. |
| 8,991,184 B2 | 3/2015 | Ooki et al. |
| 8,996,214 B2 | 3/2015 | Ishii |
| 9,016,052 B2 | 4/2015 | Cho |
| 9,057,173 B2 | 6/2015 | Hiroki et al. |
| 9,102,313 B2 | 8/2015 | Bissontz |
| 9,156,341 B2 | 10/2015 | Matsumura et al. |
| 9,163,376 B2 | 10/2015 | Nicholson |
| 9,181,682 B2 | 11/2015 | Anders et al. |
| 9,187,880 B2 | 11/2015 | Tsuruga et al. |
| 9,190,852 B2 | 11/2015 | Bienfang et al. |
| 9,228,322 B2 | 1/2016 | Keys et al. |
| 9,263,975 B2 | 2/2016 | Wang et al. |
| 9,290,908 B2 | 3/2016 | Hiroki et al. |
| 9,347,203 B2 | 5/2016 | Tsuruga et al. |
| 9,422,141 B2 | 8/2016 | Foley |
| 9,475,497 B2 | 10/2016 | Henson et al. |
| 9,562,592 B2 | 2/2017 | Rekow et al. |
| 9,562,603 B2 | 2/2017 | Ziskovsky et al. |
| 9,574,324 B2 | 2/2017 | Satake et al. |
| 9,604,669 B2 | 3/2017 | Sonnenburg et al. |
| 9,617,706 B2 | 4/2017 | Takemura et al. |
| 9,624,643 B2 | 4/2017 | Hendron et al. |
| 9,637,000 B2 | 5/2017 | Husson et al. |
| 9,637,006 B2 | 5/2017 | Lindsey et al. |
| 9,725,878 B2 | 8/2017 | Amano et al. |
| 9,729,008 B2 | 8/2017 | Votoupal et al. |
| 9,739,273 B2 | 8/2017 | Marquette et al. |
| 9,745,723 B2 | 8/2017 | Inoue et al. |
| 9,775,275 B2 | 10/2017 | Yi et al. |
| 9,828,741 B2 | 11/2017 | Shipman |
| 9,845,587 B2 | 12/2017 | Huissoon |
| 9,896,822 B2 | 2/2018 | Kohno et al. |
| 9,975,426 B2 | 5/2018 | McCann |
| 9,988,791 B2 | 6/2018 | Uji et al. |
| 10,054,119 B2 | 8/2018 | Sasaki |
| 10,066,358 B2 | 9/2018 | Ota et al. |
| 10,100,493 B2 | 10/2018 | Takeo |
| 10,112,600 B2 | 10/2018 | Merkle et al. |
| 10,132,055 B2 | 11/2018 | Sharkey |
| 10,132,259 B1 | 11/2018 | Watson et al. |
| 10,183,673 B2 | 1/2019 | Miller et al. |
| 10,188,039 B2 | 1/2019 | Engel |
| 10,228,046 B2 | 3/2019 | Parmar |
| 10,232,699 B2 | 3/2019 | Oyama et al. |
| 10,239,535 B2 | 3/2019 | Yoo |
| 10,246,853 B2 | 4/2019 | Huissoon |
| 10,253,479 B2 | 4/2019 | Kaneta et al. |
| 10,308,108 B2 | 6/2019 | Honda et al. |
| 10,355,554 B2 * | 7/2019 | Parmar ................ F16H 25/20 |
| 10,407,875 B2 | 9/2019 | Kawaguchi et al. |
| 10,435,863 B2 | 10/2019 | Ishihara et al. |
| 10,450,723 B2 | 10/2019 | Osaka et al. |
| 10,450,725 B2 | 10/2019 | Kobayashi et al. |
| 10,458,095 B2 | 10/2019 | Caillieret et al. |
| 10,472,805 B1 | 11/2019 | Kumeuchi et al. |
| 10,815,637 B2 | 10/2020 | Panni et al. |
| 2003/0197420 A1 | 10/2003 | Burton |
| 2004/0030919 A1 | 2/2004 | Moriya et al. |
| 2009/0020369 A1 | 1/2009 | Warachka |
| 2010/0025058 A1 | 2/2010 | Carter et al. |
| 2011/0179896 A1 | 7/2011 | Hiraku et al. |
| 2012/0207620 A1 | 8/2012 | Dalum et al. |
| 2013/0011233 A1 | 1/2013 | Watanabe et al. |
| 2013/0075171 A1 | 3/2013 | Noguchi et al. |
| 2013/0076128 A1 | 3/2013 | Nee |
| 2013/0078071 A1 | 3/2013 | Noguchi et al. |
| 2013/0243557 A1 | 9/2013 | Hiroki et al. |
| 2013/0283947 A1 | 10/2013 | Yamada et al. |
| 2014/0117934 A1 | 5/2014 | Kurikuma et al. |
| 2014/0271078 A1 * | 9/2014 | Koch ................. E02F 9/265 414/815 |
| 2014/0373534 A1 | 12/2014 | Jensen |
| 2015/0214864 A1 | 7/2015 | Sopko |
| 2016/0031323 A1 | 2/2016 | Gottemoller |
| 2016/0257215 A1 | 9/2016 | Merkle et al. |
| 2017/0089039 A1 | 3/2017 | Imai et al. |
| 2017/0100974 A1 | 4/2017 | Smith |
| 2017/0284062 A1 | 10/2017 | Osaka et al. |
| 2017/0291501 A1 | 10/2017 | Takahashi et al. |
| 2017/0292243 A1 | 10/2017 | Okada et al. |
| 2017/0314233 A1 | 11/2017 | Egawa et al. |
| 2017/0335541 A1 | 11/2017 | Caillieret et al. |
| 2017/0362797 A1 | 12/2017 | Nakagawa et al. |
| 2018/0062555 A1 | 3/2018 | Sagawa et al. |
| 2018/0072281 A1 | 3/2018 | Bruyere et al. |
| 2018/0118014 A1 | 5/2018 | Wantschik |
| 2018/0163364 A1 | 6/2018 | Huissoon |
| 2018/0172122 A1 * | 6/2018 | Parmar ................ E02F 9/2095 |
| 2018/0236878 A1 | 8/2018 | Munst et al. |
| 2018/0238016 A1 | 8/2018 | Seacat et al. |
| 2018/0239849 A1 | 8/2018 | Martinsson et al. |
| 2018/0282141 A1 | 10/2018 | Wadell |
| 2018/0305889 A1 * | 10/2018 | Schiwal ................. E02F 3/38 |
| 2018/0338414 A1 | 11/2018 | Manji et al. |
| 2018/0347154 A1 | 12/2018 | Martinsson et al. |
| 2018/0370773 A1 | 12/2018 | Biadun |
| 2019/0024342 A1 | 1/2019 | Yoshida et al. |
| 2019/0032306 A1 | 1/2019 | Jimbo et al. |
| 2019/0104685 A1 | 4/2019 | Engel |
| 2019/0106130 A1 | 4/2019 | Pocha et al. |
| 2019/0111773 A1 | 4/2019 | Nishikawa et al. |
| 2019/0115772 A1 | 4/2019 | Takeda et al. |
| 2019/0141887 A1 | 5/2019 | Matsuda et al. |
| 2019/0156595 A1 | 5/2019 | Manji et al. |
| 2019/0194910 A1 | 6/2019 | Takahashi et al. |
| 2019/0292747 A1 | 9/2019 | Takehara et al. |
| 2019/0292753 A1 | 9/2019 | Oka et al. |
| 2019/0293158 A1 | 9/2019 | Brown |
| 2019/0301144 A1 | 10/2019 | Kean et al. |
| 2019/0308511 A1 | 10/2019 | Bindl et al. |
| 2019/0319523 A1 | 10/2019 | Jin et al. |
| 2019/0330823 A1 | 10/2019 | Kean |
| 2019/0351910 A1 | 11/2019 | Kassen et al. |
| 2020/0122794 A1 * | 4/2020 | Hanson ............... B62D 55/15 |
| 2021/0123207 A1 | 4/2021 | Vandegrift et al. |

(56) References Cited

U.S. PATENT DOCUMENTS

FOREIGN PATENT DOCUMENTS

| WO | 2014098616 | A1 | 6/2014 |
| WO | 2017040643 | A1 | 3/2017 |
| WO | 2019192669 | A1 | 10/2019 |
| WO | 2021178441 | A2 | 9/2021 |

OTHER PUBLICATIONS

International Searching Authority, International Search Report and Written Opinion for related application PCT/US2022/042460. Mailed on Jan. 10, 2023 [16 pgs.].
China National Intellectual Property Administration, First Office Action for corresponding CN Application No. 202180018811.2 issued Mar. 26, 2025 [34 pgs.].

* cited by examiner

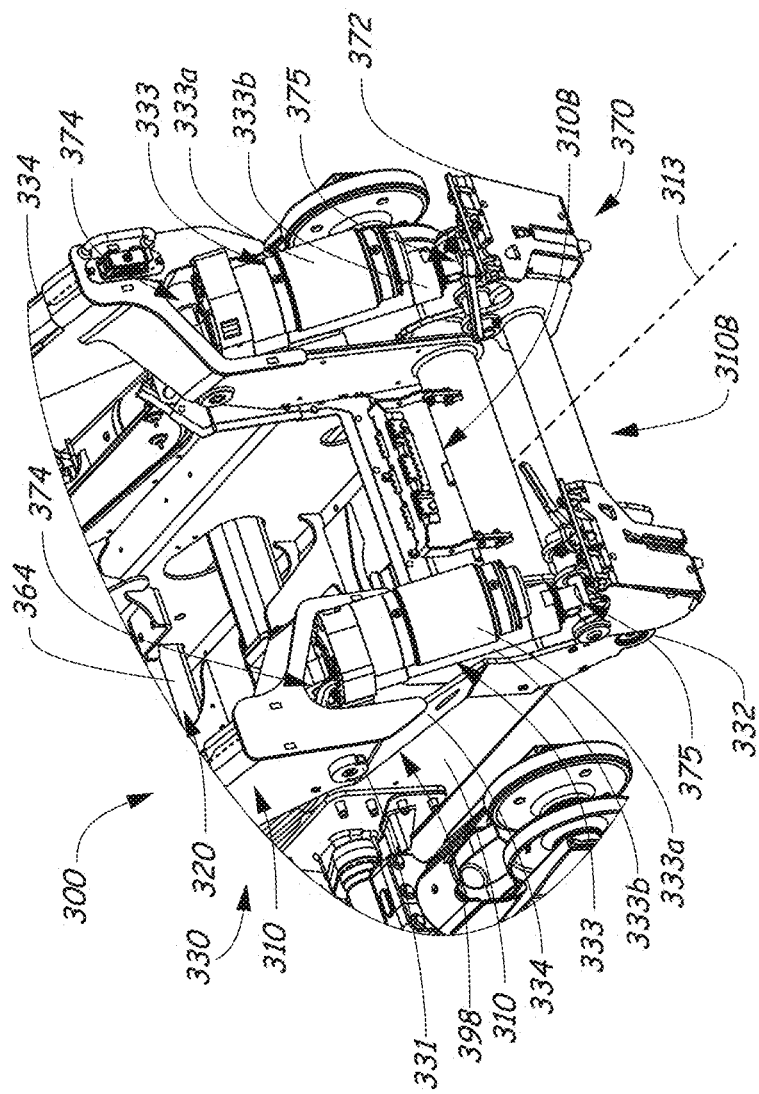

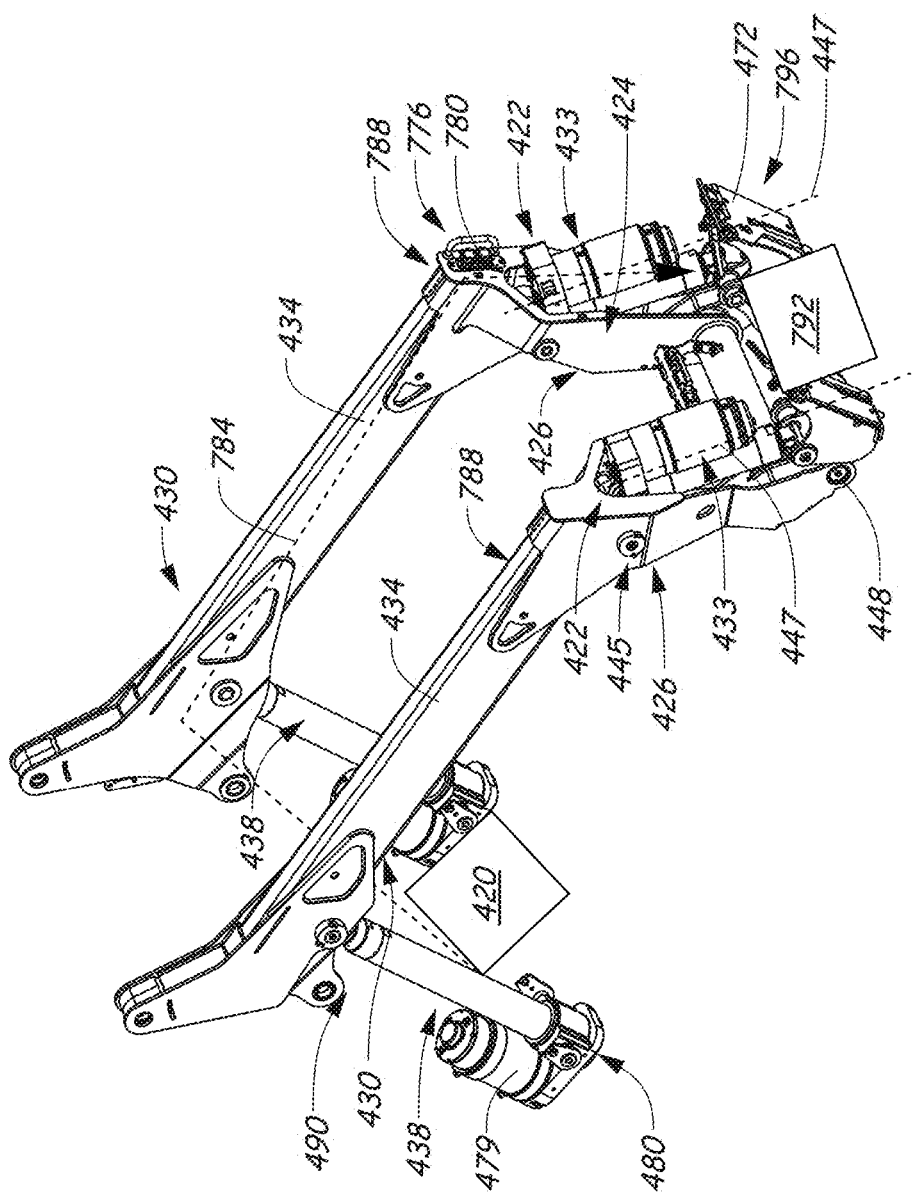

ELECTRICALLY POWERED POWER MACHINE

CROSS-REFERENCE TO RELATED APPLICATIONS

This application claims priority to U.S. non-provisional patent application Ser. No. 17/190,234, titled "Electrically Powered Power Machine" and filed Mar. 2, 2021, and to U.S. provisional patent application No. 62/984,058, titled "Electrically Powered Power Machine" and filed Mar. 2, 2020, the entireties of which are incorporated herein by reference.

BACKGROUND

This disclosure is directed toward power machines. More particularly, the present disclosure is directed to power machines that operate in whole or in part under electrical power. Power machines, for the purposes of this disclosure, include any type of machine that generates power for the purpose of accomplishing a particular task or a variety of tasks. One type of power machine is a work vehicle. Work vehicles, such as loaders, are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Conventional power machines can include hydraulic systems and related components that are configured to use output from a power source (e.g., an internal combustion engine) to perform different work functions. More specifically, hydraulic motors may be configured to power movement of a power machine, and hydraulic actuators (e.g., hydraulic cylinders) may be used to move a lift arm structure attached to the power machine, to tilt or otherwise move an implement connected to the lift arm structure, or execute other operations.

The discussion above is merely provided for general background information and is not intended to be used as an aid in determining the scope of the claimed subject matter.

SUMMARY

Some embodiments of the present disclosure provide a power machine for movably operating an implement. The power machine can include a main frame that supports an operator station and a lift arm structure. The lift arm structure can include a lift arm extending along a lateral side of the frame. A proximal end of the lift arm can be movably secured to the frame at a rear portion of the frame. A distal end of the lift arm can include a tilt actuator pocket having an open side of the tilt actuator pocket facing in a forward direction of the power machine with the lift arm in a fully lowered position. The power machine can further include an implement carrier movably secured to the distal end the lift arm, an electrical tilt actuator, and an electrical lift actuator. The electrical tilt actuator can be secured to the lift arm within the tilt actuator pocket and be configured to be controllably extended and retracted to change an attitude of the implement carrier. The electrical lift actuator can be secured at a first end to the rear portion of the frame and at a second end to the lift arm. Further, the electrical lift actuator can be disposed within a lift actuator pocket defined by the frame and be configured to be controllably extended and retracted to raise and lower the lift arm.

Some embodiments of the present disclosure provide a power machine including a track frame located on a lateral side of a main frame, and an electrical drive motor mounted to the track frame and configured to move a track around the track frame to move the power machine over terrain. The track frame can be movably secured to the main frame.

Some embodiments of the present disclosure provide a power machine having at least part of an electrical drive motor extending laterally from a track frame to overlap with a main frame.

Some embodiments of the present disclosure provide a power machine including an electrical drive motor that extends laterally through an opening in a main frame.

Some embodiments of the present disclosure provide a power machine including an electrical tilt actuator that is secured to a lift arm by a pinned connection within a proximal end of a channel.

Some embodiments of the present disclosure provide a power machine that includes a tilt actuator pocket with a channel that tapers so that a distal end of the channel has a smaller lateral width than a proximal end of the channel.

Some embodiments of the present disclosure provide a power machine including a tilt actuator pocket that supports an electrical tilt actuator at least partly to the outside of an operator station, in a lateral direction.

Some embodiments of the present disclosure provide a power machine including an electrical lift actuator having a motor end of the electrical lift actuator that is pinned within a lift actuator pocket and an extendable end of the electrical lift actuator that extends out of the lift actuator pocket to a pinned connection to a lift arm.

Some embodiments of the present disclosure provide a power machine having a motor of a motor end of an electrical lift actuator is located behind one or more of: a pinned connection to a lift arm, or a pinned connection between the electrical lift actuator and a lift actuator pocket, at all operational orientations of a lift arm.

Some embodiments of the present disclosure provide a power machine including an electrical power assembly having a battery assembly that is secured to a main frame to be located rearward of an operator station.

Some embodiments of the present disclosure provide a power machine having a battery assembly that includes a battery housing that encloses a plurality of battery cells. The battery housing can be disposed entirely rearward of an operator station.

Some embodiments of the present disclosure provide a power machine having a battery assembly that includes a battery management system that is one or more of secured to a battery housing or within the battery housing. The battery assembly can be secured to a main frame so that a center of gravity of the battery assembly is laterally off-center within the power machine, relative to a centerline of the power machine.

Some embodiments of the present disclosure provide a power machine including a battery management system that is substantially disposed below a top of a battery housing.

Some embodiments of the present disclosure provide a power machine having a plurality of mounting bars that extend laterally from a main frame rearward of an operator station. A battery assembly can be secured to the mounting bars with a plurality of isolation mounts.

Some embodiments of the present disclosure provide a power machine having a plurality of isolation mounts. The plurality of isolation mounts can include one or more of: a forward set of isolation mounts, including a first isolation mount on a first lateral side of a center of gravity of the power machine and a second isolation mount on a second lateral side of the center of gravity of the power machine; or a rearward set of isolation mounts, including a third isolation mount on the first lateral side of the center of gravity of the power machine and a fourth isolation mount on the second lateral side of the center of gravity of the power machine.

Some embodiments of the present disclosure provide a power machine having a forward set of isolation mounts disposed forward of a center of gravity of the power machine.

Some embodiments of the present disclosure provide a power machine that includes a forward set of isolation mounts disposed forward of a center of gravity of the power machine, as calculated without the weight of the battery assembly.

Some embodiments of the present disclosure provide a power machine including a support plate secured to a main frame to extend above a battery assembly and rearward of an operator station. Further, an electrical power assembly can include a power control module supported by the support plate relative to the main frame.

Some embodiments of the present disclosure provide a power machine having electrical wires configured for providing electrical control and power signals. A first subset of the electrical wires can extend from a power control module, through an interior volume of a lift arm, to a connector for controlling and powering an implement. The connector can be disposed at a distal end of the lift arm.

Some embodiments of the present disclosure provide a power machine including a second subset of electrical wires that are routed from a power control module to an interior volume of a lift arm via a lift actuator pocket and are further configured to provide electrical control and power signals to an electrical lift actuator.

Some embodiments of the present disclosure provide a power machine that includes an electrical power assembly having a cooling module supported by a support plate.

Some embodiments of the present disclosure provide a power machine that includes an electrical power assembly having a base plate that is removable from the support plate and supports a power control module relative to a support plate.

Some embodiments of the present disclosure provide a power machine that includes a base plate having one or more lift points configured for collective support of the base plate and a power control module during alignment of the base plate relative to a support plate during installation of an electrical power assembly.

Some embodiments of the present disclosure provide a power machine that includes an electrical power assembly having a guard plate that extends at least partly vertically from a base plate, rearward of a power control module, to at least partly shield a power control module toward a rear of the power machine.

Some embodiments of the present disclosure provide a power machine including a guard plate having one or more routing openings configured to receive electrical wires to carry electrical control and power signals from a power control module.

Some embodiments of the present disclosure provide a power machine having a support plate disposed in lateral alignment with and above a battery and bolted to a main frame.

Some embodiments of the present disclosure provide a lift arm structure that includes a lift arm configured to be movably secured to the frame to extend along a lateral side of the frame, an implement carrier movably secured to the lift arm, and an electrical tilt actuator secured to the lift arm, within a tilt actuator pocket defined by the lift arm. The tilt actuator pocket can be disposed proximate the implement carrier so that an open side of the pocket faces the implement carrier. The electrical tilt actuator can be configured to be controllably extended and retracted to change an attitude of the implement carrier.

Some embodiments of the present disclosure provide a lift arm structure with an electrical tilt actuator that is a ball screw.

Some embodiments of the present disclosure provide a lift arm structure having an electrical tilt actuator that has a fold-back motor configuration.

Some embodiments of the present disclosure provide a lift arm structure including a motor end of an electrical tilt actuator that is secured to a lift arm with a pinned connection within a tilt actuator pocket, with a motor of the electrical tilt actuator extending forward of the tilt actuator pocket.

Some embodiments of the present disclosure provide a lift arm structure having a pinned connection to secure an electrical tilt actuator to a lift arm that is a two-sided pinned connection that is supported at opposing side walls of a tilt actuator pocket. The opposing side walls can extend in a forward direction to at least partly laterally shield the electrical tilt actuator.

Some embodiments of the present disclosure provide a lift arm structure with an electrical lift actuator, secured at a first end to a rear portion of a frame and at a second end to a bottom side of a lift arm. The electrical lift actuator can be configured to be controllably extended and retracted to raise and lower the lift arm.

Some embodiments of the present disclosure provide a lift arm structure with an electrical lift actuator that is a ball screw.

Some embodiments of the present disclosure provide a lift arm structure that includes an electrical lift actuator that is pinned within a lift actuator pocket at the rear portion of a frame, with a motor of the electrical lift actuator disposed fully within a lift actuator pocket, rearward of an extendable portion of the electrical lift actuator.

Some embodiments of the present disclosure provide a lift arm structure including an implement carrier that includes at least one engagement member that is movable between a locked configuration and an unlocked configuration to secure or release an implement relative to the implement carrier. A lift arm structure can include an electrical attachment actuator configured to move the engagement member between the locked and unlocked configurations.

Some embodiments of the present disclosure provide a lift arm structure having one or more sensors configured to detect an indicator of force applied by an electrical attachment actuator to move an engagement member between locked and unlocked configurations and communicate the indicator to a control system to determine an operating state of the engagement member or an implement.

Some embodiments of the present disclosure provide a power machine that includes a frame, a cab supported by the frame, a lift arm movably secured to the frame to extend along a lateral side of the frame, an electrical tilt actuator, an electrical lift actuator, and a battery assembly. The electrical tilt actuator can be secured to the lift arm and an implement carrier and be configured to be controllably extended and retracted to change an attitude of an implement carrier. The electrical lift actuator can be secured at a first end to the frame and at a second end to the lift arm and be configured to be controllably extended and retracted to raise and lower the lift arm. The battery assembly can be configured to power the electrical tilt actuators and the electrical lift actuator and be disposed entirely rearward of the cab.

Some embodiments of the present disclosure provide a power machine with an electrical lift actuator that is rotatably mounted within a mounting pocket on a lateral side of a rear portion of a frame.

Some embodiments of the present disclosure provide a power machine having a tilt actuator that is disposed within a tilt actuator pocket defined by a lift arm proximate a front portion of a frame.

Some embodiments of the present disclosure provide a power machine that includes a tilt actuator pocket that is a tapered channel opening in a forward direction, relative to a frame, when a lift arm is fully lowered. The channel can taper so that a distal end of the channel has a smaller cross-sectional area than a proximal end of the channel.

Some embodiments of the present disclosure provide a power machine for movably operating an implement. The power machine can include a main frame that supports an operator station and a lift arm structure, and a lift arm structure. The lift arm structure can include a lift arm extending along a lateral side of the frame, with a proximal end of the lift arm movably secured to the frame at a rear portion of the frame, an implement carrier movably secured to a distal end the lift arm, an electrical tilt actuator, and an electrical lift actuator. The electrical tilt actuator can be secured to the lift arm and be configured to be controllably extended and retracted to change an attitude of the implement carrier. The electrical lift actuator can be secured at a first end to the rear portion of the frame and at a second end to the lift arm and be configured to be controllably extended and retracted to raise and lower the lift arm.

Some embodiments of the present disclosure provide a power machine for movably operating an implement. The power machine can include a main frame that supports an operator station and a lift arm structure, and a lift arm structure. The lift arm structure can include a lift arm extending along a lateral side of the frame, with a proximal end of the lift arm movably secured to the frame at a rear portion of the frame, an implement carrier movably secured to the distal end the lift arm, an electrical tilt actuator, and an electrical lift actuator. The electrical tilt actuator can be secured to the lift arm and be configured to be controllably extended and retracted to change an attitude of the implement carrier. The electrical lift actuator can be secured at a first end to the rear portion of the frame and at a second end to the lift arm and be configured to be controllably extended and retracted to raise and lower the lift arm. An electrical power assembly can include a battery assembly that is secured to the main frame to be located rearward of the operator station. A support plate can be secured to the main frame to extend above the battery assembly and rearward of the operator station. The electrical power assembly can further include a power control module supported by the support plate relative to the main frame.

Some embodiments of the present disclosure provide a power machine for movably operating an implement. The power machine can include a main frame that supports an operator station and a lift arm structure, and a lift arm structure. The lift arm structure can include a lift arm extending along a lateral side of the frame, with a proximal end of the lift arm movably secured to the frame at a rear portion of the frame and a distal end of the lift arm. The lift arm structure can further include an implement carrier movably secured to the distal end the lift arm, and an electrical tilt actuator. The electrical tilt actuator can be secured to the lift arm and be configured to be controllably extended and retracted to change an attitude of the implement carrier. The implement carrier can include at least one engagement member that is movable between a locked configuration and an unlocked configuration to secure or release an implement relative to the implement carrier. The lift arm structure can further comprise an electrical attachment actuator that is configured to move the engagement member between the locked and unlocked configurations, and one or more sensors configured to detect an indicator of force applied by the electrical attachment actuator to move the at least one engagement member between the locked and unlocked configurations and communicate the indicator to a control system to determine an operating state of one or more of the engagement member or the implement.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

BRIEF DESCRIPTION OF THE DRAWINGS

FIG. 12 is a perspective partial view showing generally a front of the power machine of FIG. 5, including tilt actuators for a lift arm structure thereof.

FIG. 16B is another perspective view of the lift arm structure of FIG. 16A.

DETAILED DESCRIPTION

Figure 1:
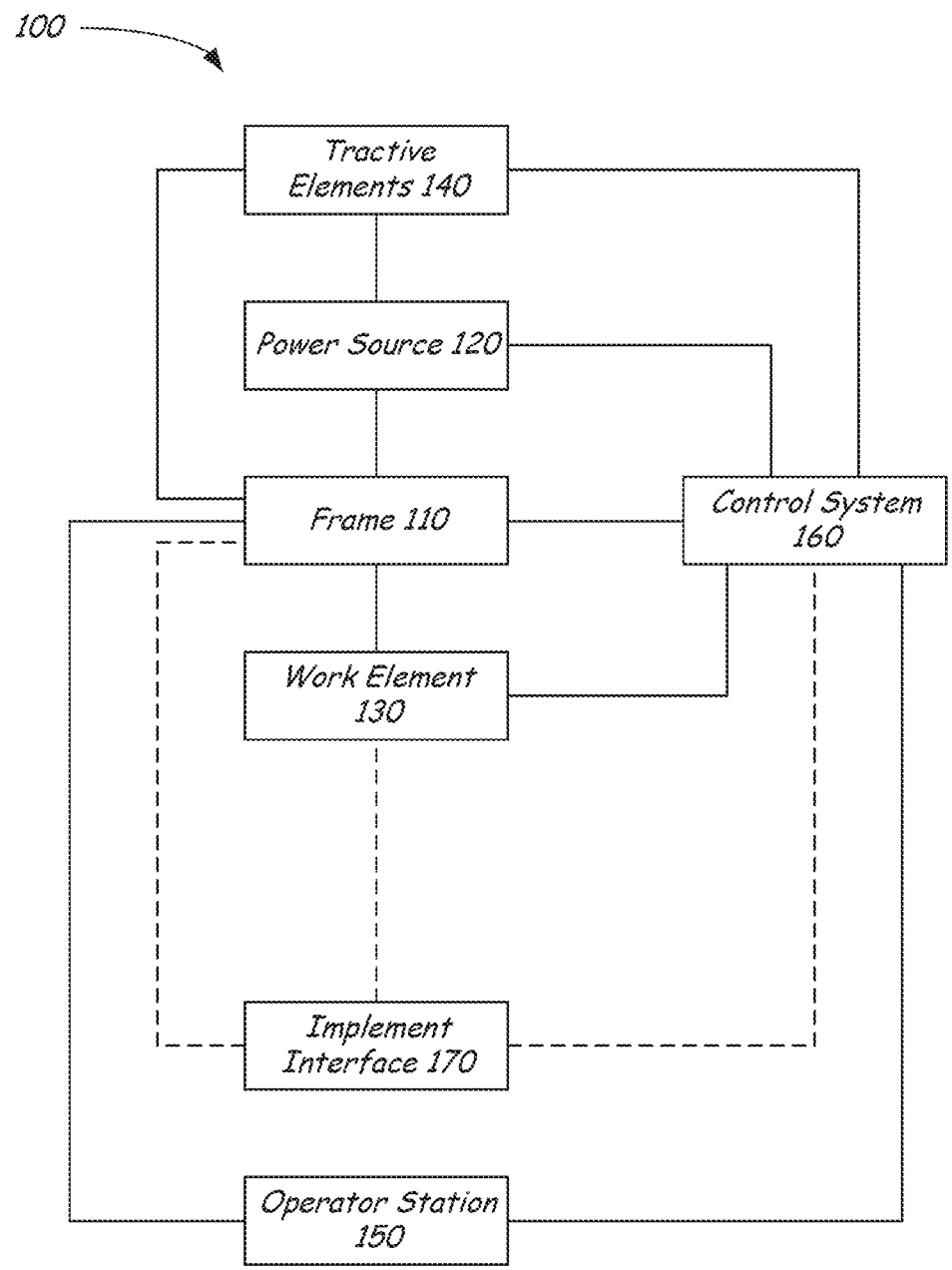
FIG. 1 is a block diagram illustrating functional systems of a representative power machine on which embodiments of the present disclosure can be advantageously practiced.

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

As used herein in the context of a power machine, unless otherwise defined or limited, the term "lateral" refers to a direction that extends at least partly to a left or a right side of a front-to-back reference line defined by the power machine. Accordingly, for example, a lateral side wall of a cab of a power machine can be a left side wall or a right side wall of the cab, relative to a frame of reference of an operator who is within the cab or is otherwise oriented to operatively engage with controls of an operator station of the cab. Similarly, a "centerline" of a power machine refers to a reference line that extends in a front-to-back direction of a power machine, approximately half way between opposing lateral sides of an outer spatial envelope of the power machine.

While the power machines disclosed herein may be embodied in many different forms, several specific embodiments are discussed herein with the understanding that the embodiments described in the present invention are to be considered only exemplifications of the principles described herein, and the invention is not intended to be limited to the embodiments illustrated. Throughout the disclosure, the terms "about" and "approximately" mean plus or minus 5% of the number that each term precedes, unless otherwise specified.

Some discussion below describes improved components and configurations for power machines, including components and configurations that use electrical (e.g., as opposed to hydraulic) power to operate certain power machine components or otherwise implement certain power machine functionality. In some embodiments, electrically powered components can be mounted to a frame of a power machine to selectively move work elements of the power machine, including lift arms or implement carriers. In some embodiments, electrically powered components can provide motive power for a power machine, including for tracked power machines (e.g., compact tracked loaders).

Correspondingly, some embodiments can provide improvements over conventional power machines, including power machines that use hydraulic components for certain operations. For example, use of electrical components (e.g., motors and actuators) to execute particular functions, instead of conventional hydraulic components, can improve overall precision, control, and speed of certain power machine operations. Further, the use of electrical components can also reduce overall component size, potential for failure, and general maintenance requirements as compared to conventional hydraulic systems. However, some aspects of the technology disclosed below can be advantageously employed in power machines for which some (or all) of the relevant components are hydraulically operated.

Continuing, some embodiments can provide structural advantages for supporting, maintaining, and operating actuators and other components. For example, some embodiments can include lift arms with pockets that at least partly house associated actuators. For some such configurations, the pockets can provide stable and robust support for pinned (or other) connections as can support particularly stable operation of tilt (or other) actuators. Further, in some cases, the pockets can at least partly shield the actuators from debris or undesired contact.

Additionally, some embodiments can include power assemblies that can provide improved accessibility, power routing, or weight distribution relative to conventional designs. For example, some embodiments can include battery assemblies that are supported at substantially rearward locations within the associated power machines, as can help to provide beneficial, rearward location of the centers of gravity of the power machines. Likewise, some embodiments can include electrical systems with control or power wiring that is efficiently routed through structural features of a power machine, including side walls of actuator pockets and within lift arms or other structures. In some cases, this arrangement can provide for efficient installation and signal routing, and can also help to protect signal lines (e.g., lines for power or control) from pinch points or adverse contact.

As another example, some embodiments can include control modules that are configured for particularly efficient installation and operation. For examples, some embodiments can include power control modules, with control electronics (and, in some cases, cooling systems) that are collectively supported by a single structural assembly that can be easily installed into or removed from a power machine as a unit. In some cases, a power control module can be configured for installation (e.g., as supported by an integral structural assembly) to be supported by a main frame of a power machine above and in lateral alignment with a battery assembly (i.e., within a common lateral positional range relative to the power machine). In some cases, such a configuration can allow for particularly efficient installation and access for maintenance, as well as particularly efficient routing of control, power, and other (e.g., cooling) conduits to other components of the power machine.

Other benefits will also be apparent from the discussion below, including benefits relating to the orientation of traction motors, to control of actuators and attachment mechanisms (e.g., for implements), and to spatial considerations (e.g., relative to clearance for operator stations).

Figure 2:
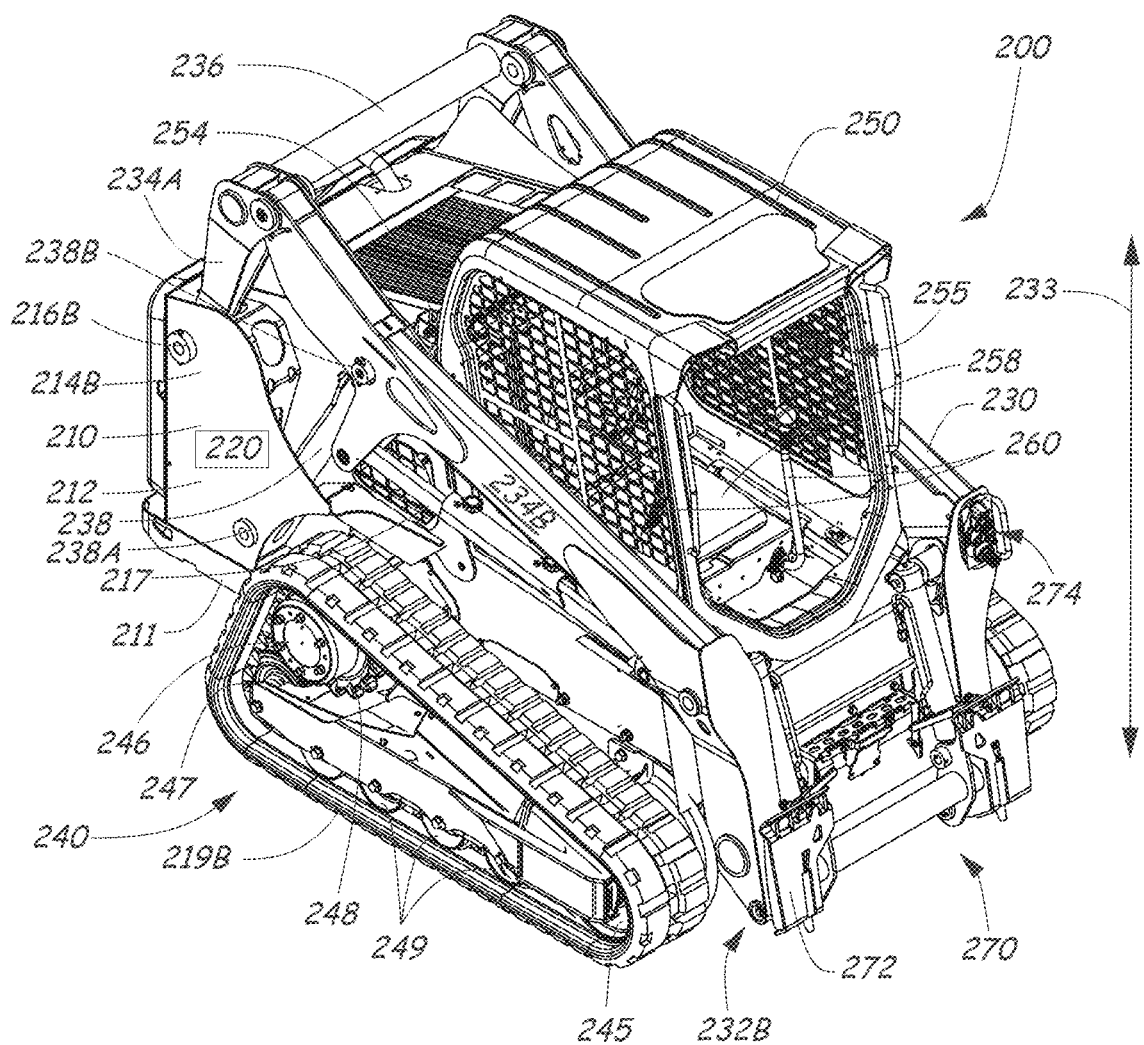
FIG. 2 is a perspective view showing generally a front of a power machine on which embodiments disclosed in this specification can be advantageously practiced.
Figure 3:
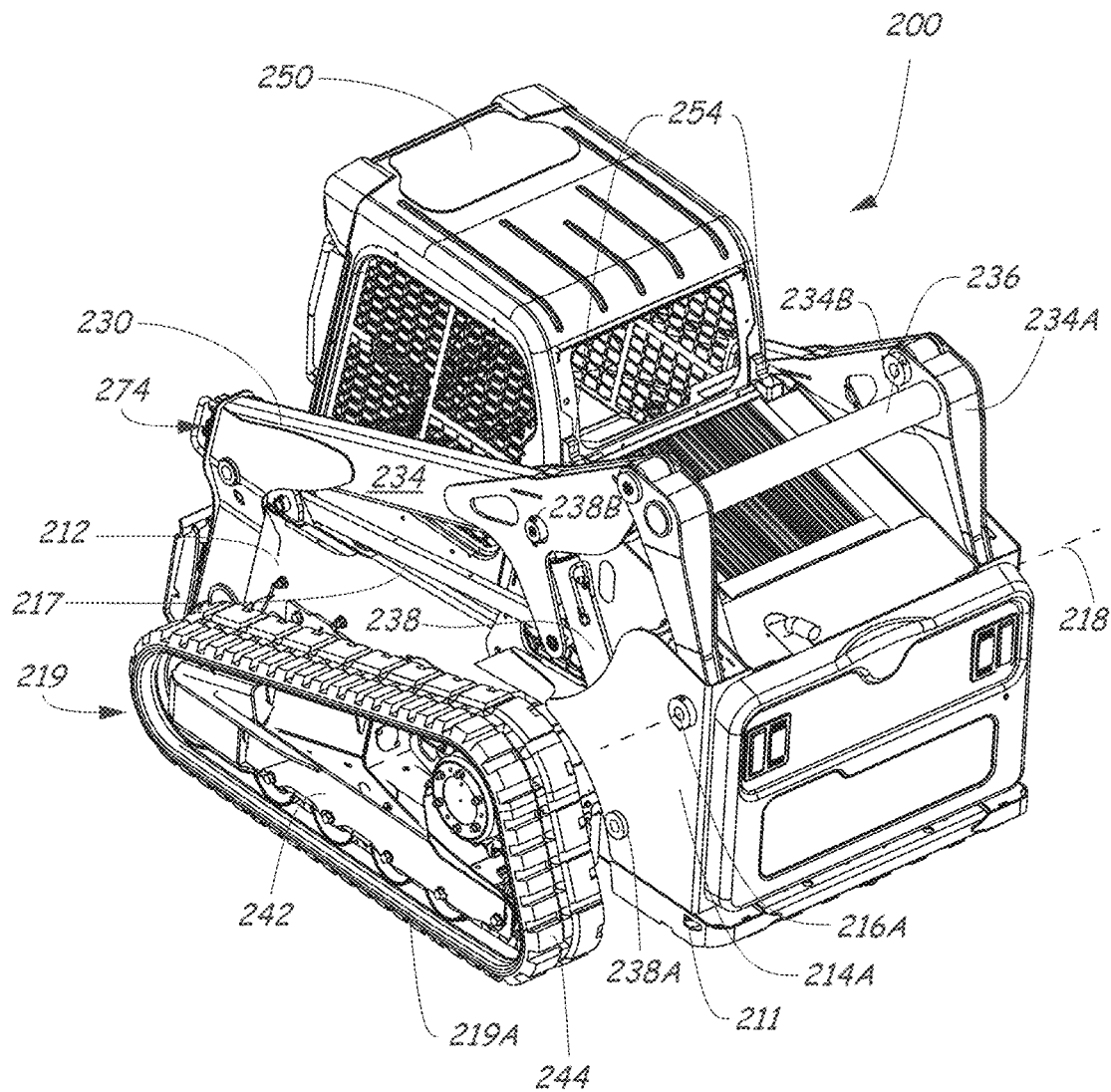
FIG. 3 is a perspective view showing generally a back of the power machine shown in FIG. 2.

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is discussed. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

The embodiments of the disclosure are presented below in the context of compact tracked loaders, with electrical components and other relevant components arranged on and secured to a frame. In some embodiments, electrical components and related systems according to the disclosure can be used with other types of power machines, including with articulated power machines and with non-articulated power machines with tractive elements other than tracks (i.e. wheels). In addition, some embodiments of the disclosure are presented in the context of electrical sub-assemblies for controlling work functions, such as by controlling actuators to maneuver one or more implements. In some embodiments, electrical sub-assemblies according to the disclosure can also be configured for other uses, such as to control other features, actuations, or movements of power machines.

FIG. 1 illustrates a block diagram that illustrates the basic systems of a power machine 100 upon which the embodiments discussed below can be advantageously incorporated and can be any of a number of different types of power machines. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface, and an operator station 150 that provides an operating position for controlling the work elements of the power machine. A control system 160 is provided to interact with the other systems to perform various work tasks at least in part in response to control signals provided by an operator.

Certain work vehicles have work elements that are capable of performing a dedicated task. For example, some work vehicles have a lift arm to which an implement such as a bucket is attached such as by a pinning arrangement. The work element, i.e., the lift arm, can be manipulated to position the implement for the purpose of performing the task. The implement, in some instances, can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that is capable of moving with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is capable of providing power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is capable of converting the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, wheels attached to an axle, track assemblies, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e. remote from both of the power machine and any implement to which is it coupled) that is capable of controlling at least some of the operator controlled functions on the power machine.

FIGS. 2-3 illustrates a loader 200, which is one particular example of a power machine of the type illustrated in FIG. 1 where the embodiments discussed below can be advantageously employed. Loader 200 is a track loader and more particularly, a compact tracked loader. A track loader is a loader that has endless tracks as tractive elements (as opposed to wheels). Track loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Track loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the track loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Frame 210 also supports a work element in the form of a lift arm structure 230 that is powered by the power system 220 and can perform various work tasks. As loader 200 is a work vehicle, frame 210 also supports a traction system 240, which is also powered by power system 220 and can propel the power machine over a support surface. The lift arm structure 230 in turn supports an implement carrier 272, which can receive and secure various implements to the loader 200 for performing various work tasks. The loader 200 can be operated from an operator station 255 from which an operator can manipulate various control devices to cause the power machine to perform various functions. A control system 260 is provided for controlling the various functions of the loader 200.

Various power machines that can include and/or interacting with the embodiments discussed below can have various different frame components that support various work elements. The elements of frame 210 discussed herein are provided for illustrative purposes and should not be considered to be the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200 is attached to the undercarriage 211 such as with fasteners or by welding the undercarriage to the mainframe. Mainframe 212 includes a pair of upright portions 214 located on either side and toward the rear of the mainframe (only one is shown in FIG. 2) that support a lift arm structure 230 and to which the lift arm structure 230 is pivotally attached. The lift arm structure 230 is illustratively pinned to each of the upright portions 214. The combination of mounting features on the upright portions 214 and the lift arm structure 230 and mounting hardware (including pins used to pin the lift arm structure to the mainframe 212) are collectively referred to as joints 216 (one is located on each of the upright portions 214) for the purposes of this discussion. Joints 216 are aligned along an axis 218 so that the lift arm structure is capable of pivoting, as discussed below, with respect to the frame 210 about axis 218. Other power machines may not include upright portions on either side of the frame or may not have a lift arm structure that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements 242 on either side of the loader 200 (only one is shown in FIG. 2), which on loader 200 are track assemblies.

The lift arm structure 230 shown in FIG. 1 is one example of many different types of lift arm structures that can be attached to a power machine such as loader 200 or other power machines on which embodiments of the present discussion can be practiced. The lift arm structure 230 has a pair of lift arms 232 that are disposed on opposing sides of the frame 210. A first end 232A of each of the lift arms 232 is pivotally coupled to the power machine at joints 216 and a second end 232B of each of the lift arms is positioned forward of the frame 210 when in a lowered position as shown in FIG. 2. The lift arm structure 230 is movable (i.e. the lift arm structure can be raised and lowered) under control of the loader 200 with respect to the frame 210. That movement (i.e. the raising and lowering of the lift arm structure 230) is described by a travel path, shown generally by arrow 233. For the purposes of this discussion, the travel path 233 of the lift arm structure 230 is defined by the path of movement of the second end 232B of the lift arm structure.

Each of the lift arms 232 of lift arm structure 230 as shown in FIG. 2 includes a first portion 234A and a second portion 234B that is pivotally coupled to the first portion 234A. The first portion 234A of each lift arm 234 is pivotally coupled to the frame 210 at one of the joints 216 and the second portion 234B extends from its connection to the first portion 234A to the second end 232B of the lift arm structure 230. The lift arms 232 are each coupled to a cross member 236 that is attached to the first portions 234A. Cross member 236 provides increased structural stability to the lift arm structure 230. A pair of actuators 238 (only one is shown in FIG. 1), which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm structure 230 to pivot about joints 216 and thereby be raised and lowered along a fixed path illustrated by arrow 233. Each of a pair of control links 217 (only one is shown) are pivotally mounted to the frame 210 and one of the lift arms 232 on either side of the frame 210. The control links 217 help to define the fixed travel path of the lift arm structure 230. The lift arm structure 230 shown in FIG. 2 is representative of one type of lift arm structure that may be coupled to the power machine 100. Other lift arm structures, with different geometries, components, and arrangements can be pivotally coupled to the loader 200 or other power machines upon which the embodiments discussed herein can be practiced without departing from the scope of the present discussion. For example, other machines can have lift arm structures with lift arms that each has one portion (as opposed to the two portions 234A and 234B of lift arm 234) that is pivotally coupled to a frame at one end with the other end being positioned in front of the frame. Other lift arm structures can have an extendable or telescoping lift arm. Still other lift arm structures can have several (i.e. more than two) portions segments or portions. Some lift arms, most notably lift arms on excavators but also possible on loaders, may have portions that are controllable to pivot with respect to another segment instead of moving in concert (i.e. along a pre-determined path) as is the case in the lift arm structure 230 shown in FIG. 2. Some power machines have lift arm structures with a single lift arm, such as is known in excavators or even some loaders and other power machines. Other power machines can have a plurality of lift arm structures, each being independent of the other(s).

An exemplary implement interface 270 is provided at a second end 234B of the lift arm 234. The implement interface 270 includes an implement carrier 272 that is capable of accepting and securing a variety of different implements to the lift arm structure 230. Such implements have a machine interface that is configured to be engaged with the implement carrier 272. The implement carrier 272 is pivotally mounted to the second end 234B of the lift arm 234. Implement carrier actuators are operably coupled the lift arm structure 230 and the implement carrier 272 and are operable to rotate the implement carrier with respect to the lift arm structure.

The implement interface 270 also includes an implement power source 235 available for connection to an implement on the lift arm structure 230. The implement power source 235 includes pressurized hydraulic fluid port to which an implement can be coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The electrical power source 235 also exemplarily includes electrical conduits that are in communication with a data bus on the excavator 200 to allow communication between a controller on an implement and electronic devices on the loader 200. It should be noted that the specific implement power source on loader 200 does not include an electrical power source.

The lower frame 211 supports and has attached to it the pair of tractive elements 242, identified in FIGS. 2-3 as left track assembly 240A and right track assembly 240B. Each of the tractive elements 242 has a track frame 243 that is coupled to the lower frame 211. The track frame 243 supports and is surrounded by an endless track 244, which rotates under power to propel the loader 200 over a support surface. Various elements are coupled to or otherwise supported by the track frame 243 for engaging and supporting the endless track 244 and cause it to rotate about the track frame. For example, a sprocket 246 is supported by the track frame 243 and engages the endless track 244 to cause the endless track to rotate about the track frame. An idler 245 is held against the track 244 by a tensioner (not shown) to maintain proper tension on the track. The track frame 243 also supports a plurality of rollers 248, which engage the track and, through the track, the support surface to support and distribute the weight of the loader 200.

Upper frame portion 212 supports cab 250, which defines, at least in part, operator compartment or station 255. A seat 254 is provided within the cab 250 in which an operator can be seated while operating the excavator. While sitting in the seat 254, an operator will have access to a plurality of operator input devices 256 that the operator can manipulate to control various work functions, such as manipulating the lift arm structure 230, the traction system 240, and so forth.

Display devices are provided in the cab to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided.

Figure 4:
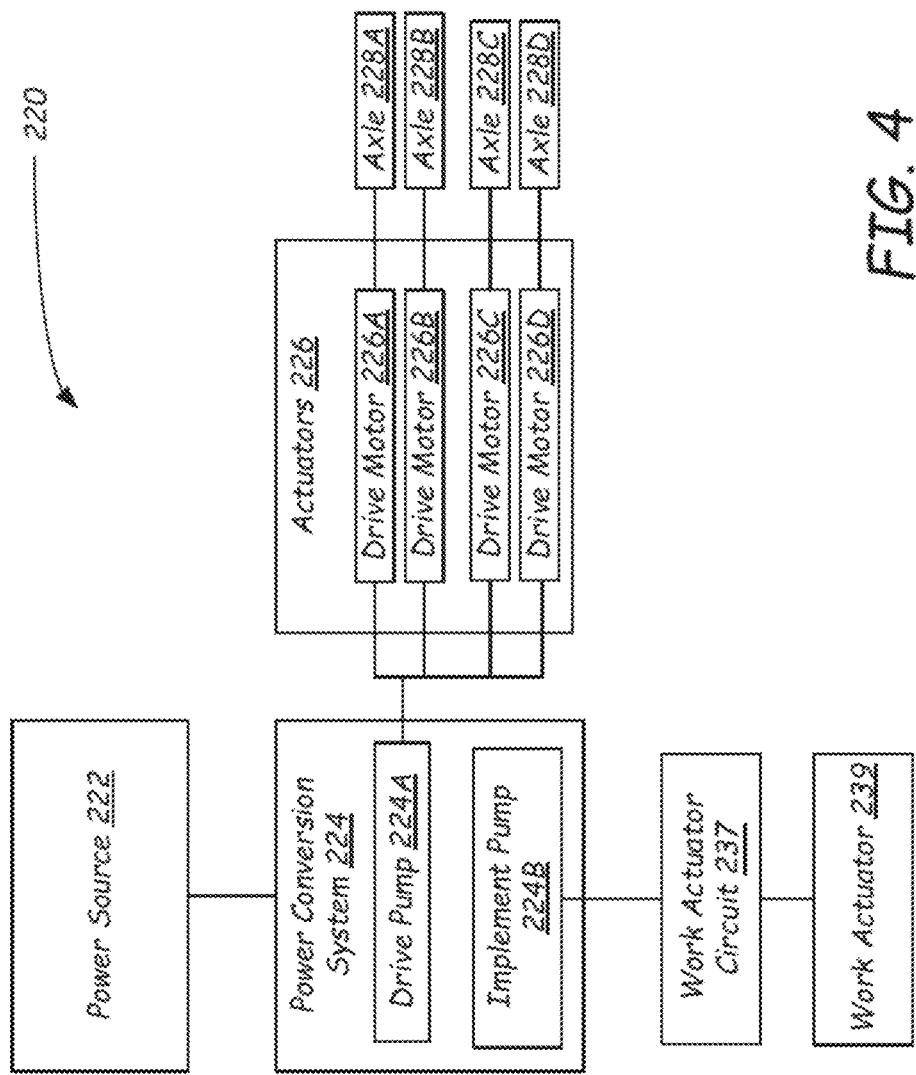
FIG. 4 is a block diagram illustrating components of a power system of a loader such as the loader of FIGS. 2 and 3.

FIG. 4 illustrates power system 220 in more detail. Broadly speaking, power system 220 includes one or more power sources 222 that can generate and/or store power for operating various machine functions. On loader 200, the power system 220 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine. Power conversion systems in various power machines can include various components, including mechanical transmissions, hydraulic systems, and the like. The power conversion system 224 of power machine 200 includes a hydrostatic drive pump 224A, which provides a power signal to drive motors 226A, 226B, 226C and 226D. The four drive motors 226A, 226B, 226C and 226D in turn are each operably coupled to four axles, 228A, 228B, 228C and 228D, respectively. Although not shown, the four axles are coupled to the wheels 242A, 242B, 244A, and 244B, respectively. The hydrostatic drive pump 224A can be mechanically, hydraulically, and/or electrically coupled to operator input devices to receive actuation signals for controlling the drive pump. The power conversion system also includes an implement pump 224B, which is also driven by the power source 222. The implement pump 224B is configured to provide pressurized hydraulic fluid to a work actuator circuit 237. Work actuator circuit 237 is in communication with work actuator 239. Work actuator 239 is representative of a plurality of actuators, including the lift cylinder, tilt cylinder, telescoping cylinder, and the like. The work actuator circuit 237 can include valves and other devices to selectively provide pressurized hydraulic fluid to the various work actuators represented by block 239 in FIG. 4. In addition, the work actuator circuit 237 can be configured to provide pressurized hydraulic fluid to work actuators on an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

In conventional arrangements, the lift actuators 238 and the traction system 340 may use hydraulic components (i.e., hydraulic actuators or motors), which can result in certain inefficiencies. For example, the use of hydraulic actuators may result in somewhat imprecise execution of certain operations, may require frequent maintenance and related activities (e.g., to address leakage of hydraulic fluid, wear of seals, etc.), may impose undesired size requirements, and may exhibit limited performance capabilities (e.g., relative to actuation speed, responsiveness to operator commands or external factors, etc.). Complex control of hydraulic actuators may also be difficult, including for synchronized operation of the actuators and associated power machine work elements. Thus, although conventional power machines that use hydraulic actuators can provide substantial power and functionality, including for motive power and to operate lift arms and implements, optimal performance relative to multiple design constraints may be difficult to achieve.

Embodiments of the disclosure can address one or more of the issues noted above, or others. For example, some embodiments can use electrical systems for motive power or for other operation of work elements, including lift arm structures and implements. In some embodiments, such electrical systems can be readily swapped for hydraulic systems on pre-existing power machine structures, such as by replacing hydraulic cylinders and motors with electrical actuators and motors, thereby potentially improving multiple aspects of machine performance with little or no required adaptation of existing power machine frames or other support structures.

As also noted above, the use of electrical components in some embodiments (e.g., instead of hydraulic components) can help to improve overall system functionality, including relative to precision and complexity of control for work elements. For example, electrical actuators can generally provide enhanced motion-control capabilities as compared to hydraulic actuators, including with regard to precise positioning of components (e.g., precise extension of lift or tilt actuators) and complex simultaneous control of multiple electrical components (e.g., simultaneous control of multiple drive motors or work actuators). Use of electrical components can also help to reduce maintenance frequency and diminish potential for component failures, including through the elimination of hydraulic leakage and of components that are prone to substantial wear (e.g., seals). As a result, using electrical systems as opposed to hydraulic systems can reduce the overall cost and time required to maintain power machines. Moreover, in some instances, hydraulic systems require more components and space than comparably capable electrical systems. As a result, using electrical systems as opposed to hydraulic systems can reduce the required spatial footprint on a power machine for these systems, with corresponding benefits for overall system design. For example, power machines that extensively use electrical systems rather than hydraulic systems can be more compact or more accessible for users, or can be more easily equipped with additional components for enhanced functionality.

Figure 5:
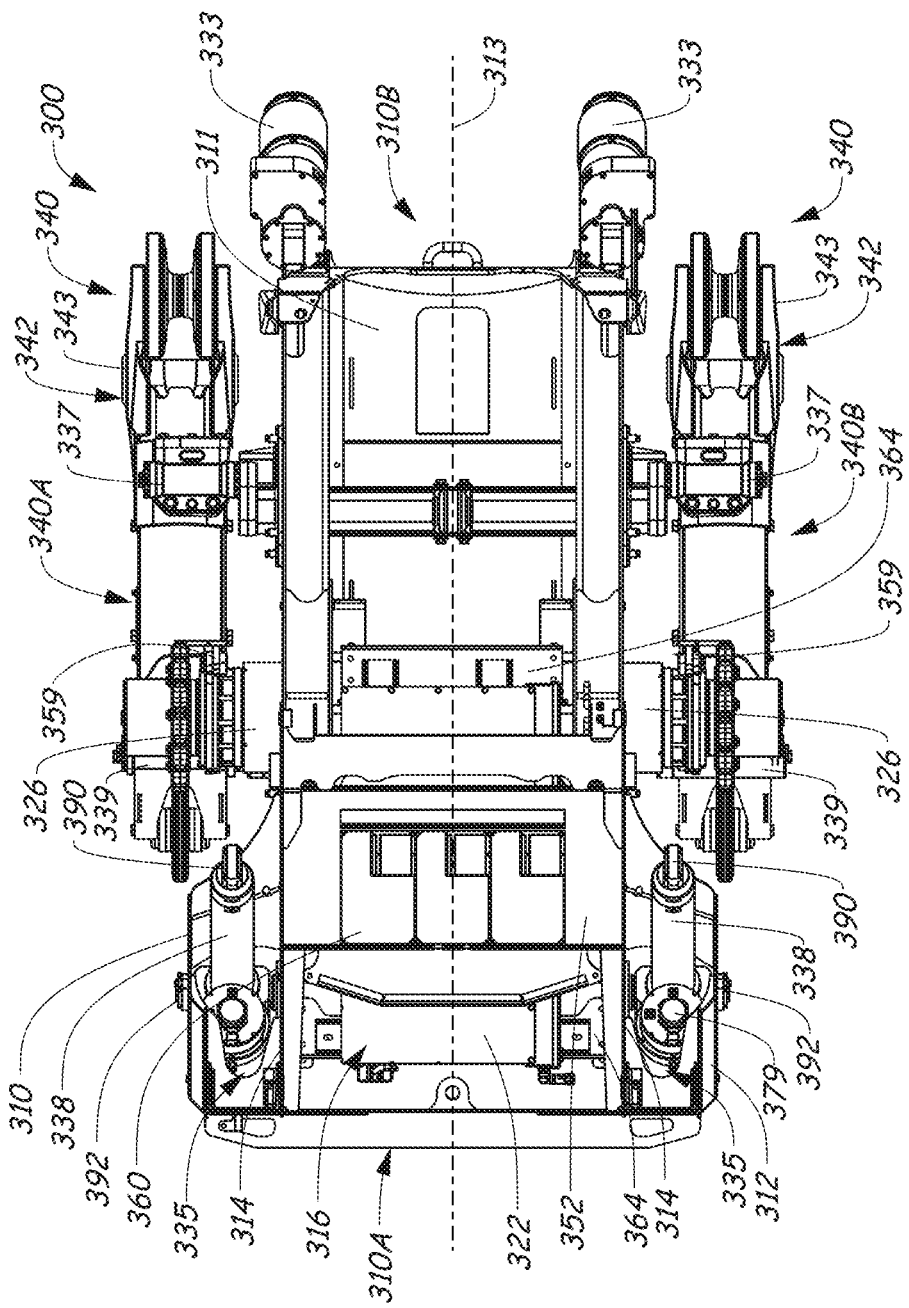
FIG. 5 is a top plan view showing certain components a power machine in the form of an electrically powered compact tracked loader according to embodiments of the disclosure.

FIG. 5 illustrates an example arrangement of components for an electrically powered power machine 300, which is one particular example of the power machine 100 illustrated broadly in FIG. 1 and discussed above, and relative to which the embodiments discussed herein can be advantageously employed. The power machine 300 is similar in some ways to the loader 200 described above and like numbers represent similar parts unless otherwise indicated below. For example, like the loader 200, the power machine 300 includes a frame 310, a lift arm structure 330 (see FIG. 12), and a traction system 340.

Figure 6:
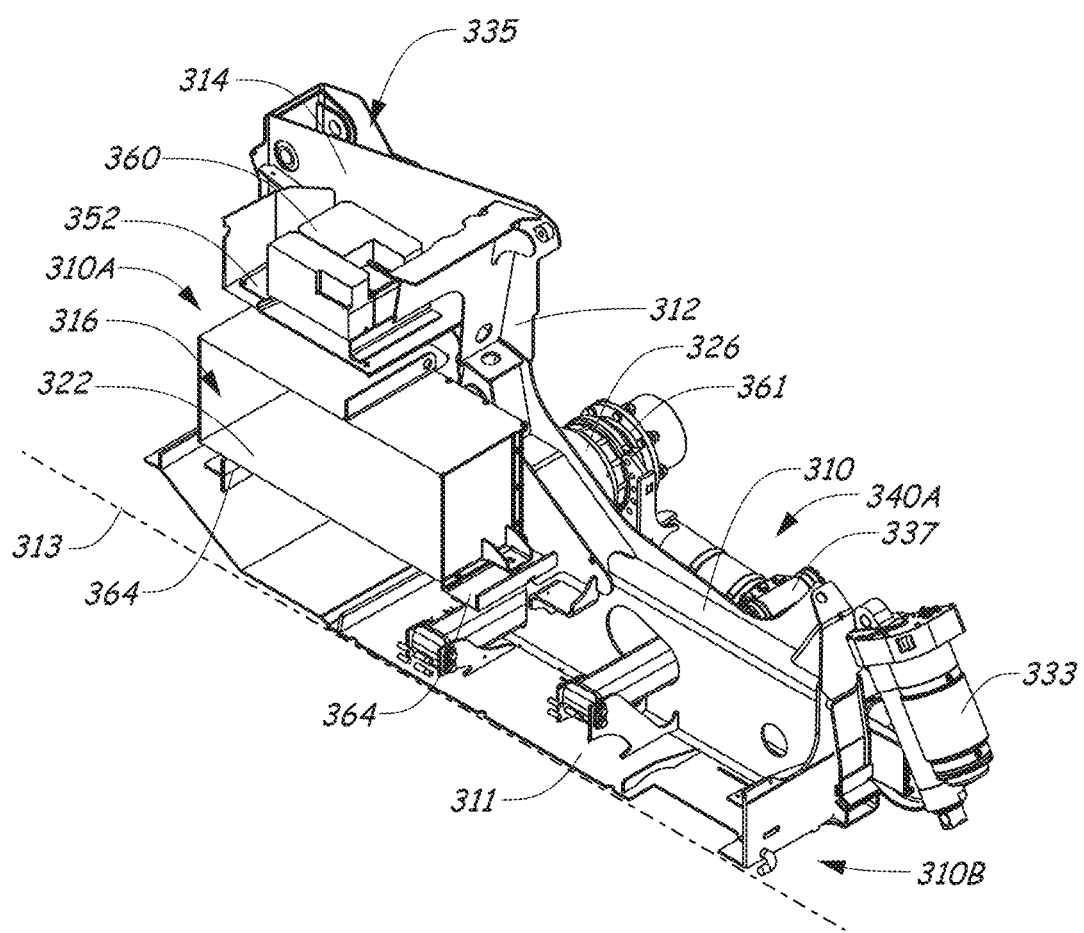
FIG. 6 is a cross-sectional perspective partial view of the power machine of FIG. 5.

As shown in FIGS. 5 and 6, the frame 310 is substantially similar to the frame 210 of the power machine 200, although the specific elements of the frame 310 discussed herein are provided for illustrative purposes and are not intended to represent the only type of frame for a power machine on which the embodiments of this disclosure can be used. Generally, the frame 310 includes a rear frame end 310A and a front frame end 310B, and further includes a lower frame portion 311 and an upper main frame 312. The main frame 312 includes a pair of upright lateral walls 314 disposed on opposing sides of the lower frame portion 311. The frame is substantially symmetrical about a longitudinal axis 313 (e.g., a centerline of the power machine 300), and the upright lateral walls 314 extend substantially parallel to the longitudinal axis 313.

Referring to FIG. 5, in particular, the frame 310 is configured to support a cab similar to cab 250 of power machine 200, and can correspondingly include an operator station (not shown in FIG. 5, but an example of an operator station 255 can be seen in FIG. 2) from which an operator can manipulate various control devices (i.e., an operator control system) to cause the power machine to perform various work functions. Similar to the operation station 250 of power machine 200, for example, an operator station of the power machine 300 can include an operator seat (not shown in FIG. 5) and various operation input devices (not shown in FIG. 5), including control levers that an operator can manipulate to control various machine functions.

The frame 310 is also configured to support a variety of other components. For example, similar to the frame 210 of power machine 200, the frame 310 supports a power source 316 which is configured to provide power for executing functions on the power machine 300, including operations using the traction system 340 and the lift arm structure 330 (see, e.g., FIG. 12). In the illustrated embodiment, the power source 316 is an electrical power source, which can provide electrical power for operation of the traction system 340, the lift arm structure 330, and other subsystems of the power machine 300. In particular, the power source 316 includes a battery assembly 322 with a plurality of battery cells contained by a battery casing, which is supported on battery mounts 364 that extend laterally across the frame 310 proximate the rear frame end 310A. The battery assembly 322 is configured to provide electrical power to a control module 360 (e.g., via intervening conductors (not shown)), which is supported on a support plate 352 above the battery assembly 322. The control module 360 can then control the routing of electrical power from the battery assembly 322 to other electrical devices of the power machine 300, including motors and linear actuators of various work elements, as further discussed below. Further, in some embodiments, the control module 360 can be configured to receive signals from other electrical devices, such as may allow feedback-based or other control of various devices or the power machine 300 in general.

In some cases, the control module 360 can be formed as a subassembly that can be fully assembled externally to the power machine, then lifted as a unit into the power machine 200 (e.g., via appropriate lift points) and secured as a unit to the frame 310, including via a mounting plate, support rails, suitable isolation mounts, or other support structures. This arrangement can sometimes allow easier access to the battery assembly 322, including to replace or otherwise maintain particular cells included within the batter casing, without necessarily requiring the battery assembly 322 to be removed from the power machine 300. Further, from the illustrated position above the battery assembly 322 and to the rear of the operator station (as also discussed below), wiring for power and control signals can be efficiently routed from the control module 360 to a variety of other components.

In some embodiments, other power sources may be used, including other electrical storage devices (e.g., devices including capacitors). In some embodiments, combinations of power sources of different types, known generally as hybrid power sources, may be used. For example, although the power machine 300 is not illustrated as including an internal combustion engine, some embodiments can include such an engine in combination with an electrical power system, with the engine being configured to charge a battery assembly or other electrical storage device for electrically powered operations.

Generally, the control module 360 is configured as an electronic device that can appropriately control the delivery of electrical power to other devices, including electrical motors and linear actuators distributed around the power machine 300. In some implementations, the control module 360 can selectively power these components in response to operator inputs from within the operator station (not shown) or as part of a predetermined (e.g., automated) control strategy based on one or more locally or remotely stored control algorithms.

In some embodiments, a control module can control operation of a battery assembly in addition to controlling operation of electrical motors and actuators. For example, the control module 360 can be configured to automatically optimize power availability, battery life, or other aspects of operation for the battery assembly 322. In some embodiments, the control module 360 can optimize battery performance in different ways depending on the particular types of operations currently being performed or based on a variety of other factors.

In different embodiments, components of a power source can be located and supported relative to a frame in different ways. In the power machine 300, as noted above, the battery assembly 322 is supported on the mounts 364, and the control module 360 is supported on the support plate 352 above the battery assembly 322. In particular, the mounts 364 extend substantially perpendicularly to the longitudinal axis 313 and support the battery assembly 322 proximate front and rear ends thereof. Two battery mounts 364 are provided in the embodiment illustrated, although alternative embodiments may include more or fewer battery mounts 364. Similarly, although a single, horizontal support plate 352 is shown, other embodiments can have other configurations.

As best seen in FIGS. 5 and 6, the support plate 352, the control module 360, the mounts 364, and the battery assembly 322 are disposed proximate the rear frame end 310A of the power machine 300, behind the operator station (not shown). Generally, this arrangement can result in efficient use of space within the power machine 300 for the power source 316 generally, while also allowing easy access to the battery assembly 322 and the control module 360, such as for operational configuration of the control module 360, replacement of the battery assembly 322, or other tasks. In other embodiments, however, other configurations are possible. For example, in alternative embodiments, a power source or a control module may be disposed proximate the front frame end 310B, in front of, above, or below, the operator station (not shown). Additionally or alternatively, in some embodiments, a control module may be disposed below or level with a power source.

Figure 7:
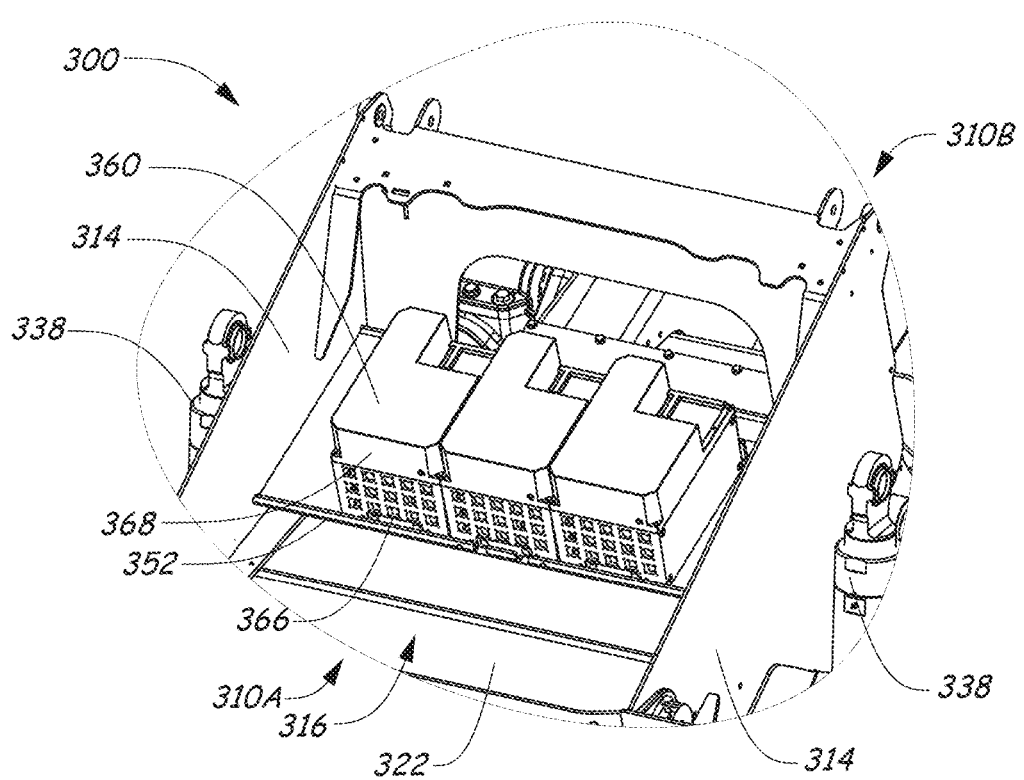
FIG. 7 is a perspective partial view showing generally a back of the power machine of FIG. 5.

Turning to FIG. 7, the control module 360 includes a control interface 366 on a rear face 368 thereof so that the control interface 366 projects toward the rear frame end 310A. The control interface 366 can provide connections for battery management, for power distribution, and for control of various components of the power machine 300, such as electrical motors and other actuators. Due to the alignment of the control module 360 towards the rear frame end 310A in the illustrated configuration, the control interface 366, like the power source 316 generally, may be readily accessible via a rear hatch of the power machine 300. In other embodiments, however, other configurations are possible, including configurations in which a control interface faces towards or is otherwise accessible from an operator station of a power machine. Further, although not shown in FIG. 7, some embodiments can include a shield plate to the rear of the control interface 366, as can protect the control module 360 during operation and maintenance of the power machine 300.

Returning to FIG. 5, the frame 310 also supports the traction system 340, which is generally similar to the traction system 240 of power machine 200. Thus, as further discussed below, the traction system 340 can be powered by electrical power from the power source 316 to propel the power machine over a support surface.

Different embodiments can include different types of traction systems, including wheeled or tracked traction systems, all of which can be electrically powered, as appropriate. In the embodiment illustrated, the traction system 340 is a tracked system that includes a pair of tractive elements 342 disposed on opposing sides of the frame 310. More specifically, the tractive elements 342 are configured as a left track assembly 340A and a right track assembly 340B, provided on opposing sides of the frame 310 to be substantially symmetrical about the longitudinal axis 313. Generally, the tractive elements 342 are substantially similar to the tractive elements 242 of power machine 200. For example, each of the track assemblies 340A, 340B has a track frame 343 that is coupled to the lower frame portion 311. Each of the track frames 343 is configured to support an endless track (not shown), which rotates around the respective track frame 343 under power to propel the power machine 300 over a support surface.

Figure 8:
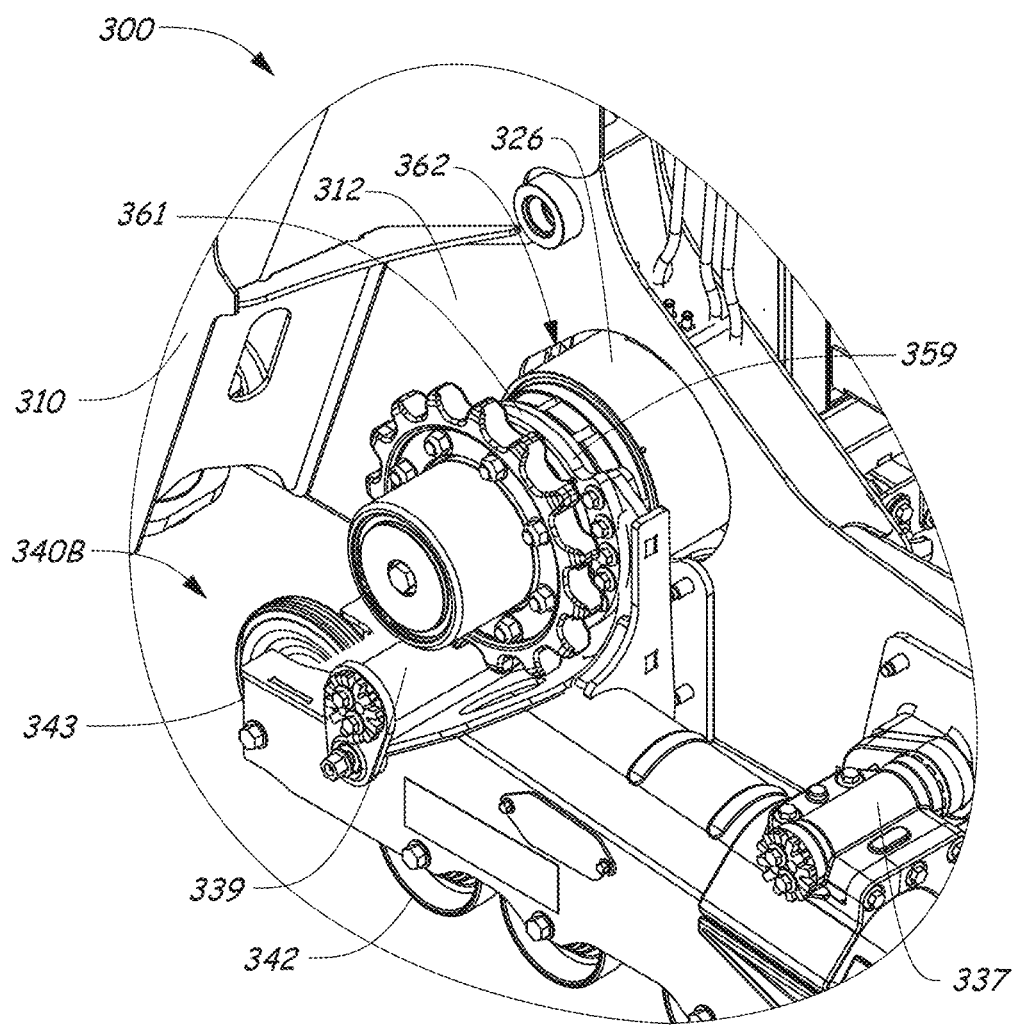
FIG. 8 is a perspective partial view showing components of a track assembly of the power machine of FIG. 5.

As shown in FIG. 8 in particular, the traction system 340 includes drive motors 326 that are secured to the respective track frames 343, and extend laterally inwardly from the respective track frame 343 toward the main frame 312. As alluded to above, the drive motors 326 are electrical motors that can be powered by the battery assembly 322 and controlled by the control module 360 (see FIG. 5) to drive the track and thereby propel the power machine 300. Thus, the drive motors 326 can be readily controlled in a variety of ways, including in response to signals from an operator control system or according to predetermined electronic control algorithms.

Still referring to FIG. 8, each of the drive motors 326 is mounted to the respective track frame 343 by a support component 359 that is configured as a support plate extending vertically upward from the track frame 343. To allow appropriate spacing of the track frames 343 and related components from the main frame 312, casings of the drive motors 326 extend laterally inwardly from the support components 359 to laterally overlap with the main frame 312. In other embodiments, however, other configurations are possible.

An interface plate 361 is also provided, to secure each of the drive motors 326 to the respective support component 359. Although a particular configuration of the interface plate 361 is shown in FIG. 8, other interface plates can have any variety of configurations, including configurations with different hole patterns than shown. Hubs or other associated structures can also allow a sprocket or other similar component to be mounted to the drive motor 326, so that the drive motor 326 can rotate to power movement of the associated track (not shown).

In some embodiments, track frames may be movable relative to a main frame of a power machine. For example, still referring to FIG. 8, a multi-bar torsional suspension linkage for the power machine 300, including torsion bars 337, 339, allow each of the track frames 343 to move relative to the frame 310 during operation of the power machine 300 (e.g., in response to variations in terrain). Correspondingly, because the drive motors 326 are mounted to the track frames 343, the drive motors 326 are also configured to be movable relative to the frame 310.

To allow movement of the track frames 343 and the attached drive motors 326 relative to the main frame 312, each of the drive motors 326 extends from the track frame 343 through an opening 362 defined in the main frame 312. The opening 362 is generally circular and is enlarged relative to an outer periphery of the drive motor 326 to allow collective movement of the track frame 343 and the drive motor 326 relative to the frame 310, without interference between the main frame 312 and the drive motor 326. As a result, the track frame 343 can move appropriately relative to the frame 310 during operation, including during travel over uneven terrain or other obstructions. Relatedly, the frame 310 of the power machine 300 can remain relatively steady as the power machine 300 travels or maneuvers over an uneven surface, which can provide enhanced comfort and operability for an operator. Additionally, the laterally inward extension of the drive motors 326 though the openings 362 can help to shield the drive motors 326 from impacts and debris during operation of the power machine 300.

Figure 8A:
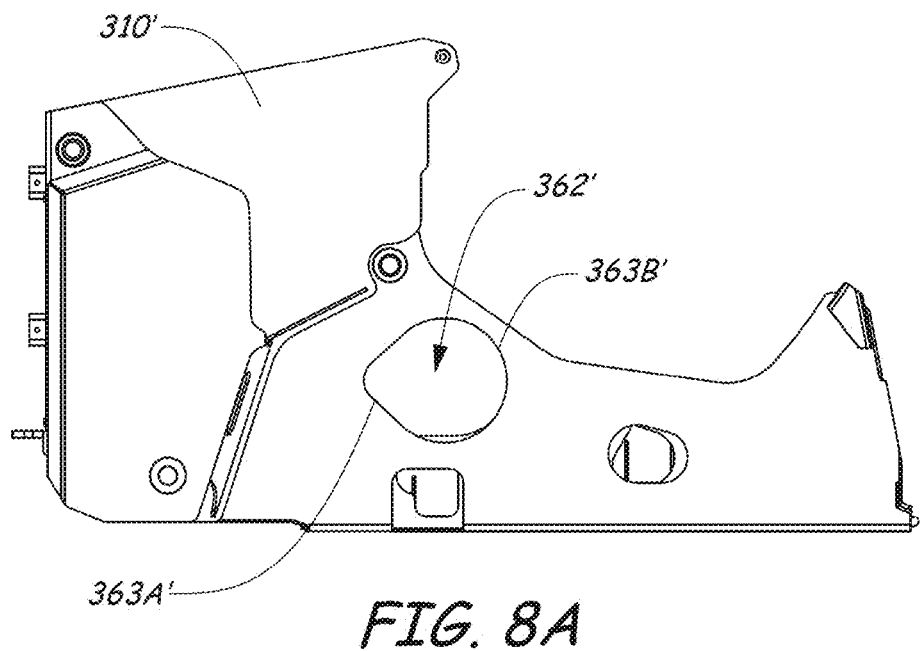
FIG. 8A is a side elevation view showing a track assembly and frame of another power machine according to the disclosure.

Although a generally circular profile is shown for the opening 362, other shapes may be possible, including a teardrop shape as is shown for an aperture 362' in FIG. 8A. The aperture 362' is formed in a power machine frame 310' that is generally similar to the frame 310 and can support similar (or other) components as the frame 310. In particular, the aperture 362' is based on two radial features 363A', 363B' that are connected via tangent lines, with the forward radial feature 363B' exhibiting a larger radius than the rearward radial feature 363A'. This configuration for the aperture 362' can provide clearance for components related or attached to a drive motor, including connections for cooling lines. Other similar aperture shapes can be incorporated as may be advantageous.

Although movable track frames can provide certain benefits, some embodiments can include track frames that are not movable relative to a main frame of a power machine. In such embodiments, electrical drive motors can be mounted to the track frames similarly to the drive motors 326 or otherwise can be mounted directly to a main frame of a power machine rather than to a track frame.

As generally discussed above, electrical actuators can also be usefully employed for non-tractive operations of a work machine. For example, returning again to FIG. 5, tilt actuators 333 and lift actuators 338, all of which are electrically powered, can be used to execute various functions with the lift arm structure 330. In the illustrated embodiment, the tilt actuators 333 and the lift actuators 338 are supported on opposing lateral sides of the frame 310 so as to be substantially symmetrical about the longitudinal axis 313. In particular, the lift actuators 338 are secured to the frame 310 within lift actuator pockets 335 that are disposed proximate the rear end 310A of the frame 310 in lateral alignment with (i.e., disposed vertically below, as shown) an associated lift arm 334 of the lift arm structure 330 (see FIG. 12). In contrast, the tilt actuators 333 are disposed proximate the front end 310B of the frame 310 laterally to the inside of an associated lift arm 334 of the lift arm structure 330 (see FIG. 12). In other embodiments, however, other configurations are possible, including configurations with non-symmetrically arranged electrical lift or tilt actuators.

Figure 9:
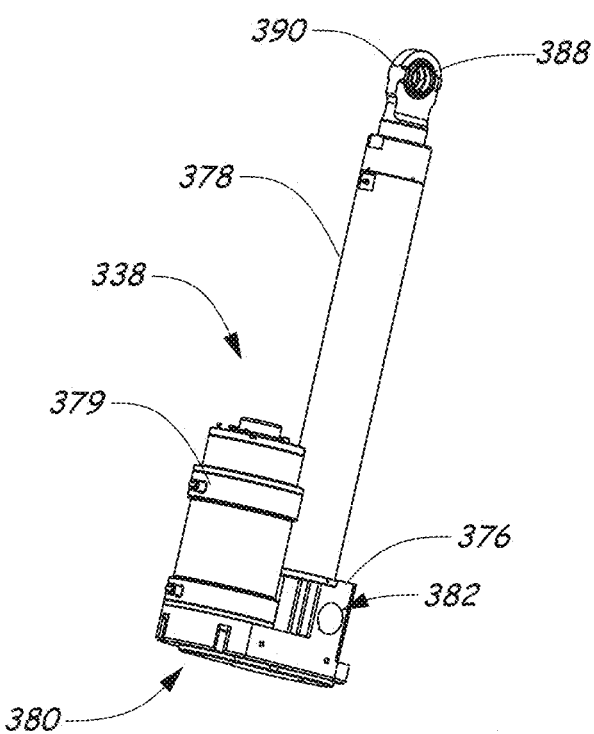
FIG. 9 is a perspective view of a lift actuator for the power machine of FIG. 5.

FIG. 9 illustrates an example configuration of the lift actuator 338 in detail. In the illustrated example, the lift actuator 338 is an electrically powered ball screw actuator and includes a first mounting feature 376, an extendable portion configured as a screw 378 that can be controllably extended and retracted relative to the first mounting feature 376, and an electrical motor 379. In other embodiments, lift actuators can be configured as other types of electrical actuator, including lead screw, belt driven, or other geared actuators. Further, although the lift actuator 338 is illustrated with the motor 379 in a fold-back configuration, other electrical lift actuators can be arranged differently, including with motors in in-line or perpendicular configurations.

Figure 11:
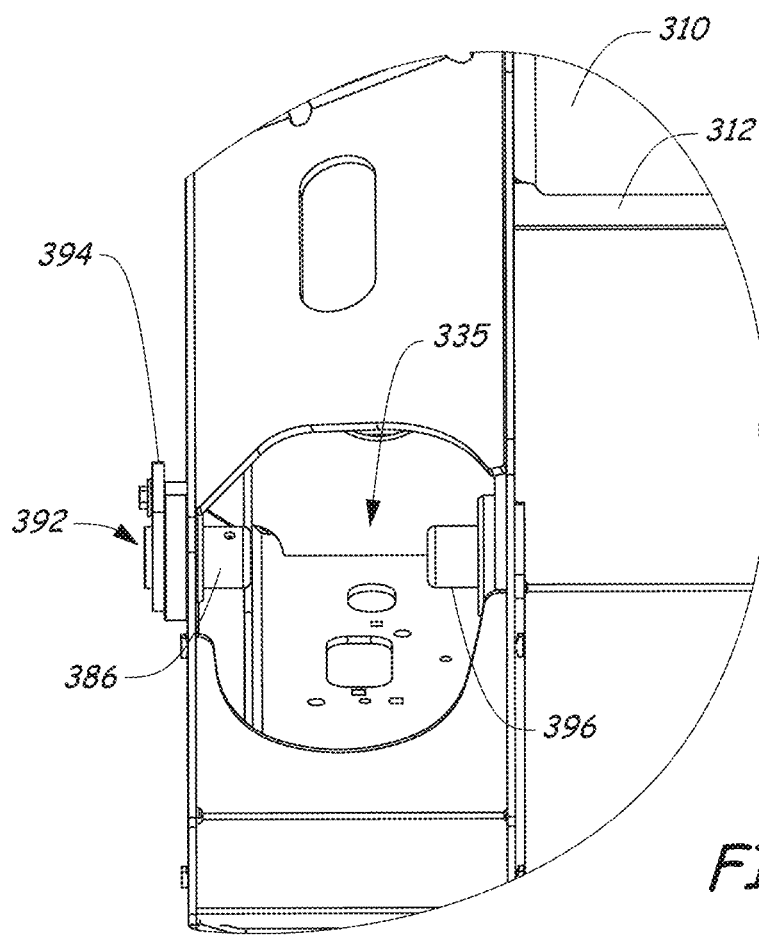
FIG. 11 is a perspective front partial view of the power machine of FIG. 5 showing a support structure for the lift actuator of FIG. 9.

To rotatably secure the lift actuator 338 to the frame 310, the first mounting feature 376 is disposed at a motor end 380 of the lift actuator 338 and includes opposing mounting openings 382 (only one shown in FIG. 9) that are configured for securing the lift actuator 338 to the frame 310 within the corresponding lift actuator pocket 335 (see, e.g., FIG. 11). A second mounting feature 388 is disposed at an extension end 390 of the lift actuator 338 and is configured to rotatably secure the lift actuator 338 to the corresponding lift arm 334 of the lift arm structure 330 (not shown in FIG. 9). The screw 378 is configured to extend and/or retract the second mounting feature 388 linearly when driven by the electrical motor 379, which is powered by the battery assembly 322 and is controlled by commands from the control module 360 (see, e.g., FIG. 5). Thus, when secured to the frame 310 at the corresponding pocket 335 (see also FIG. 11), the lift actuator 338 may be selectively operated based on operator input (or otherwise) to raise or lower the lift arm structure 330 relative to the frame 310.

Further, the lift actuator pocket 335 can provide lateral and rear shielding for the electrical motor 379, particularly when the electrical motor 379 is disposed behind the screw 378 (e.g., as shown in FIG. 5), with appropriately placed openings through the lateral side walls of the lift actuator pocket 335 allowing for particularly efficient routing of electrical power and control signals and cooling lines (not shown for the power machine 300). Additionally, the illustrated arrangements and others (e.g., as discussed below) can beneficially dispose the electrical motor behind a pinned connection between the extendable end of the lift actuator (e.g., the screw 378) and the lift arm (e.g., the lift arm 334) and at least partly behind the pinned connection between the lift actuator and the lift actuator pocket, at all operational orientations of the lift arm.

Figure 10:
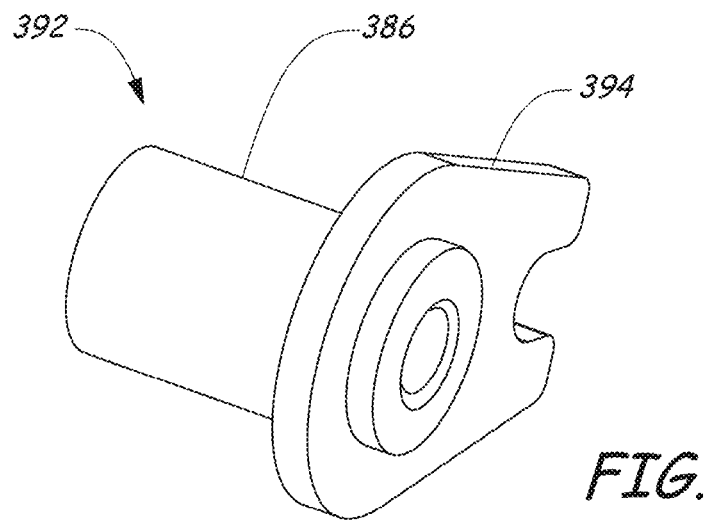
FIG. 10 is a perspective view of a trunnion for the lift actuator of FIG. 9.

In some embodiments, a mounting arrangement for a lift actuator can include a combination of fixed and removable components. Turning to FIG. 10, for example, a first mounting pin 386 for securing the lift actuator 338 forms part of a trunnion 392, which further includes a mounting flange 394 that is configured to be secured or bolted to the frame 310, as best seen in FIG. 11. With continued reference to FIG. 11, when the trunnion 392 is secured to the frame 310, the first mounting pin 386 of the trunnion 392 extends through the frame 310 into the lift actuator pocket 335, where it can engage one of the mounting openings 382 of the first mounting feature 376 (see FIG. 9) to pivotably secure the lift actuator 338 within the pocket 335.

A fixed, second mounting pin 396 is also attached to the frame to extend into the lift actuator pocket 335, on an opposing side of the pocket 335 from the trunnion 392. In particular, the first mounting pin 386 of the trunnion 392 and the fixed, second mounting pin 396 are positioned so that they are substantially axially aligned. Thus, the mounting pins 386, 396 are configured to extend into the opposing mounting openings 382 of the lift actuator 338 so that the lift actuator 338 is pivotally secured within the pocket 335 (see FIG. 5) below the corresponding lift arm (e.g., lift arm 334 shown in FIG. 12).

In some embodiments, the illustrated pinned arrangement can allow for an electrical actuator, including the ball screw actuator 338, to be readily installed in place of a hydraulic actuator, including in operations to convert or repurpose a power machine or power machine frame for electrically powered operations. In other embodiments, however, electrical lift actuators can be secured to a power machine frame in other ways.

In some cases, the use of a mounting component that can be removably secured to a main frame of a power machine may more generally facilitate easy installation of a lift actuator. For example, for the power machine 300, the lift actuator 338 can first be seated within the pocket 335 and rotatably engaged with the fixed, second mounting pin 396 (e.g., as further facilitated by the rearward orientation of the motor 379). The first mounting pin 386 of the trunnion 392 can then be extended through the frame 310 into the pocket 335, to rotatably engage the lift actuator 338 opposite the fixed, second mounting pin 396. Finally, the mounting flange 394 can be secured to the frame 310 to rotatably secure the lift actuator 338 within the pocket 335. Moreover, the lift actuator 338 can then be easily removed from the frame 310, as desired, using a reversed order of the operations discussed above. In other embodiments, however, other configurations, including other pinned arrangements, can be used to rotatably secure a lift actuator to a power machine frame in other ways.

Turning now to FIG. 12, as also discussed above, the lift arm structure 330 has a set of lift arms 334 that are disposed on opposing sides of the frame 310. The lift arm structure 330, including the lift arm 334, is one example of a lift arm structure that can be attached to a power machine such as the power machine 300 or other power machines on which embodiments of the present discussion can be practiced. However, alternative configurations are possible.

As also noted above, the lift arm structure 330 is generally configured to be raised and lowered with respect to the frame 310, as powered by the electrical lift actuators 338 (see FIG. 9). In particular, in the illustrated embodiment, a first end (not shown) of each of the lift arms 334 is pivotably coupled to the power machine 300 (e.g., similarly to the lift arms 234 as shown in FIG. 3). For example, the first, proximal end (not shown) may be pivotably coupled to the power machine 300 proximate the rear end 310A of the frame 310. Thus, actuation of the lift actuators 338 can move a second, distal end 332 of each of the lift arms 334 generally up and down relative to the frame 310, including to a fully lowered position as shown in FIG. 12.

Further, an implement interface 370 is provided at the second end 332 of the lift arms 334, as shown in FIG. 12. The implement interface 370 includes an implement carrier 372 that is pivotally mounted to the second end 332 of each of the lift arms 334 and is configured to accept and secure a variety of different implements to the lift arm structure 330. Thus, the lift actuators 338 (see FIG. 5) can be used to move (i.e., raise and/or lower) an implement (not shown) along with the lift arms 334, to complete various operations.

As also shown in FIG. 12, in particular, the tilt actuators 333 are rotatably coupled to the lift arms 334 and to the implement carrier 372 and are thereby configured to controllably rotate the implement carrier 372 with respect to the lift arm structure 330. Thus, for example, the control module 360 can electronically control operation of the tilt actuators 333, as powered by the battery assembly 322 (see FIG. 5), in order to selectively change an attitude of an implement secured to the implement carrier 372 with respect to the lift arm 334.

In the illustrated embodiment, each of the lift arms 334 includes an inward jog 398 disposed between the first end (not shown) and the second end 332. More specifically, the inward jog 398 is configured so that the second end 332 of the lift arm 334 is positioned closer to the longitudinal axis 313 (i.e., more laterally inward) than the first end (not shown) of the lift arm 334. In other embodiments, however, other configurations are possible, including configurations in which a lift arm structure includes different or no inward jogs or includes only a single lift arm.

As well as providing an otherwise beneficial lift arm geometry, the inward jogs 398 of the lift arms 334 can also provide useful mounting features for the tilt actuators 333. Specifically, as shown in FIG. 12, a first end 374 of each of the tilt actuators 333 is rotatably coupled (e.g., pinned) to the lift arms 334 at a laterally extending boss 331 at the corresponding inward jog 398, with a second end 375 of each of the tilt actuators 333 rotatably coupled (e.g., pinned) to the implement carrier 372. Thus, as supported by the bosses 331, the tilt actuators 333 are disposed in a relatively protected position, laterally inward relative to the lift arms 334, for electronic control of the attitude of the implement carrier 372. Further, with appropriate configuration, including as shown in FIG. 12, laterally spaced tilt actuators (e.g., the actuators 333) can provide substantial clearance for a foot box of an operator station (not shown in FIG. 12, but an example of an operator station 455 can be seen in FIG. 13A) as can generally increase operator comfort as well as ease of ingress and egress relative to the operator station.

In the illustrated embodiment, similarly to the lift actuators 338, each of the tilt actuators 333 is an electrically powered ball screw actuator, with a fold-back motor configuration, and includes a motor 333a and an extendable portion configured as a ball screw 333b. The tilt actuators 333 are arranged with the motor 333a disposed outboard from the frame 310 relative to the ball screw 333b, i.e., the ball screw 333b is disposed between the motor 333a and the frame 310. Additionally, the first end 374 of each tilt actuators 333, which is connected to the frame 310, is a base end, whereas the second end 375, which is connected to the implement interface 370, is a rod end. In other embodiments, however, other configurations are possible. For example, a tilt actuator can be another type of electrical actuator, including a lead screw, belt driven, or other geared actuator, or can include with motors with in-line or perpendicular configurations. Moreover, a tilt actuator may be arranged on a power machine differently than illustrated.

In some embodiments, an implement may be directly attached to a lift arm structure, rather than attached to a lift arm structure via an implement carrier (e.g., as shown for the lift arms 334 and the implement carrier 372). In some such cases, electrical actuators can still be installed and used similarly to the tilt actuators 333 to adjust the attitude of an implement directly, rather than by adjusting an attitude of an implement carrier.

Figure 13A:
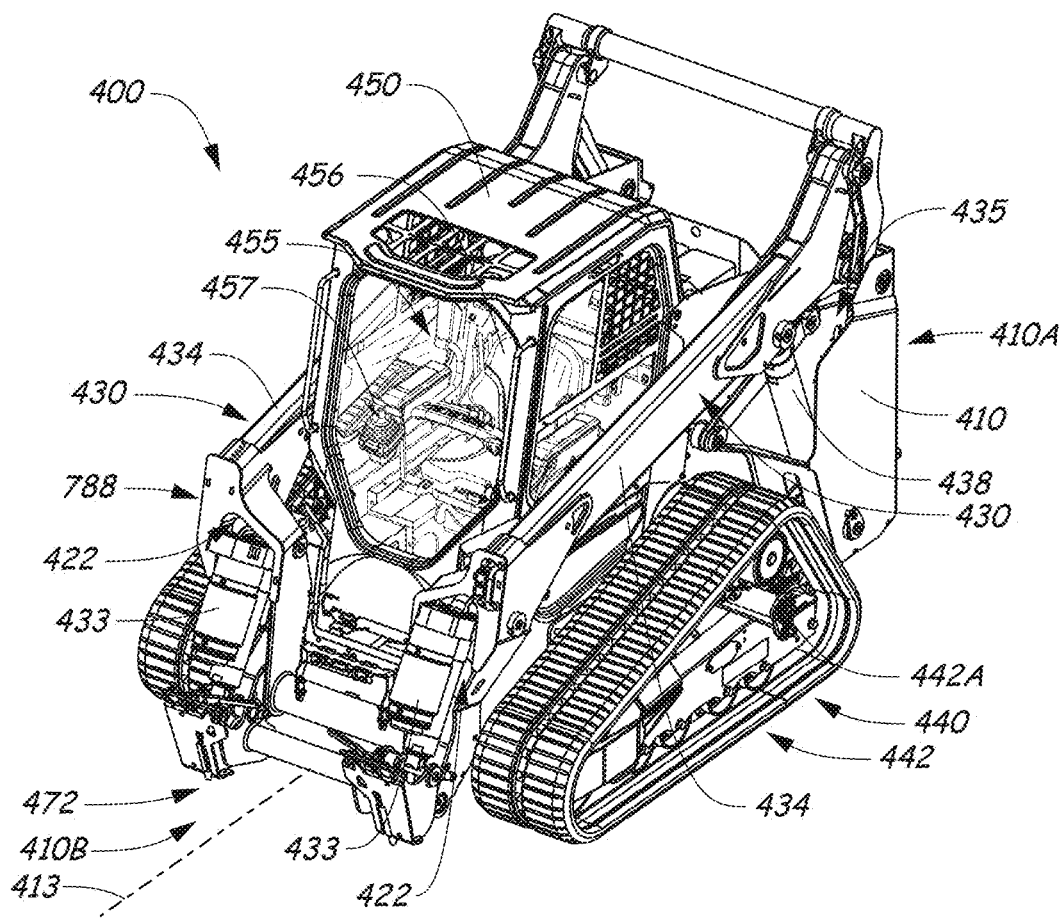
FIG. 13A is a perspective view showing generally a front of a power machine on which embodiments disclosed in this specification can be advantageously practiced.
Figure 13B:
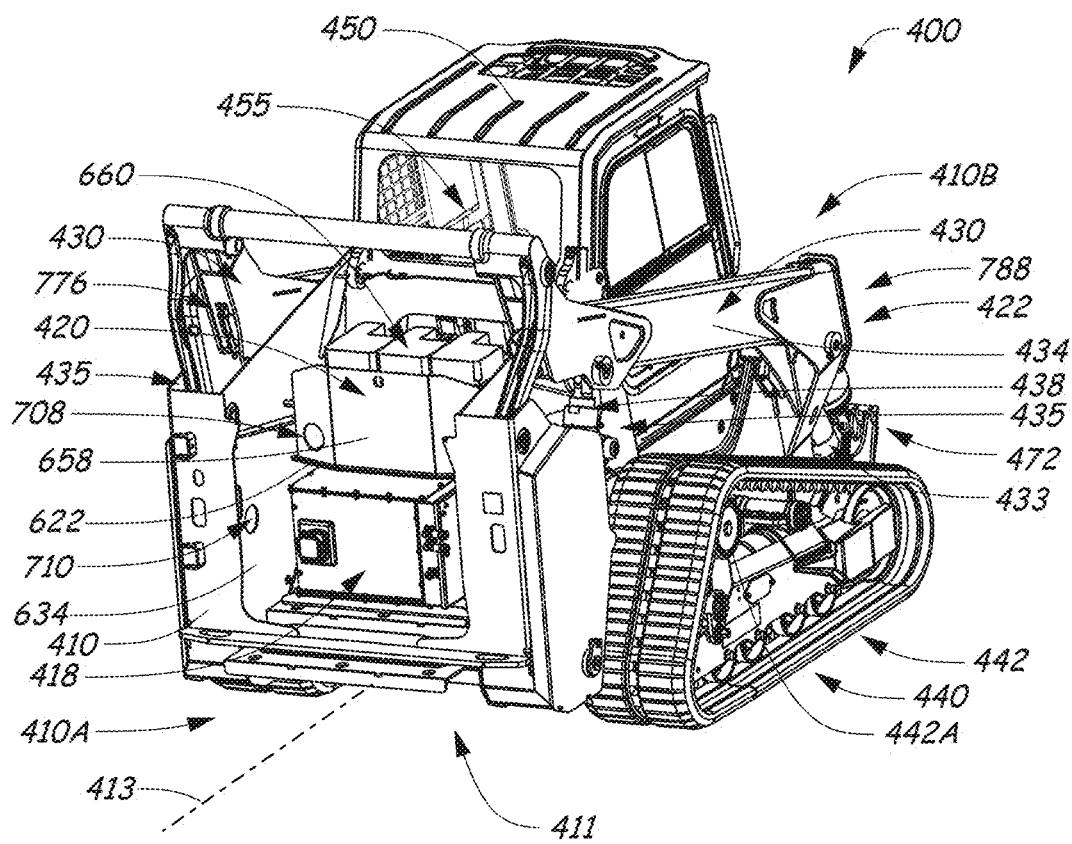
FIG. 13B is a perspective view showing generally a back of the power machine shown in FIG. 13A.
Figure 13C:
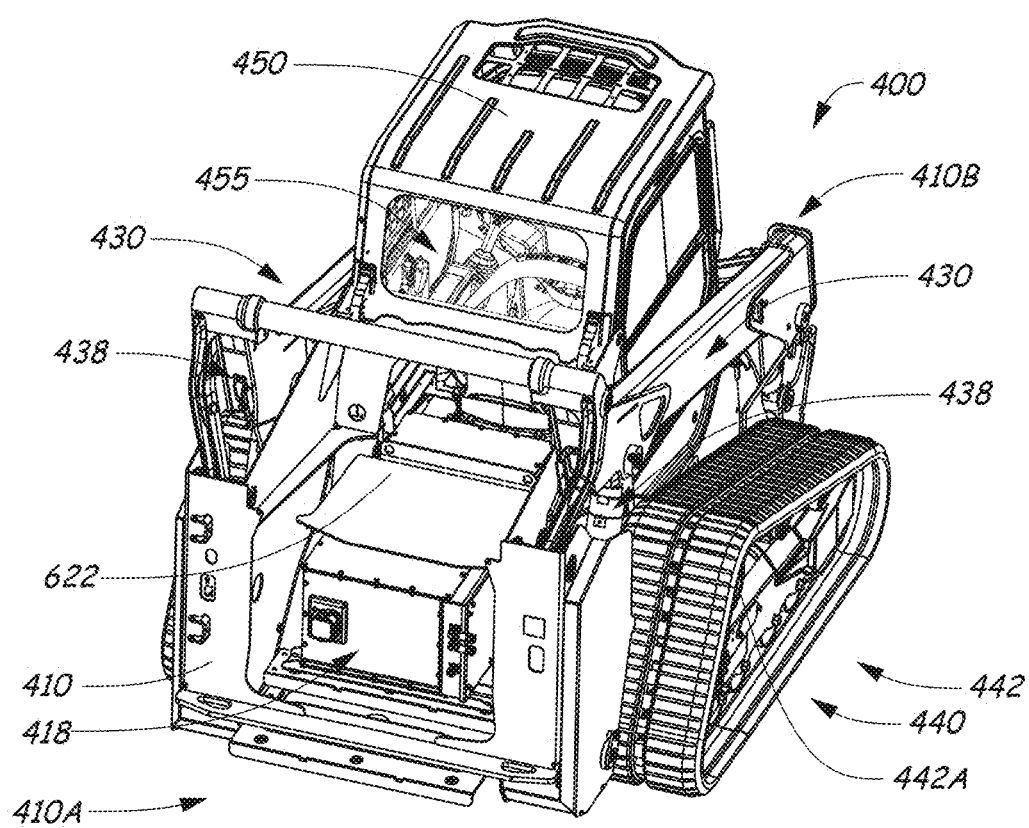
FIG. 13C is another perspective view showing generally a back of the power machine of FIG. 13A, without a controls subassembly.

FIGS. 13A-25B, 27, and 28 illustrate another example arrangement of components for an electrically powered power machine 400, which is one particular example of the power machine 100 illustrated broadly in FIG. 1 and discussed above, and relative to which the embodiments discussed herein can be advantageously employed. Referring to FIGS. 13A and 13B, the power machine 400 is similar in some ways to the loader 200 and the power machine 300 described above, and like numbers represent similar parts unless otherwise indicated below. For example, like the power machine 300, the power machine 400 includes a frame 410, a lift arm structure 430, and a traction system 440. The traction system 440 is similar in design and functionality to the traction system 440 of FIG. 8 and includes tractive elements 442 configured as endless tracks powered by electrical drive motors 442A. Similar to the frame 310 of power machine 300, the frame 410 supports an electrical power source for providing electrical power for operation of the traction system 440, the lift arm structure 430, and other subsystems of the power machine 400. In particular, the power source includes a battery assembly 418 and a controls subassembly 420.

Turning to FIG. 13B, in particular, the frame 410 supports a cab 450 that is structurally similar to cab 250 of power machine 200, and correspondingly includes an operator station 455 from which an operator can manipulate various control devices (i.e., an operator control system) to cause the power machine to perform various work functions. Similar to the operation station 255 of power machine 200, referring again to FIG. 13A, the operator station 455 can include an operator seat 456 and an operator input device 457 configured as a joystick, although other operator input devices can include other control levers or other devices of known configurations that an operator can manipulate to control various machine functions.

Further, still referring to FIGS. 13A and 13B, the power machine 400 includes tilt actuators 433 and lift actuators 438 supported on opposing lateral sides of the frame 410 so as to be substantially symmetrical about a central, longitudinal axis 413 (e.g., a centerline of the power machine 400). In particular, the lift actuators 438 are secured to the frame 310 within lift actuator pockets 435 that are disposed proximate a rear end 410A of the frame 410 in lateral alignment with (i.e., disposed vertically below) an associated lift arm 434 of the lift arm structure 430, an arrangement which substantially similar to the power machine 300 as shown in FIG. 6. While the illustrated embodiment includes a plurality of lift and tilt actuators disposed on opposing lateral sides of a frame, other configurations are possible. For example, in some embodiments, a power machine can include a single lift arm structure that can be moved by one or more lift actuators (e.g., on only one lateral side of a frame) or can include an implement carrier that can be moved by one or more tilt actuators (e.g., at a central location or on only one lateral side of a frame). Further, while the illustrated embodiment in FIGS. 13A and 13B includes a vertical path lift arm structure (i.e., a lift arm structure having a lift arm that is connected to a frame by one or more links of a linkage), other configurations are possible. For example, power machines according to some embodiments may include a radial path lift arm structures (i.e., a lift arm structure having a lift arm that is pivotally attached to the frame of a power machine at a single joint, or at multiple joints along a single pivot axis) and an actuator that is mounted to both the frame and the lift arm.

The lift arm structure 430 of the power machine 400 may be substantially similar in functionality to the lift arm structure 330 of FIG. 12. However, returning to FIG. 13A, contrary to the power machine 300 in FIG. 12, the tilt actuators 433 of the present embodiment are disposed within tilt actuator pockets 422 that are formed into the lift arm structure 430 and that are proximate a front end 410B of the frame 310 when the lift arm structures 430 are in the fully lowered configuration (see also FIG. 16A). In other embodiments, however, other configurations are possible besides those disclosed herein, including configurations with non-symmetrically arranged electrical lift or tilt actuators, single lift or tilt actuators, additional lift or tilt actuators, and lift arm structures without tilt or lift actuator pockets.

Figure 14:
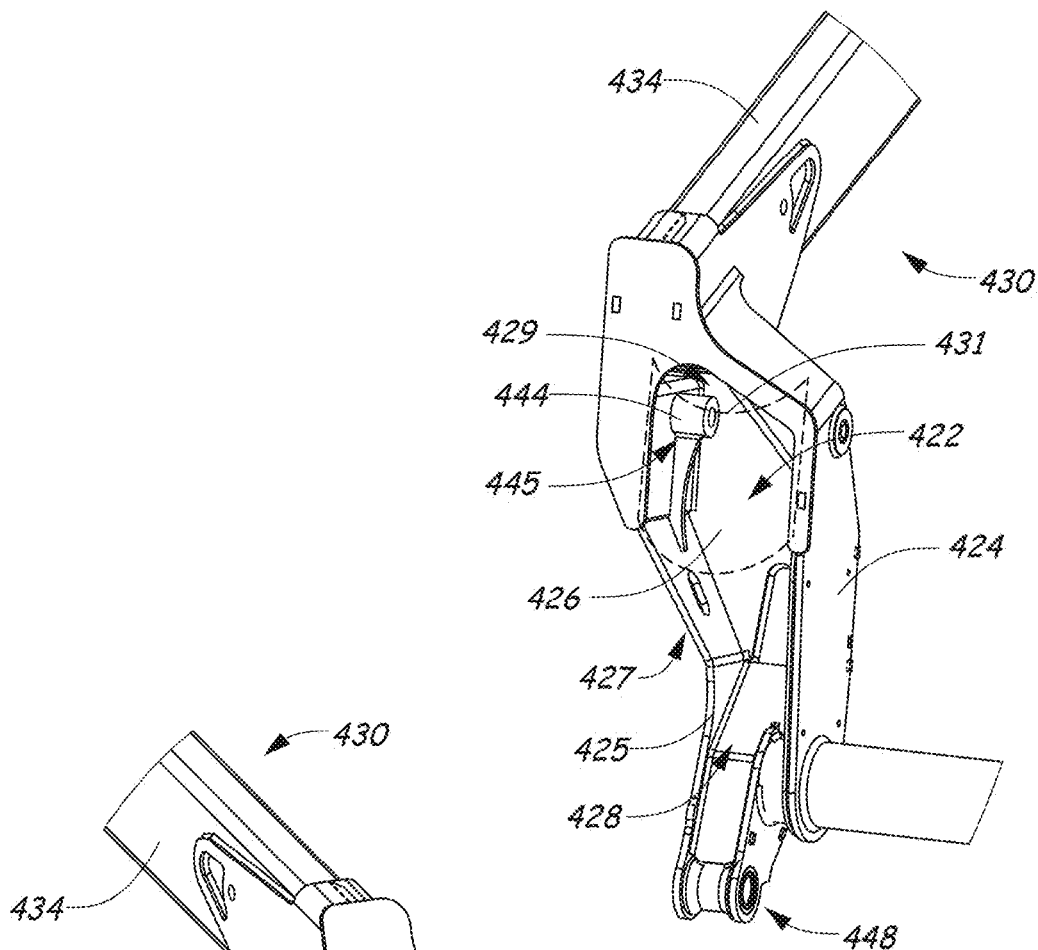
FIG. 14 is a perspective partial view showing generally a front of the lift arm structure of FIG. 13A, without tilt actuators.
Figure 15:
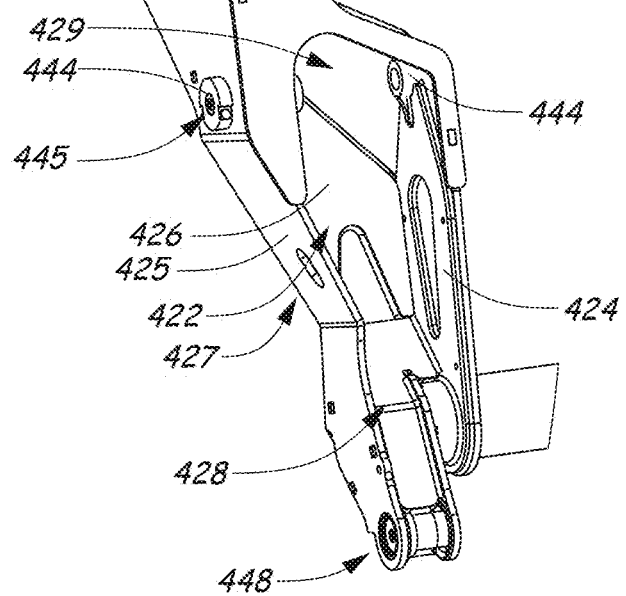
FIG. 15 is another perspective partial view showing generally the front of the lift arm structure of FIG. 13A.

Tilt actuator pockets can provide a variety of benefits for mounting actuators, including by potentially improving structural strength as well as facilitating ready implementation of double-sided pinned connections for actuators, shielding actuators from debris or damage from certain impacts, and (as also discussed relative to FIG. 12) providing beneficial spacing of lift actuators relative to an operator station. Referring to FIGS. 14 and 15, in the embodiment illustrated, each of the tilt actuator pockets 422 is formed as an elongate channel defined by a laterally inner wall 424, a laterally outer wall 425, and a base wall 426, with the inner wall 424 being disposed laterally inward from the outer wall 425. In the embodiment illustrated, the inner wall 424 is substantially planar while the outer wall 425 includes an inward jog 427. Correspondingly, the pocket 422 is tapered so that a width (and cross-sectional area) at a distal end 428 is smaller than a width (and cross-sectional area) at a proximal end 429. In other embodiments, however, other arrangements are possible, including pockets that are otherwise tapered. The lift arm 434 is tapered in this embodiment so that the width at the end of the lift arm is of the appropriate width to accept and secure an implement carrier 472 to the lift arm. Thus, in some embodiments, with different machine widths and/or implement carrier widths, the lift arm may have a different taper, or no taper at all.

In some embodiments, a pocket may fully enclose an actuator for at least a portion of a length of the actuator. For example, as shown in FIG. 14, in some cases the pocket 422 can include a cover 431 that is configured to extend over a distal end of the tilt actuator 433 (not shown in FIG. 14), so that the actuator is at least partially enclosed by the pocket and thereby generally shielded from the front, back, and both lateral sides. In some embodiments, a cover can be an integrally formed structure of a pocket on a lift arm. In some embodiments, a cover can be separately formed and attached to extend a pocket on a lift arm. In some embodiments, a cover can extend only partly around a particular portion of an actuator.

In addition to other benefits described above and below, the pockets 422 may be beneficial for reducing weight of the lift arm structures 430 while maintaining appropriate structural integrity of the lift arm structures 430. In this regard, for example, some pockets in lift arms can be formed to partly include shields that are made of separate, lighter material than the material of the lift arms.

Figure 16A:
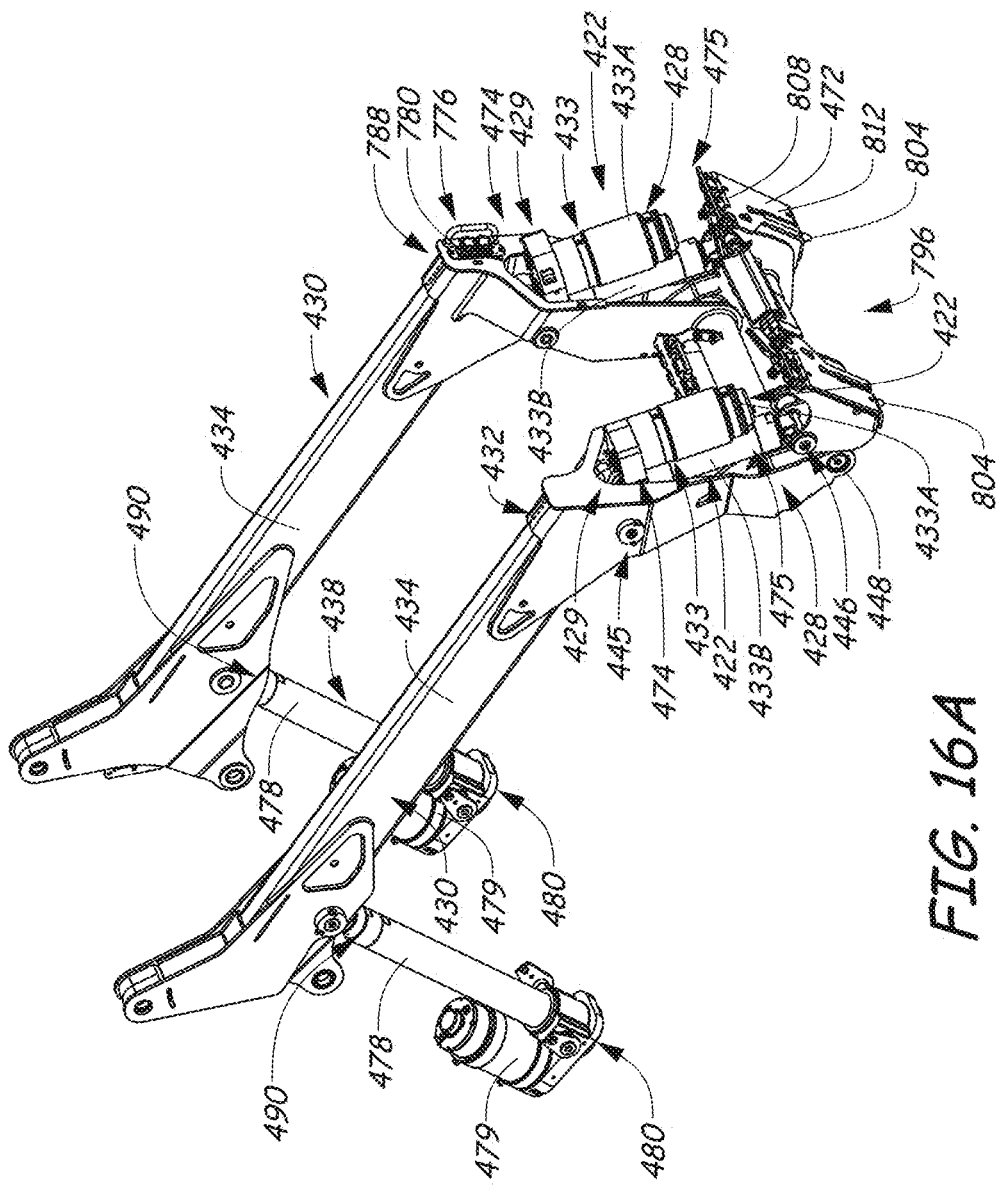
FIG. 16A is a perspective view of a lift arm structure for the power machine of FIG. 13A.

Referring to FIG. 16A, each pocket 422 is configured to partly receive the corresponding tilt actuator 433 therein, with a width and a length of the pocket 422 correspondingly is sized to receive at least part of the tilt actuator 433. In particular, in the illustrated embodiment, the proximal end 429 of each of the pockets 422 is wider than a corresponding width of a motor end of the corresponding tilt actuator 433. Thus, as further discussed below, at least a portion of the tilt actuators 433 can be received within and laterally (and rearwardly) shielded by the pockets 422 during operation.

Continuing, a first end 474 of each of the tilt actuators 433 is rotatably coupled (e.g., pinned) to the lift arms 434. Particularly, referring again to FIGS. 14 and 15, a pair of laterally extending bosses 444 are disposed at corresponding points on the inner wall 424 and the outer wall 425 proximate the proximal end 429 of the pocket 422, thereby defining a first attachment point 445 for the tilt actuator 433. In particular, as facilitated by the general configuration of the pocket 422, the first attachment point 445 provides a double-sided pinned connection, which can provide substantial strength and durability over an extended lifespan for the power machine 300.

Returning to FIG. 16A, a second end 475 of each of the tilt actuators 433 is rotatably coupled (e.g., pinned) to the implement carrier 472 at a second attachment point 446. Turning to FIG. 16B, in some installations, a line of actuation 447, i.e., axis of extension, of the tilt actuator 433 may be substantially parallel to the base wall 426 and/or the inner wall 424 of the corresponding pocket 422 (see, e.g., FIG. 14). In some installations, a line of actuation of a tilt actuator may be laterally aligned with, or be substantially laterally aligned with (i.e., be laterally separated from by less than the maximum width of the pocket 422) a pinned connection between an implement carrier and a lift arm structure (e.g., pivot point 448 of the implement carrier 472 in FIG. 16B). This arrangement, as facilitated by the location and geometry of the corresponding pocket(s), can help to reduce adverse moments or torsional stresses on relevant components, although other configurations are also possible.

Returning to FIG. 16A, while each of the tilt actuator 433 is shown with its first, base end 474 disposed at the proximal end 429 of the pocket 422, and its second, rod end 475 disposed at (and beyond) the distal end 428 of the pocket 422, the tilt actuator 433 may be installed in different arrangements. For example, a tilt actuator may be installed with its rod end and its base end respectively disposed at a proximate end and a distal end of a tilt actuator pocket. Likewise, while the tilt actuator 433 is shown with its motor 433A disposed outside of the pocket 422, and at a forward position relative to a corresponding screw 433B of the tilt actuator 433, the motor 433A may be arranged at different locations relative to the pocket 422 and the screw 433B.

In some cases, the illustrated laterally-spaced arrangements of tilt actuators as illustrated, including via use of lift actuator pockets, may provide notable spatial benefits. For example, the illustrated locations of the pocket 422, the screw 433B, and the motor 433A can generally increase available lateral space near the implement carrier 472 and a front end 410B of the frame 410, as compared to conventional arrangements. This arrangement may, for example, dispose the tilt actuators 433 at least partly (e.g., fully) laterally to the outside of the operator station 455 and may accordingly enhance access to the operator station 455 (see, e.g., FIG. 13A), provide increased clearance for a foot box of the cab 450, or provide other similar benefits.

As well as providing useful mounting features and a beneficial lift arm geometry, the tilt actuator pockets 422 of the lift arm structures 430 can also provide useful protection for the tilt actuators 433. Specifically, as shown in FIG. 16A, the tilt actuators 433 are substantially protected and encapsulated by the pockets 422, with complete lateral shielding for the pinned connections within the pockets 422, and partial shielding for other parts of the tilt actuator 433, particularly toward the motor ends of the tilt actuators 433, which may house more sensitive components and ingress points (e.g., for electrical connections). In some embodiments, a tilt actuator pocket may surround part of a tilt actuator (e.g., a motor end thereof) for at least 90 degrees, at least 120 degrees, or at least 180 degrees about the line of actuation of the tilt actuator, although other configurations are also possible. Further, as previously discussed, a pocket may fully enclose a tilt actuator for at least a portion of the actuator's length.

Figure 17:
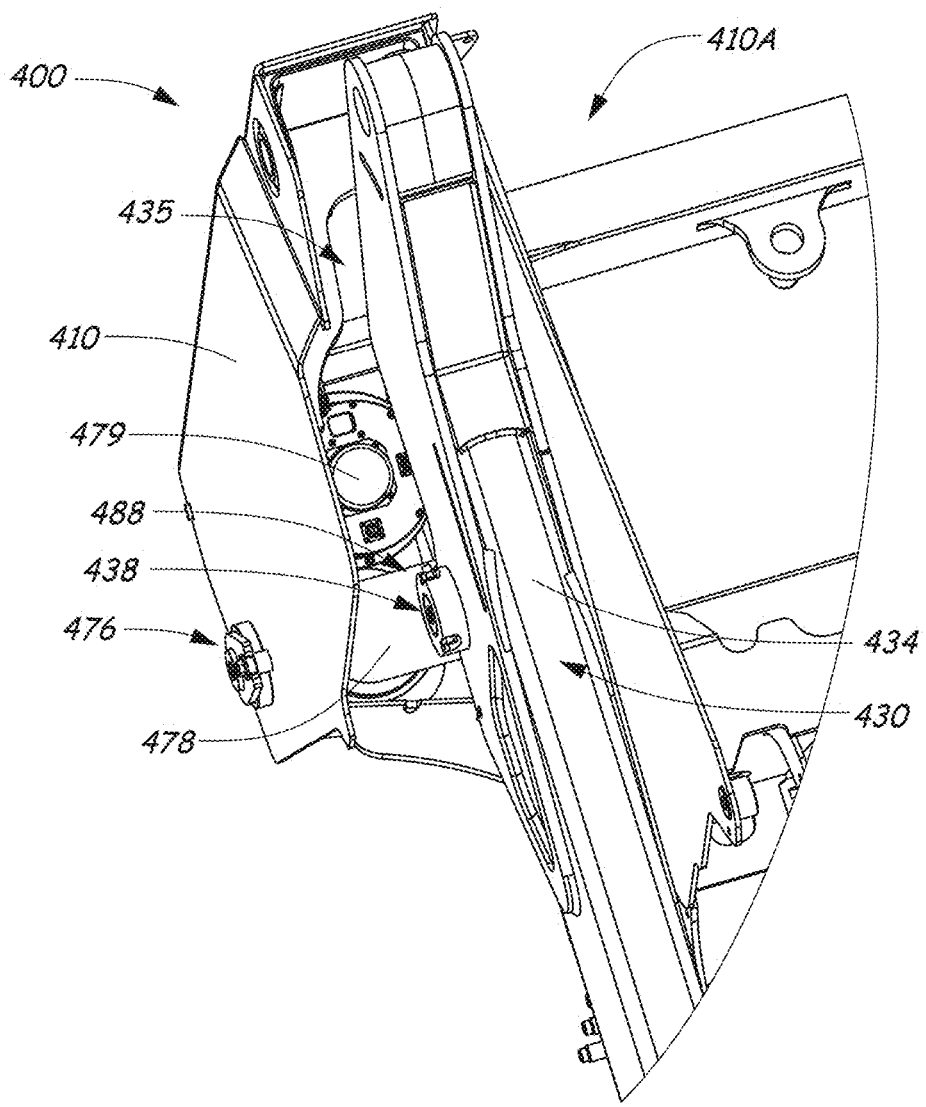
FIG. 17 is a perspective partial view showing generally a top of the power machine of FIG. 13A, including a lift actuator for a lift arm structure thereof.

Generally, the tilt actuators 433 of the power machine 400 operate substantially similarly to the tilt actuators 333 of the power machine 300 shown in FIGS. 5-12. Likewise, each of the lift arm structures 430 includes and can be moved by the electrical lift actuators 438, which are similar in functionality to the lift actuators 338 of FIG. 5. Turning to FIG. 17, the lift actuators 438 are secured to the frame 410 within lift actuator pockets 435 that are disposed proximate the rear end 410A of the frame 410 in lateral alignment with (i.e., disposed vertically below, as shown) an associated lift arm 434 of the lift arm structure 430. Each of the lift actuators 438 includes a screw 478 and an electrical motor 479 for selectively extending and retracting the screw 478. However, alternative configurations are possible.

Figure 18:
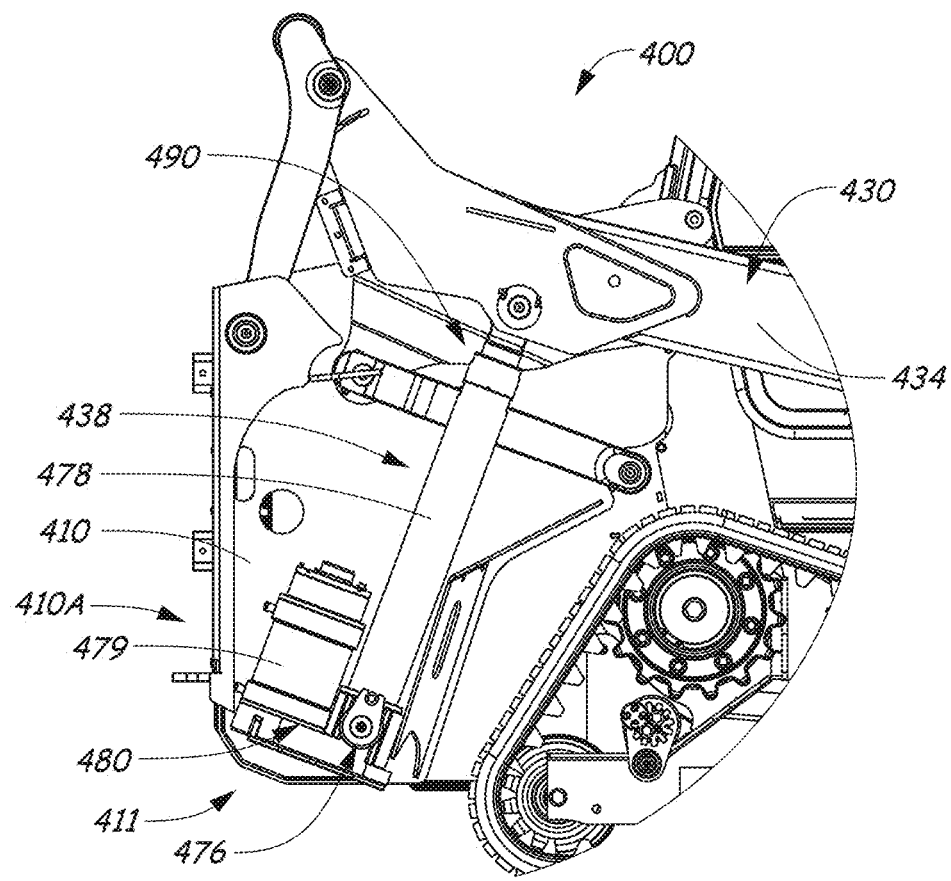
FIG. 18 is a perspective partial view showing generally a side of the power machine of FIG. 17, including the lift actuator for the lift arm structure.

Referring to FIG. 18, each of the lift actuators 438 in the illustrated embodiment is arranged so that its first, base end 480 is secured to the frame 410 and disposed proximate a lower portion 411 of the frame 410, and a second, rod end 490 of the lift actuator 438 extends out of the lift actuator pocket 435 to be secured to the lift arm structure 430. As noted above, this can provide beneficial shielding and ease of installation and maintenance in some cases. However, the lift actuator 438 may be arranged differently in alternative embodiments. For example, in some embodiments, a base end of a lift actuator may be connected to a lift arm structure, and a rod end of the lift actuator may be connected to a frame.

Continuing, pinned connections 476 between the lift actuators 438 and the main frame of the power machine 400 are disposed within the lift actuator pockets 435 so that the corresponding electrical motor 479 is disposed rearwardly from (i.e., disposed farther from the implement carrier 472 and the operator station 455 (see FIG. 13B)) the pinned connections 476 and the pinned connections between the screws 478 and the lift arm structure 430, at all operational orientations of the lift arm structure 430. As also generally discussed above, this can provide beneficial actuation characteristics (e.g., lift force curves) for operation of the power machine 400 as well as provide useful shielding and facilitate simpler installation and maintenance. However, in other embodiments, a lift actuator may be arranged differently, including relative to a lift actuator pocket. For example, a lift actuator may be installed so that its motor is disposed closer to an implement carrier than its screw.

Furthermore, in some embodiments, additional structures may be used to protect and/or separate the lift actuators 438. For example, in some embodiments, additional panels and/or brackets may be installed to substantially cover a motor of a lift actuator. Additionally or alternatively, panels may be used to divide a motor from a screw of a lift actuator. Moreover, while the present invention is generally configured for electrically powered power machines, a lift actuator can be a hydraulic actuator.

As discussed above, power machines according to embodiments of the present invention may use electric power to operate certain components or otherwise implement certain power machine functionality. For example, referring again to FIG. 13A, the power machine 400 according to the present embodiment include the lift actuators 438 and the tilt actuators 433 are electrically powered to selectively move the lift arms 434 and the implement carrier 472. Further, tractive elements 442 are electrically powered, via the drive motors 442A, to move the power machine 400. Accordingly, instead of a conventional diesel engine and hydraulics interface that is used in existing power machines, power machines according to embodiments of the present invention may require a battery and central controls. For example, referring to FIG. 19, the battery assembly 418 and the controls subassembly 420 are disposed in the frame 410 of the power machine 400 and configured for sending power and controls signals to components of the power machine 400, such as, e.g., the lift actuators 438, the tilt actuators 433, the drive motors 442A, etc.

Figure 20:
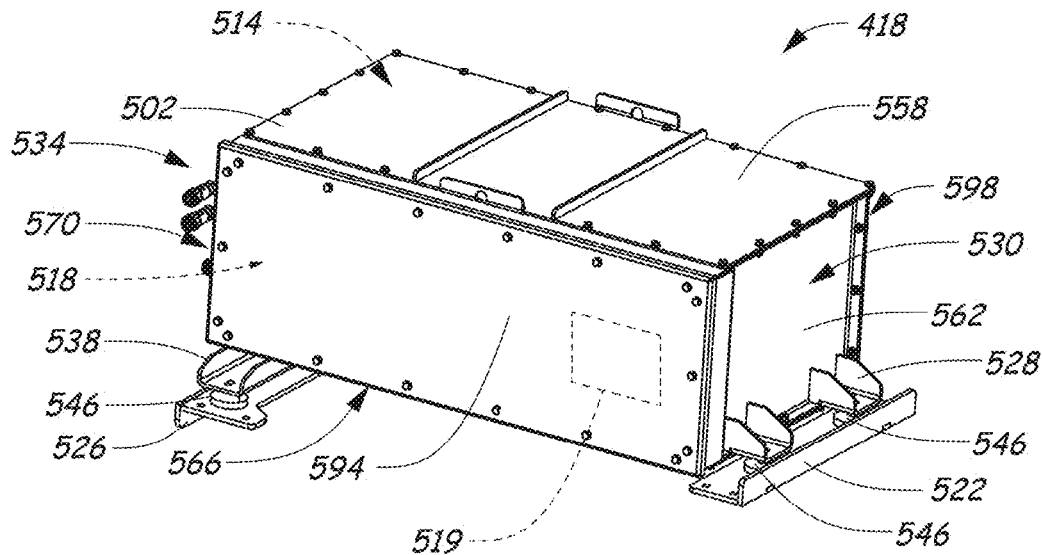
FIG. 20 is a perspective view of the battery assembly for use in the power machine of FIG. 19.

Turning to FIG. 20, the battery assembly 418 includes a battery housing 502 for holding and encasing a plurality of battery cells and a battery management system 519 that can be include a variety of components configured in known ways to measure voltage or current, balance cell loads, control charging and discharging, control communication between electrical components, etc. For example, the battery housing 502 defines a battery cells cavity 514 and a controls cavity 518 that are configured to house the plurality of battery cells and the battery management system, respectively. In the illustrated embodiment, the controls cavity 518 is positioned laterally relative to the battery cells cavity 514. Particularly, the controls cavity 518 is positioned next to the battery cells cavity 514 so that they are aligned along the same horizontal planes. Indeed, in the illustrated example, the controls cavity 518—including the battery management system 519—is disposed substantially (i.e., 90% or more, by volume or height) below the top of the battery cells cavity 514, the top of the battery housing 502, and the top of the battery assembly 418 as a whole.

Returning to FIG. 19, by positioning the battery assembly 418 so that the controls cavity 518 is next to the battery cells cavity 514, some controls may be accessible from a side of the power machine 400 (in some cases) or from the side of the battery assembly 418 when the battery assembly is removed from the power machine 400. Thus, this positioning can generally enhance the overall accessibility of the controls. Further, this configuration can allow access to battery cells from above without requiring a user to remove or work around the battery management system or other control components. Thus, for example, battery cells may be maintained and otherwise managed from the top of the power machine 400, including as may allow for particular cells to be replaced or otherwise maintained without requiring substantial removal of other components from the battery assembly 418 or the power machine 400.

Although the illustrated configuration can be particularly beneficial, including for the reasons discussed above, other embodiments of the invention may provide power machines having a battery assembly of different configurations. For example, a battery assembly may include a battery cells cavity disposed below a controls cavity. In this way, the battery cells may be accessed from sides of the power machines, and the battery management system may be accessed from the top of the power machine. Further, in some embodiments, a power machine may include a battery assembly that is accessible from a cab of the power machine.

Figure 21:
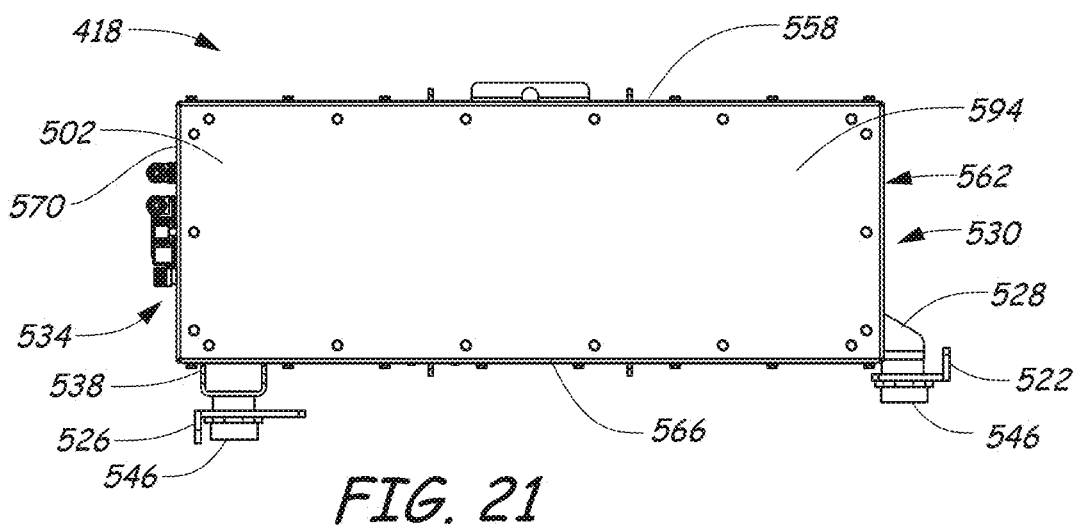
FIG. 21 is a side elevation view of the battery assembly of FIG. 20.

In some embodiments, certain mounting configurations for batteries can provide benefits for weight distribution, stability, and management of power and control signaling. Returning to FIG. 20, for example, the battery assembly 418 is secured to a first mounting structure 522 and a second mounting structure 526, which are used to secure the battery assembly 418 to the frame 410. Generally, mounting structures for battery assemblies can be configured as rigid bodies (e.g., integrally formed bodies) that are secured to and extend laterally from a main frame of a power machine. In this regard, for example, the first mounting structure 522 is an L-shaped elongate strut that can be secured, with fasteners, to securing members 528 that extend from a first end 530 of the battery housing 502. Similarly, the second mounting structure 526 is an L-shaped elongate strut that supports the battery assembly 418 at a second, opposing end 534 of the battery housing 502. In the illustrated embodiment, an intermediate mounting structure 538 is disposed between the second mounting structure 526 and the battery housing 502. Thus, as best seen in FIG. 21, the first mounting structure 522 and the second mounting structure 526 can be disposed in different horizontal planes, as can facilitate useful and stable mounting orientations within the power machine 400. In the illustrated embodiment, the first mounting structure 522 is elevated relative to the second mounting structure 526, but other configurations are possible.

The intermediate mounting structure 538 is a U-shaped elongate member that defines an elongate channel, in the embodiment illustrated, although a variety of other configurations are possible. The intermediate mounting structure 538 can be secured to the second mounting structure 526 with a series of fasteners, and the intermediate mounting structure 538 further engages the battery housing. For example, in some embodiments, the battery housing 502 may simply rest on top of the intermediate mounting structure 538, e.g., so the elongate channel opens toward the battery housing 502. In some embodiments, an intermediate mounting structure can be permanently secured to the battery housing, e.g., via welding. Additionally or alternatively, an intermediate mounting structure and a battery housing may be connected using one or more fastening means, such as, e.g., bolts, magnets, pins, latches, clamps, adhesives, or the like. While the illustrated embodiment includes the intermediate mounting structure 538 disposed between the second mounting structure 526 and the battery housing 502, alternative embodiments may omit an intermediate mounting structure.

As also illustrated in FIGS. 20 and 21, isolation mounts configured as discrete isolators 546, e.g., rubber isolators, can be arranged along the first mounting structure 522 and the second mounting structure 526 to dampen vibrations from the power machine 400 and reduce consequential noise. In alternative embodiments, however, more or fewer isolators than illustrated can be used. Further, other configurations are possible for dampening vibrations and reducing noise, including any variety of know isolation mount structures.

Figure 22:
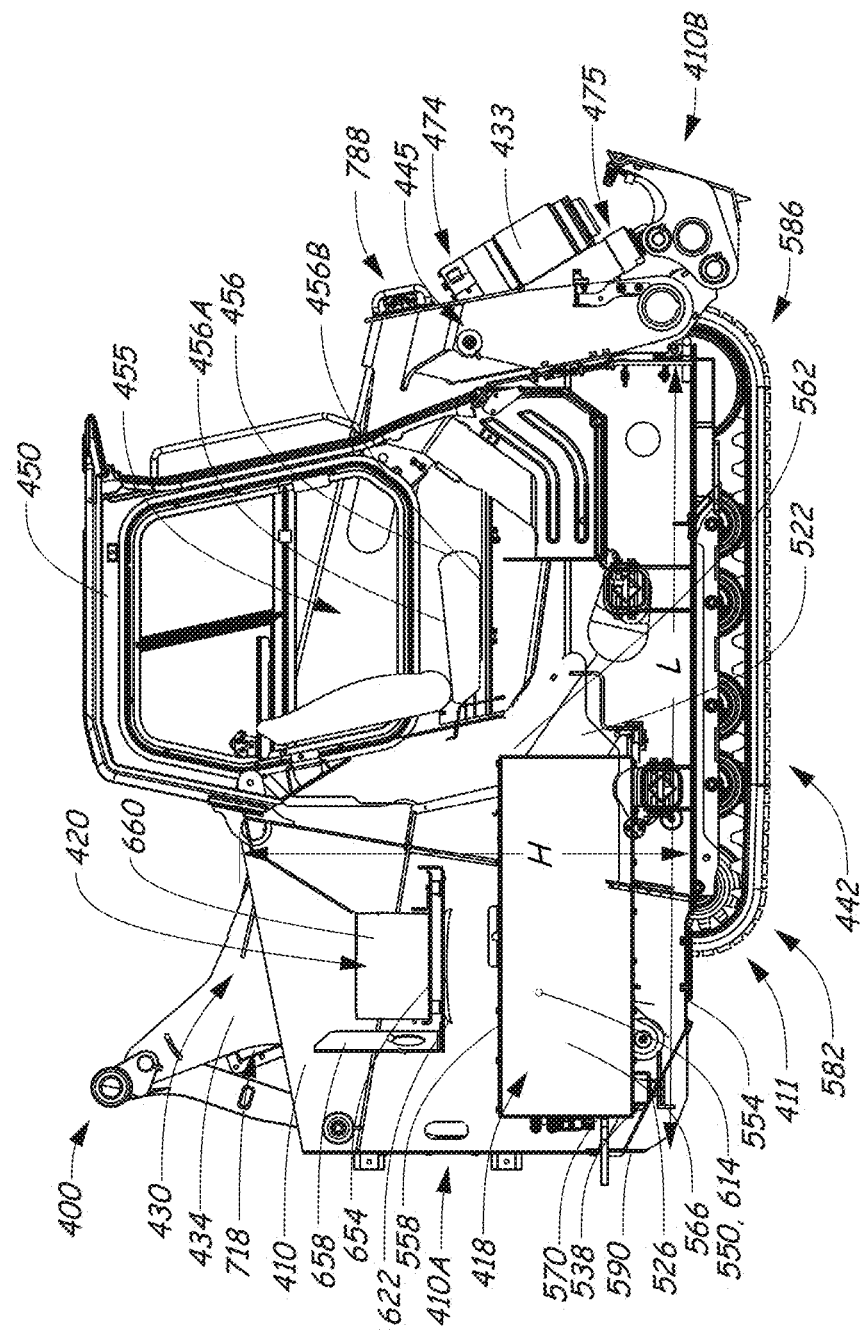
FIG. 22 is a cross-sectional view of the power machine of FIG. 13B.

Turning to FIG. 22, the battery assembly 418 is mounted to the frame 410 via the first mounting structure 522 and the second mounting structure 526. In the embodiment illustrated, the battery assembly 418 is disposed proximate the rear frame end 410A. For example, a center of volume 550 of the battery assembly 418 may be disposed to be spaced from a rear wall 590 of the frame 410 between 10% and 50%, between 15% and 40%, or between 20% and 30% of a total length L of the frame 410. Additionally, the battery assembly 418 is disposed proximate the lower portion 411 of the power machine 400. For example, the center of volume 550 of the battery assembly 418 can be spaced from a base 554 of the frame 410 between 15% and 50%, between 20% and 35%, or between 28% and 40% a total height H of the frame 410, the total height being measured from the base 554 of the frame 410 to an upper-most point of the frame 410. The illustrated height of the battery assembly 418 relative to the frame 410 can provide a beneficial weight distribution for the power machine 400 as a whole (e.g., to provide improved stability when operating on sloped terrain), appropriately balanced with ease of access for maintenance and replacement of part or all of the battery assembly 418. However, in other embodiments, a battery assembly can instead be placed relatively lower in a power machine.

Still referring to FIG. 22, the battery housing 502 includes a top wall 558, a front wall 562, a base wall 566, and a back wall 570. Each of the top wall 558, the front wall 562, the base wall 566, and the back wall 570 are substantially planar components in the illustrated embodiment, but other configurations are possible. The top wall 558 is disposed in a plane defined by the top wall 558 that extends substantially horizontally. In the illustrated embodiment, to provide particularly beneficial weight distribution, the top wall 558 is located below an upper (seating) surface 456A defined by the seat 456 (shown schematically in FIG. 22) but above a lower side 456B of the seat 456, at which the seat 456 is secured to the frame 410. Further, the top wall 558 is disposed generally above the tilt actuators 433. For example, in the illustrated embodiment, the top wall 558 is above the first attachment point 445 for the tilt actuators 433 when the lift arm structure 430 is in the fully lowered configuration.

Figure 19:
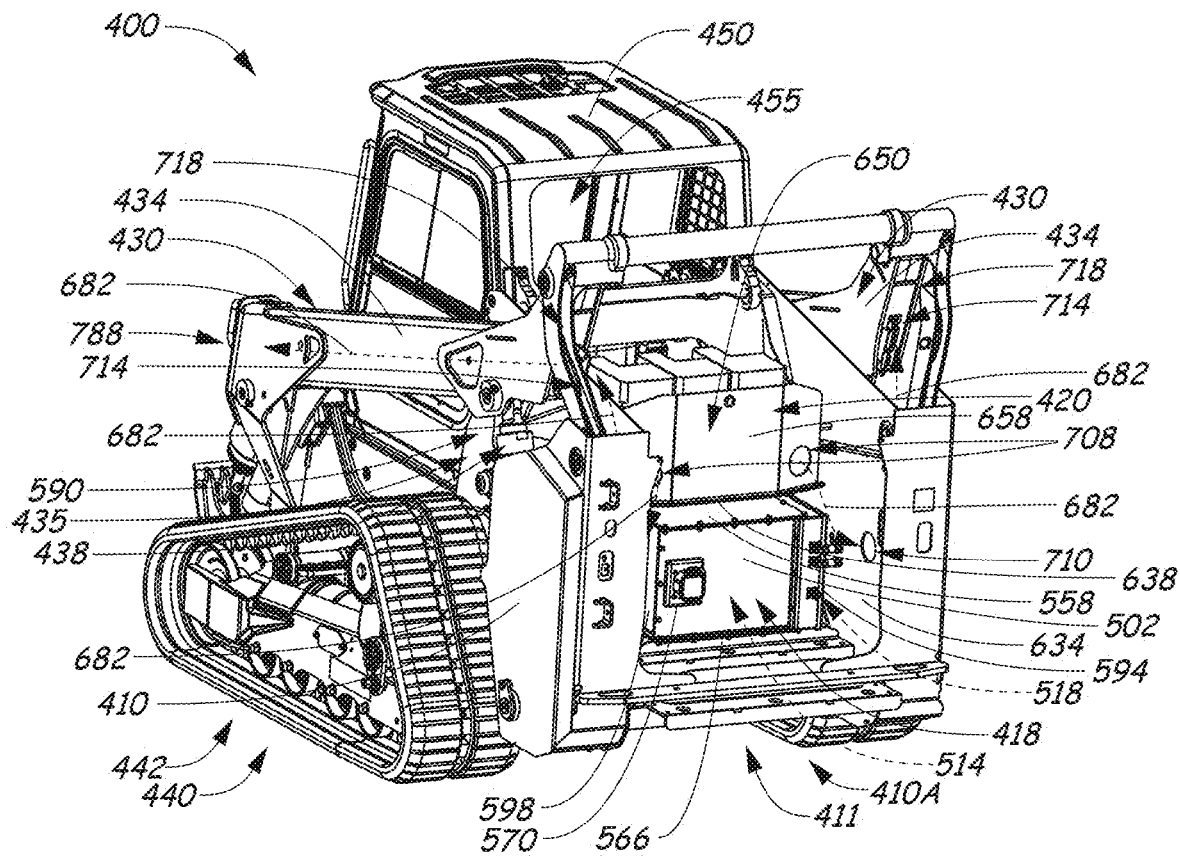
FIG. 19 is a perspective view showing generally a rear of the power machine of FIG. 13A, including a controls subassembly and a battery assembly.

In some embodiments, the particular location of a battery assembly relative to other components can provide improved overall stability for a power machine, including by way of the spatial considerations discussed above. As a further example, in the embodiment illustrated, the top wall 558 is positioned from the base 554 of the frame 410 between about 40% and 60% the total frame height H, but other configurations are possible. As also noted above, when the lift arm structure 430 is in a lowered configuration, e.g., with the lift actuators 438 (see, e.g., FIG. 18) completely retracted, the top wall 558 can be aligned with or below the first end 474 of the tilt actuators 433 and the corresponding attachment points 445 of the tilt actuators 433. Thus, for example, the center of volume 550 and a center of gravity 614 of the battery assembly 418 are generally supported above the frame 410, but also be disposed below that attachment points 445. Similarly, the centers of volume and gravity 550, 614 are also disposed below a lower side 456B of the seat, at which the seat 456 is secured to the cab 450. (Although the centers of volume and gravity 550, 614 vertically coincide in the illustrated embodiment, that may not be the case in other configurations.) Further, as best seen in FIG. 19, the top wall 558 (and the centers of volume and gravity 550, 614) are also disposed below the second end 490 and corresponding attachment points 445 of the lift actuators 438. Referring again to FIG. 22, the top wall 558 is also above the tractive elements 442 (and the drive motors 442A) and above a lower end of the cab 450 in the illustrated embodiment, although other configurations are possible.

Similarly to the top wall 558, the base wall 566 is disposed in a substantially horizontal plane defined by the base wall 566. In the illustrated embodiment, the base wall 566 is positioned from the base 554 of the frame 410 between 10% and 40%, between 15% and 25%, or less than 25% the total frame height H, but other configurations are possible. When the lift arm structure 430 is in the lowered configuration, the base wall 566 is above the second end 475 and the corresponding pivot point of the tilt actuator 433 and below the first end 474 and the corresponding pivot point of the tilt actuator 433. Further, as best seen in FIG. 19, the base wall 566 is disposed below the second end 490 and the corresponding pivot point of the lift actuator 438. Referring again to FIG. 22, the base wall 566 is disposed entirely below the cab 450 in the illustrated embodiment, but a base wall can be above or substantially in line with the cab in alternative embodiments. Further, the base wall 566 can be closer to the second end 475 of the tilt actuator 433 than the first end 474, when the lift arm structure 430 is in the lowered configuration. In some embodiments, the base wall 566 may be substantially in line with or lower than the second end 475 of the tilt actuator 433, in the lowered configuration.

The front wall 562, which is a portion of the battery housing 502 closest to the front frame end 410B, is disposed in a substantially vertical plane that is defined by the front wall 562. In the illustrated embodiment, the front wall 562 is disposed behind the cab 450, but in front of the lift actuators 438 (sec, e.g., FIG. 23), so that the battery assembly 418 as a whole is disposed fully rearward of the cab 450 and the operator station 455. As generally noted above, this arrangement may provide an optimal balance between weight distribution and accessibility. However, in some embodiments, the front wall 562 may be below or in line with an edge of the cab 450. Further, the front wall 562 can be spaced from the rear wall 590 of the frame 410 between 30% and 70%, between 35% and 50%, or between 40% and 48% the total length L of the frame 410. Accordingly, the front wall 562 can be aligned with a portion of the tractive elements 442 (and the drive motors 442A, not shown in FIG. 22) so that the vertical plane defined by the front wall 562 intersects the tractive elements 442 (and the drive motors 442A). For example, the vertical plane defined by the front wall 562 can intersect the tractive elements 442 closer to a rear end 582 of the tractive elements 442 than a front end 586 of the tractive elements 442. In some cases, however, the front wall 562 may be behind the drive motors 442A.

Figure 23:
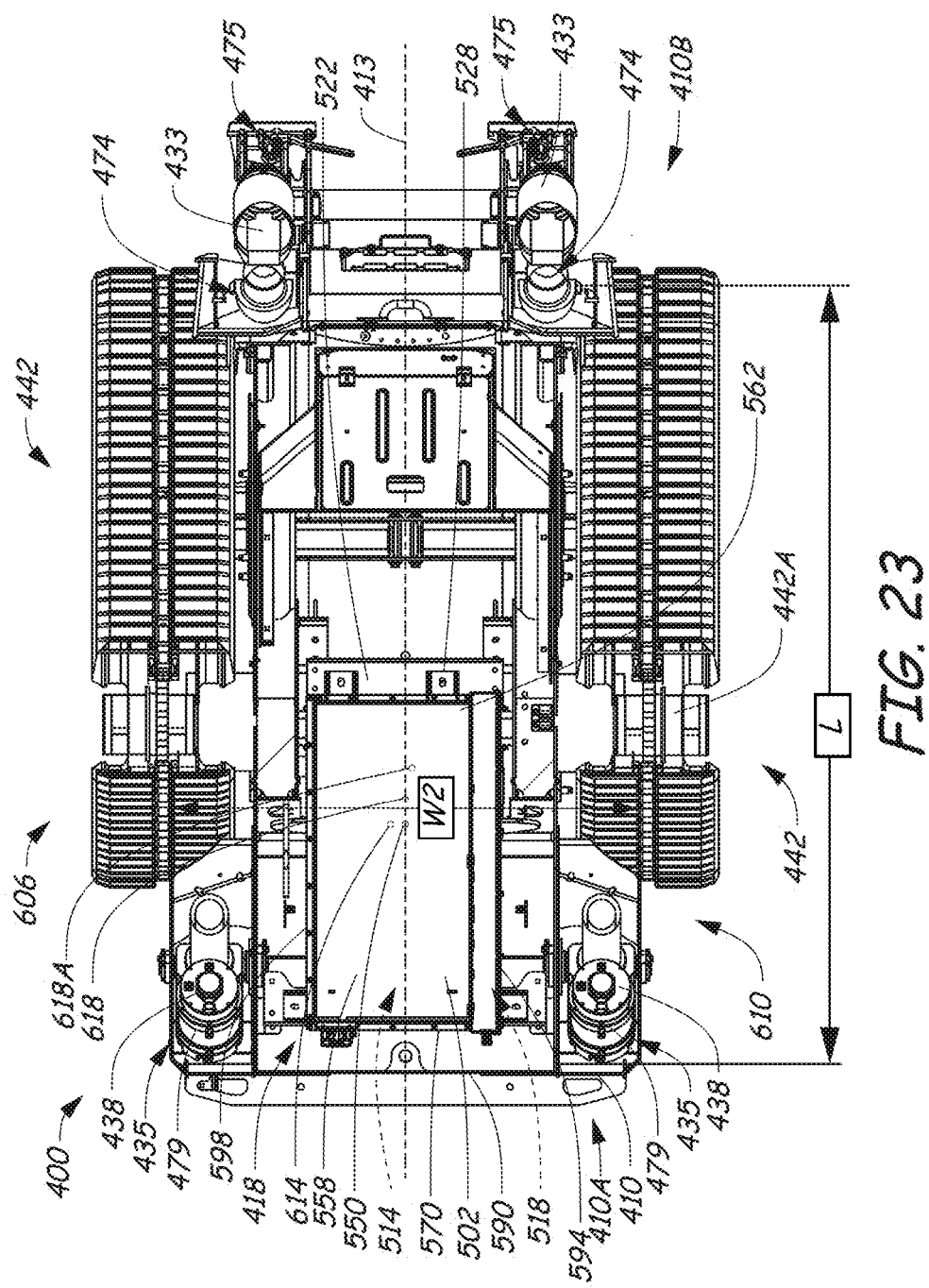
FIG. 23 is a cross-sectional view of the power machine of FIG. 13B.

The back wall 570 is a portion of the battery housing 502 disposed closest to the rear frame end 410A, behind the cab 450, and is similarly disposed in a substantially vertical plane that is defined by the back wall 570. The back wall 570 can be spaced from a rear wall 590 of the frame 410 less than 30% the total length L of the frame 410. In some embodiments, the back wall 570 can be spaced from the rear wall 590 less than 20%, less than 15%, or less than 8% the total length L of the frame 410. Accordingly, the back wall 570 can be disposed behind the tractive elements 442 and the cab 450. As best seen in FIG. 23, the plane defined by the back wall 570 can intersect the lift actuators 438. In some embodiments, the plane defined by the back wall 570 intersects only the motor 479 of the lift actuators 438. In some embodiments, the plane defined by the back wall 570 may be disposed behind the lift actuators 438.

Referring to FIG. 23, in particular, lateral walls, e.g., a right lateral wall 594 and a left lateral wall 598, of the battery housing 502 are similarly configured such that they are both substantially planar and are disposed within substantially vertical planes respectively defined by the lateral walls 594, 598. The lateral walls 594, 598 are substantially equally spaced laterally from the central axis 413 of the power machine 400, as may ensure an optimal (e.g., maximized) use of space for an electrical power source. In some embodiments, however, the lateral walls 594, 598 can be off-center, e.g., closer to a left side 606 of the frame 410 or closer to a right side 610 of the frame 410. Further, in some embodiments, the lateral walls 594, 598 can be spaced apart between about 30% and 50% or between 35% and 45% a total width W2 of the frame 410. In some embodiments, the lateral walls 594, 598 may be spaced apart less than 50% the total width W2 of the frame 410. In some embodiments, the lateral walls 594, 598 may be spaced apart more than 38% the total width W2 of the frame 410.

The locations of each of the top wall 558, the front wall 562, the base wall 566, the back wall 570, and the lateral walls 594, 598 in the illustrated embodiment is just one configuration of a battery assembly according to the present invention. Other configurations are possible, including configurations having battery housings of different shapes, sizes, positioning, and orientation.

Still referring to FIG. 23, the controls cavity 518, which includes the battery management system 519, is positioned proximate the right side 610 of the power machine 400 and defines the right lateral wall 594 of the battery housing 502. The controls cavity 518 may occupy about 10% a total volume of the battery housing 502. In some embodiments, the controls cavity may occupy less than 20%, less than 15%, less than 12%, or less than 10% the total volume of the battery housing 502. Accordingly, the battery cells cavity 514 is disposed proximate the left side 606 of the frame, defines the left lateral wall 598, and may occupy at least 60%, at least 70%, at least 80%, or at least 88% the total volume of the battery housing 502. As also noted above, placement of a controls cavity to the side of a battery assembly can provide improved access to battery cells, among other benefits. However, other configurations are also possible.

In some embodiments, the weight and volume distribution of a battery assembly can be selected to optimize an overall use of space and distribution of weight within a power machine. In this regard, for example, FIG. 23 illustrates the center of gravity 614 of the battery assembly 418 and a center of gravity 618 of the power machine 400 with the battery assembly 418, and a center of gravity 618A of the power machine without the battery assembly 418. In some embodiments, one or more of the centers of gravity 618, 618A can be below a lower side of a seat (e.g., the lower side 456B of the seat 456 in FIG. 22), can be below a top attachment point of a tilt cylinder (e.g., the attachment point 445 in FIG. 22), or can be otherwise advantageously arranged.

As discussed herein, in configurations for which a power machine includes a battery assembly, general reference to a center of gravity of the power machine is intended to refer to the center of gravity of the power machine that is calculated to include the contribution of the weight (and weight distribution) of the battery assembly. In this regard, for example, in configurations for which a power machine includes a battery assembly, a center of gravity of a power machine that does not account for the weight of the battery assembly will be expressly designated as such (e.g., as for the center of gravity 618A, discussed above).

In the illustrated embodiment, the center of gravity 618 of the power machine 400 is generally rearward of the cab 450 (not shown in FIG. 23) and the operator station 455. More specifically, one or more the centers of gravity 618, 618A of the power machine 400 without the battery can be spaced from the rear wall 590 of the frame 410 approximately 40%, approximately 45%, between 40% and 50%, between 35% and 55%, or between 38% and 45% of the total length L of the frame 410. Similarly, in some embodiments, one or more of the centers of gravity 618, 618A may be behind the drive motors 442A. Accordingly, due to the placement of the battery assembly 418 relatively near to the rear frame end 410A, the center of gravity 614 of the battery assembly 418 is behind the center of gravity 618A of the power machine 400 without the battery assembly 418, and contributes to a rearward location of the overall center of gravity 618 relative to the center of gravity 618A without the battery assembly 418. As generally noted above, this rearward relocation of the overall center of gravity 618 of the power machine 400 can help to improve overall stability and performance for the power machine 400, while also corresponding to improved access to the battery assembly 418 for maintenance or other purposes.

As another example, the center of gravity of a battery assembly can sometimes be located off-center relative to a power machine 400. For example, as shown in FIG. 23, the in the center of gravity 614 is closer to the left lateral wall 598 than the right lateral wall 594. Thus, when the battery assembly 418 is installed into the frame 410 in a centered alignment with the central axis 413, the battery center of gravity 614 may be off-center relative to the central axis 413, although still close to the central axis 413 in the illustrated embodiment (e.g., less than 15%, less than 10%, less than 5%, or less than 3% of the total width W2 of the frame 410 from the central axis 413 of the frame 410). Among other benefits, this off-centered alignment of a center of gravity of a battery assembly can in some cases help to balance for other aspects of weight distribution of a power machine. For example, the center of gravity 618A of the power machine 400 without the battery assembly 418, in the illustrated embodiment, is slightly off-centered relative to the central axis 413. However, because of the oppositely off-centered orientation of the center of gravity 614 of the battery assembly 418, the overall center of gravity 618 of the power machine 400 is substantially centered laterally, i.e., on or within 10% of the total width W2 from the central axis 413.

In some embodiments, a mounting system to secure a battery assembly to a power machine can include structural features that also provide balance relative to the location of particular centers of gravity, or that are otherwise optimized. For example, with reference to FIGS. 20, 21, and 23 collectively, a forward set of two of the isolators 546 are disposed toward the front of the battery assembly 418, with a first of the isolators 546 on a first lateral side of each one of the centers of gravity 614, 618, 618A and a second of the isolators 546 on a second lateral side of the centers of gravity 614, 618, 618A. Similarly, a rearward set of two of the isolators 546 are disposed toward the back of the battery assembly 481, with a third of the isolators 546 on the first lateral side of the centers of gravity 614, 618, 618A and a fourth of the isolators 546 on the second lateral side of the centers of gravity centers of gravity 614, 618, 618A. Further, the forward isolators 546 are disposed forward of the each of the centers of gravity 614, 618, 618A and the rearward isolators 546 are disposed rearward of each of the centers of gravity 614, 618, 618A. Collectively and individually (e.g., relative to each of the sets of isolators 546 or to any of the centers of gravity 614, 618, 618A), this arrangement can further help to improve stability and accessibility for the power machine 400.

As generally noted above, a power machine may generally include electronic components to power and control electrical actuators and other components. In some embodiments, some or all of these electronic components can be disposed at particularly beneficial locations on a power machine, or can be included in a subassembly that can be readily assembled separately from a power machine and then efficiently installed onto the power machine as a single unit. Returning to FIG. 22, for example, similarly to the battery assembly 418, it may be beneficial to dispose the controls subassembly 420 toward the rear frame end 410A, including to place the controls subassembly 420 close to the battery assembly 418, provide for easy access for maintenance or other operator operations, and to allow for efficient routing of electrical wiring for power and control signals. As illustrated, for example, the controls subassembly 420 is disposed behind the cab 450 within the rear-most half of the frame 410. Additionally, the controls subassembly 420 is disposed above the battery assembly 418. In some embodiments, the controls subassembly 420 may be substantially laterally aligned with the battery assembly 418 so that it is similarly positioned laterally relative to the frame 410 as the battery assembly 418 (e.g., directly above or below the battery assembly 418). This configuration may provide substantial spatial efficiency and well as improved access to the battery assembly 418 and to the control subassembly 420, although other configurations are also possible.

In some embodiments, a control subassembly can be supported by a separate component that is itself directly secured to a frame of a power machine, including as can allow the control subassembly to be readily installed or removed as a unit, rather than as multiple components. In the illustrated embodiment, for example, the controls subassembly 420 is support by a frame plate 622, which can be secured to the frame 410. In particular, the frame plate 622 is bolted to the frame 410 in the illustrated embodiment, which can allow the frame plate 622 to be quickly and easily removed for enhanced access to the battery assembly 418. However, other known attachment mechanisms are also possible.

In some embodiments, a frame plate or other support component for a control subassembly can be configured to provide a particularly stable platform for the control subassembly at a particularly beneficial location within a power machine. For example, the frame plate 622 provides a generally planar upper support surface that is directly above the centers of volume 550 and gravity 614 of the battery assembly 418 and rearward of the centers of gravity 618, 618A of the power machine 400. In some embodiments, the frame plate 622 can be spaced from the base 554 of the frame 410 between 40% and 70%, between 45% and 60%, or between 50% and 65% the total height H of the frame 410. In some embodiments, the frame plate 622 may be above the tilt actuators 433 when the lift arm structure 430 is in the lowered configuration, but below the pinned connection between the lift actuator 438 and the lift arm structure 430. For example, as best seen in FIG. 19, the plane defined by the frame plate 622 intersects the lift actuators 438 below the lift arm structure 430.

Figure 24:
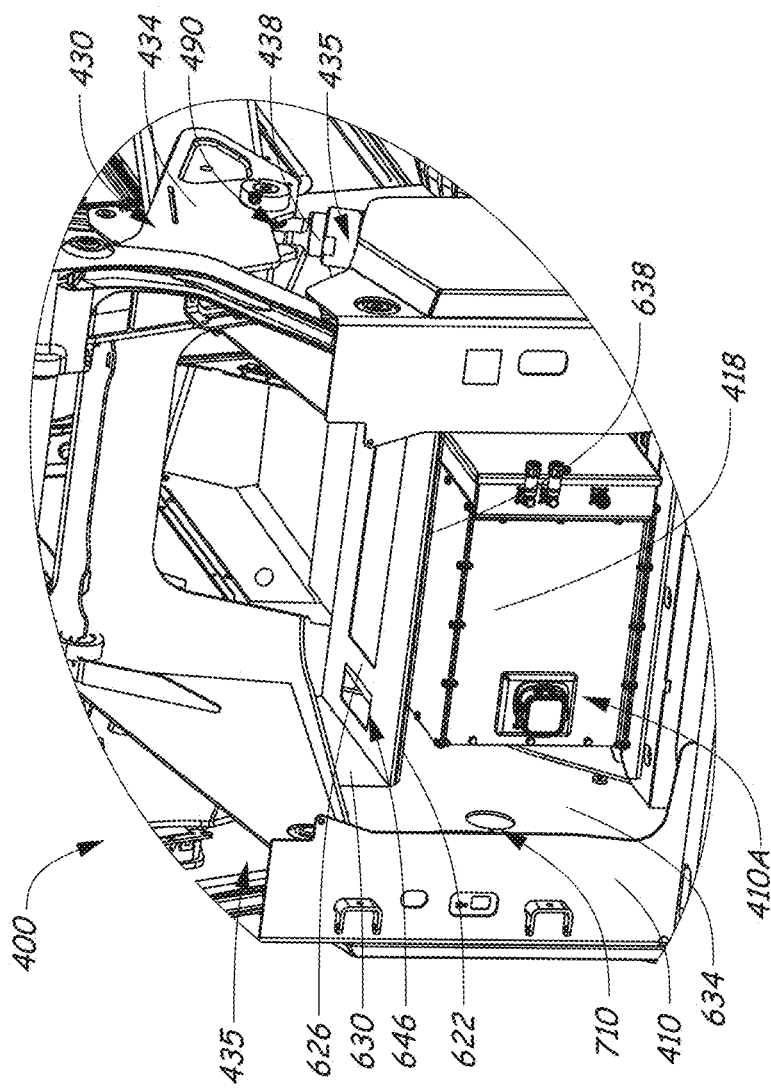
FIG. 24 is a perspective partial view showing generally a rear of the power machine of FIG. 13C.

In different embodiments, a frame plate can exhibit a variety of configurations. FIG. 24 illustrates the frame plate 622 in detail. In particular, the frame plate 622 includes a substantially planar base portion 626 with flanged lateral edges 630. The flanged lateral edges 630 are bolted to opposing inner walls 634 of the frame 410 in the illustrated embodiment, but they may be secured to the frame 410 differently in alternative embodiments. The flanged lateral edges 630 are generally tapered to correspond to the angle of the frame 410, but they made be shaped differently in alternative embodiments. Long edges 638 of the frame plate 622 additionally include flanges that extend substantially along a length of the frame plate 622. Accordingly, when secured to the frame 410, the flanges extend substantially entirely between the opposing inner walls 634. Moreover, the frame plate 622 in the illustrated embodiment includes a plurality of openings 646, which may reduce the weight of the frame plate 622 or, in some cases, allow for routing of wiring or other conduits. While the illustrated embodiment includes three openings 646, embodiments of the present invention may include frame plates with more or fewer holes of any configuration. Further, a frame plate in some embodiments can be formed from multiple separate components that are assembled, including components that separately correspond to the flanged lateral edges 630 and the base portion 626.

As also noted above, and referring to FIG. 25A, the frame plate 622 is generally provided to support the controls subassembly 420, with the control subassembly 420 generally behind the operator station 455 and above the battery assembly 418. Depending on the needs of a particular power machine, the controls subassembly 420 can include a plurality of modules, which are generally supported by a controls support structure 650 and are thereby also supported by the frame plate 622. In some cases, modules supported by the controls support structure 650 that is configured to support a plurality of control modules and components, which are generically identified as control modules 660 in the illustrated embodiment.

Figure 25A:
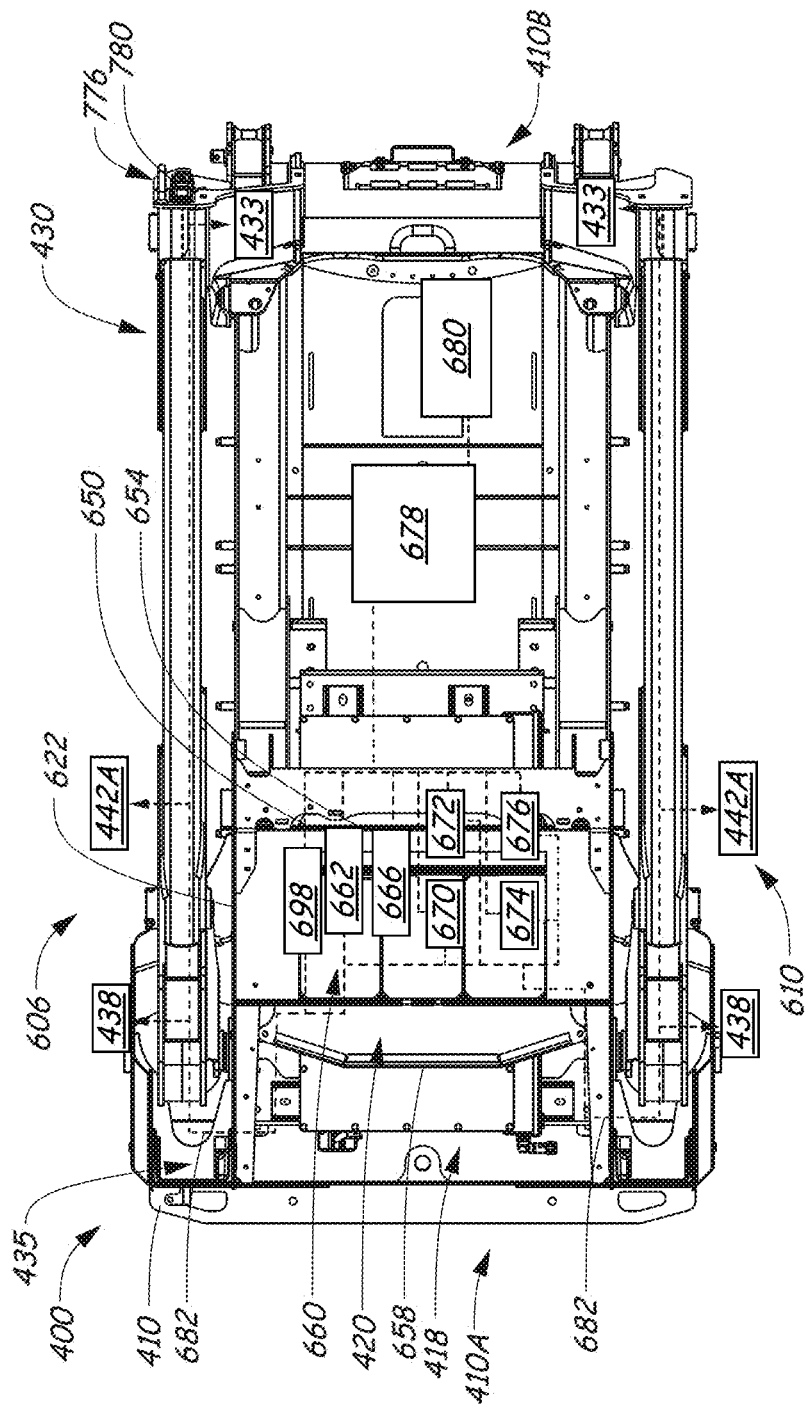
FIG. 25A is a top plan view of the power machine of FIG. 13B, including a schematic view of a controls subassembly and without a cab.

In some embodiments, as illustrated in FIG. 25A, the control modules 660 can include a plurality of motor controllers, e.g., a first motor controller 662 for controlling one of the drive motors 442A, a second motor controller 666 for controlling the other of the drive motors 442A, third and fourth motor controllers 670, 672 for separately controlling each of the tilt actuators 433, and fifth and sixth motor controllers 674, 676 for separately controlling each of the lift actuators 438.

The power machine 400 additionally includes an electric vehicle central module ("EVCM") 678, which is provided on the frame 410 separate from the control modules 660 in the illustrated embodiment, although other arrangements are possible. For example, in some embodiments, an EVCM may be arranged on a support plate with one or more control modules. The EVCM 678 is configured to electronically communicate with each of the motor controllers 662, 666, 670, 672, 674, 676, including for control or monitoring of relevant actuators (e.g., the lift actuators 438, the tilt actuators 433) or other motors (e.g., the drive motors 442A). Further, the EVCM 678 is configured to receive command signals from operator controls 680 (e.g., the joystick 457 of FIG. 13A) for controlling and powering various components, e.g., via the motor controllers 662, 666, 670, 672, 674, 676.

Each of the motor controllers 662, 666, 670, 672, 674, 676 can be electrically connected to components of the power machine 400, e.g., for transmission of power signals and/or control signals. For example, each of the third and fourth motor controllers 670, 672 is electrically connected to a respective one of the tilt actuators 433, and each of the fifth and sixth motor controllers 674, 676 is electrically connected to a respective one of the lift actuators 438. Similarly, the first and second motor controllers 662, 666 are respectively electrically connected to the drive motors 442A. Arrows 682 are used herein to illustrate the electrical connections between the control modules 660 and the various components of the power machine 400. The arrows 682 may represent one or more wires for transmitting both control signals and power to one or more components.

In some embodiments, multiple wires can be routed along similar paths to provide power and control signals to different components. For example, one or more wire bundles or wire harnesses can be routed from the control modules 660 to different components of the power machine 400. In some cases, multiple wires can be collectively routed away from the control modules before being separately routed to different areas and/or components of the power machine. For example, as further discussed below, a collection of wires, including wires for control and power signals for each of the drive motors 442A, the lift actuator 438, and the tilt actuator 433 that correspond to the left side 606 of the frame 410 of the power machine 400 can be collectively routed from the control subassembly 420 into the lift actuator pocket 435 on the left side 606 of the frame before splitting/separated into at least a first subset of one or more wires to power and control the lift actuator 438 and a second subset of one or more wires to power and control the tilt actuator 433 or an implement (not shown) attached to a distal end of the lift arm structure 430.

In some embodiments, a controls subassembly can include a cooling system. For example, in some embodiments, a cooling system 698 can be mounted to the base plate 654 (and supported thereby relative to the frame 410) along with one or more other control modules. Generally, a cooling system can be any type of system configured to cool components of a machine (e.g., one or more controllers or one or more actuators, as necessary). For example, the cooling system 698 can include a heat exchanger, a reservoir for coolant, and a pump configured to pump the coolant through one or more hoses that are routed to various components of the power machine 400. Accordingly, with reference to the present embodiment, coolant hoses can extend from the cooling system 698 to one or more of the motor controllers 662, 666, 670, 672, 674, 676 shown in FIG. 25A or to one or more of the actuators 433, 438, 442A.

In some embodiments, coolant hoses can be configured in particular to route coolant from a cooling system to tractive actuators, such as, e.g., the drive motors 442A identified in FIG. 25A, for directly cooling the tractive actuators, although other routing (e.g., different than routing for electrical signals) may also be possible. In some embodiments, coolant hoses may be routed to additional or alternative components of a power machine. Further, embodiments of the invention may include a cooling system disposed at a variety of locations throughout a frame of a power machine. For example, a cooling system can be mounted to a base plate, to a frame plate, directly to a frame, or to a different structure.

Figure 25B:
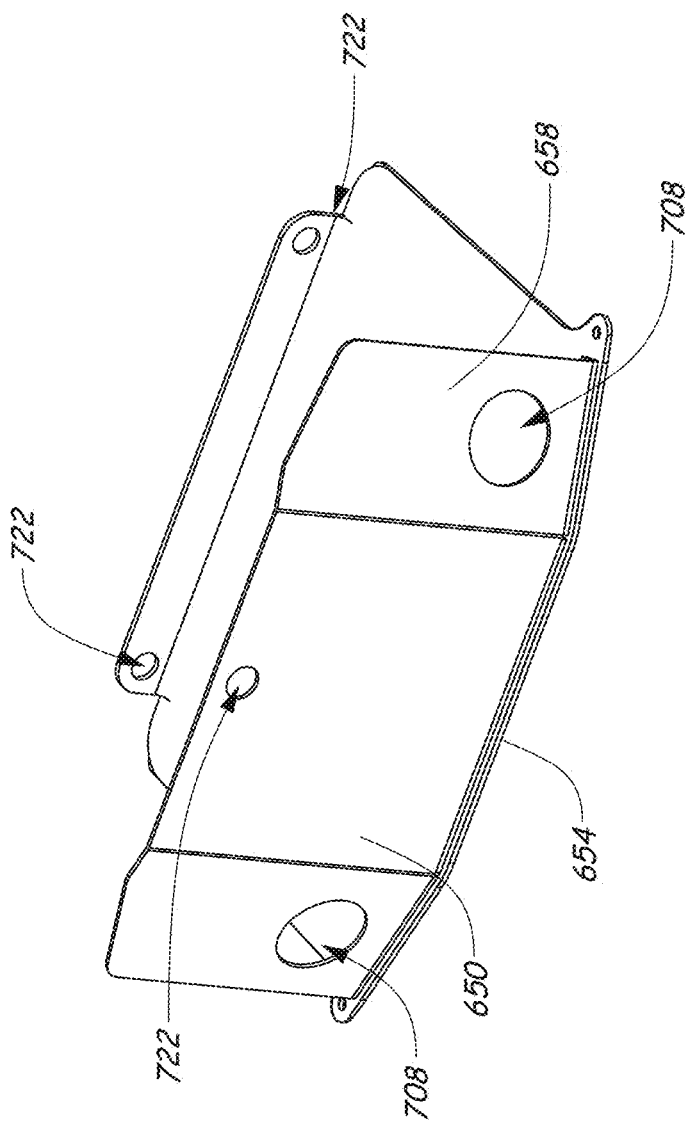
FIG. 25B is a perspective view of the controls subassembly of FIG. 25A.

FIG. 25B illustrates additional aspects of the controls support structure 650 in detail. In this regard, it is noted that the schematic representation of the control modules 660 shown in the figures (e.g., FIG. 22) is provided for example only. That is, while the figures illustrate a single cube representative of the control modules 660, control modules according to embodiments of the invention may include one or more components, structures, or modules, which may or may not fully fill or extend beyond the spatial area represented by the representation of the control modules 660 in the figures.

Generally, a controls support structure can be formed to include a rigid support that can support the weight of relevant control modules, including during transport of the control modules and the control support structure as a single unit for installation into a power machine. In this regard, in the illustrated embodiment, the controls support structure 650 includes a base plate 654 and a rear plate 658, which may be integrally formed or otherwise made unitary. For example, in some embodiments, each of the base plate 654 and the rear plate 658 may be substantially planar (or otherwise configured) component, with appropriate attachment features (e.g., flanges, bosses, etc.), and the rear plate 658 may be secured to the base plate 654, e.g., using fasteners, adhesives, welding, etc. The rear plate 658 is a plate-like structure with angled portions in the illustrated embodiment, but other configurations are possible.

Referring also to FIG. 19, the rear plate 658 includes openings 708 configured for electrical wires, coolant hoses, or other conduits to be routed through. For example, wires and coolant hoses, which are visually represented by the arrow 682, may extend from the controls subassembly 420 through the openings 708 before being routed to various other component (e.g., actuator or traction motors). Further in this regard, side openings 710 are also defined by the inner walls 634 of the frame 410 and configured for receiving the wires and hoses, e.g., as indicated the arrows 682. The side openings 710 generally lead to the lift actuator pockets 435, so that one or more of the electrical wires can electrically connect the lift actuators 438 to the controls subassembly 420 (or, in some cases, to provide coolant flow to and from the lift actuators 438). In contrast, wires, hoses or other conduits can alternatively be routed to traction motors (e.g., similar to the motors 326 of FIG. 8) without necessarily passing through the lift actuator pockets 435.

In some cases, wires or hoses can be routed from the openings 708 (or otherwise) through the lift arm structures 430 in order to provide electronic communication or coolant flow to devices toward the front end 410B of the main frame 410. For example, from the lift actuator pockets 435, one or more of the electrical wires can be routed into the lift arms 434 via one or more lift arm openings 714 that are disposed at corresponding rear ends 718 of the lift arms 434. Thus, for example, electrical wires may reach the tilt actuators and an implement by extending along one or more the lift arms 434, within an enclosed interior volume of the relevant lift arm 434. Accordingly, due in part, individually and collectively, to the orientation of the controls support structure 650, the configuration of the lift actuator pockets 435, and the lift arms 434, the electrical wires may be efficiently routed and substantially protected over the entire routing path from the controls subassembly to the tilt actuators and the implement.

Referring again to FIGS. 25A and 25B, the controls subassembly 420 can be preassembled so that it may be easily installed in the power machine 400. More specifically, the control modules 660, which can include each of the motor controllers 662, 666, 670, 672, 674, 676 and, as appropriate, the cooling system 698 shown in FIG. 25A, can be secured to the base plate 654 before the controls subassembly 420 is installed in the power machine 400. In some embodiments, the rear plate 658, or additional housing structures, may also be mounted to the base plate 654 before installation of the controls subassembly. Further, the controls subassembly 520 may include one or more lift points (e.g., a plurality of lift points 722, as shown) that are formed into the controls support structure 650 to allow lifting of the subassembly 420 as a single unit for insertion into or removal from the power machine.

When the subassembly 420 is being inserted into the power machine, use of a lifting mechanism such as a jib crane with chains attached to the lift points 722 can facilitate alignment with and securement to the power machine 400. For example, in some embodiments, the lift points 722 may be attachment points for chains to be attached to for lifting the subassembly, distributed to provide a stable and favorable lifting orientation for the controls subassembly 420 as a whole.

The lift points 722, as illustrated in FIG. 25B, are provided as one advantageous example. In this regard, while the illustrated embodiment includes three lift points 722 with particular relative locations, other configurations are possible. For example, some lift points can be formed as structures that are added to frame of a controls support structure (e.g., added as components that project from a base or back plate thereof). In some cases, lift points can be located to be at a single, shared elevation relative to a base plate of a controls support structure (e.g., at a single, shared height above the base plate 654 of FIG. 25B).

Continuing, with reference again to FIG. 25A, the controls subassembly 420 can be lifted into the power machine 400 so that it is supported by the frame plate 622. Thus, again, the orientation of the frame plate 622 relative to the battery assembly 418 and the power machine 400 as a whole, and the unitary configuration of the controls subassembly 420, can facilitate easy installation and maintenance of the controls subassembly 420, as well as easy access to the battery assembly 418 as needed.

Figure 26:
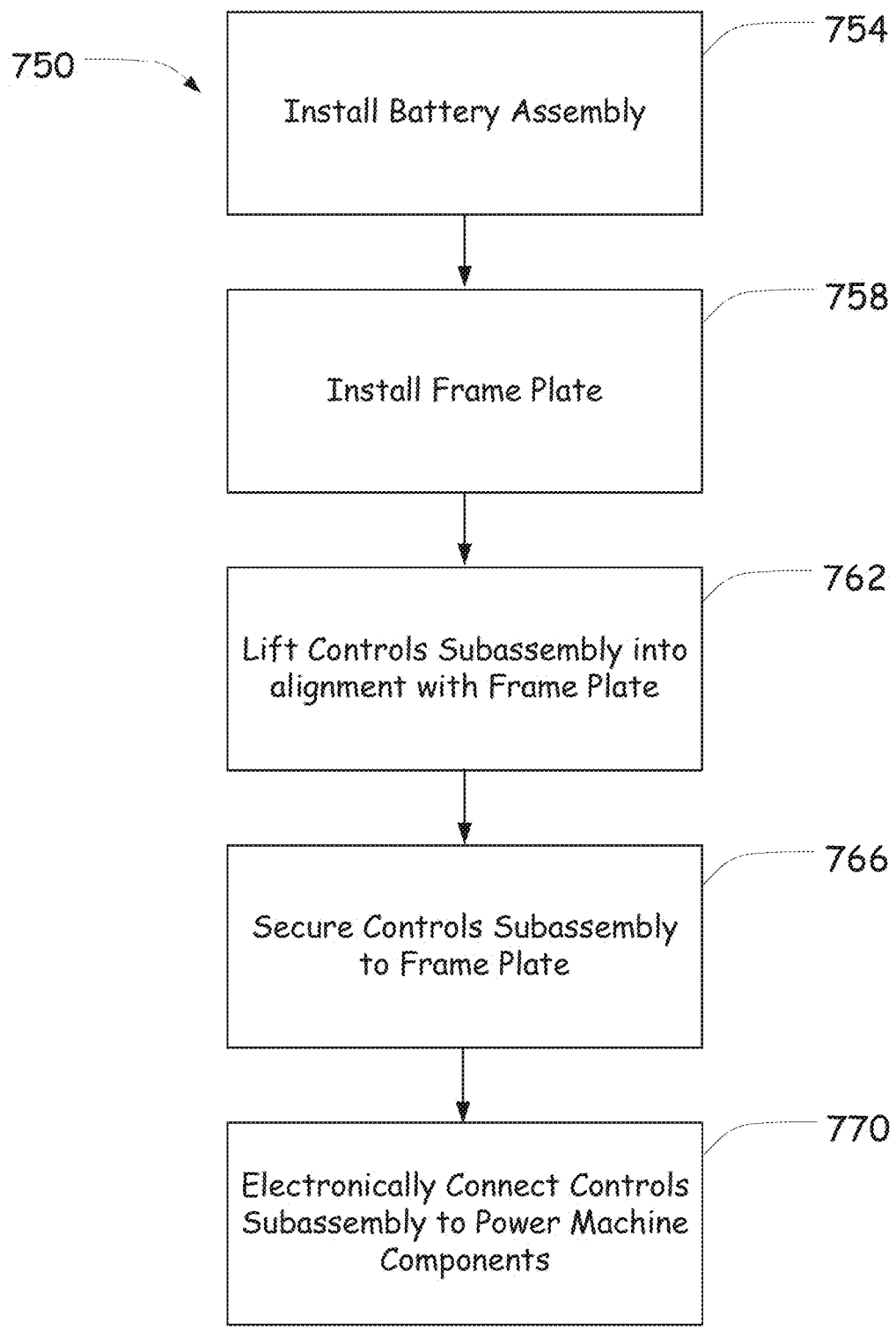
FIG. 26 is a method for installing a battery assembly and a controls subassembly into a power machine according to an embodiment of the invention.
Figure 27:
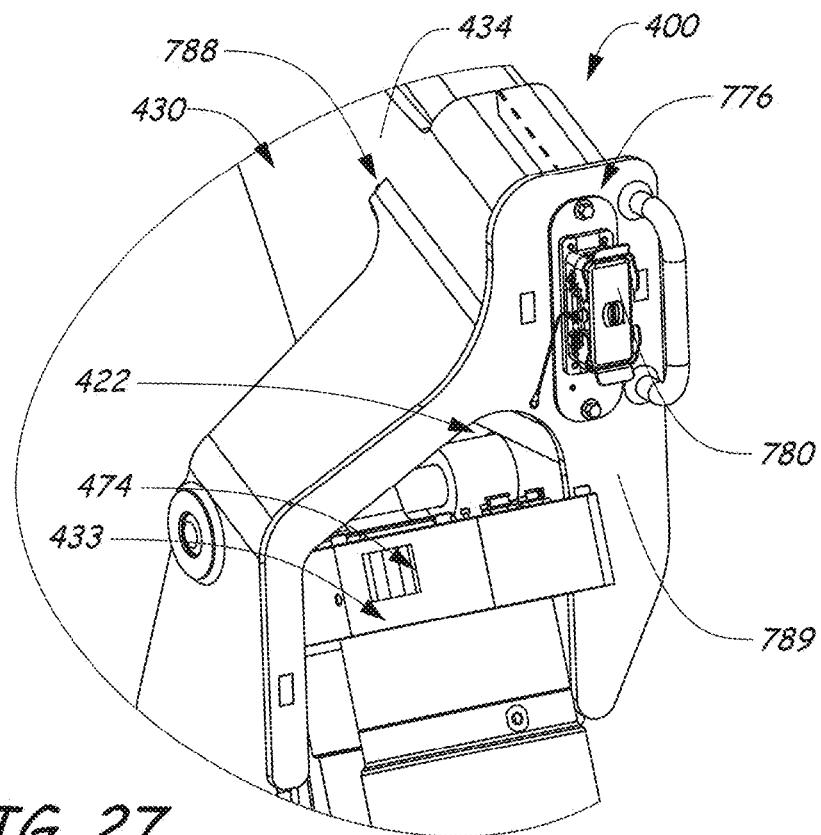
FIG. 27 is a perspective partial view showing generally a front of the power machine of FIG. 13A, including a connector and a lift arm structure.

In this regard, for example, FIG. 26 illustrates a method 750 for installing a battery assembly and a controls subassembly into a power machine, according to an embodiment of the present inventions. In some implementations, the method 750 can be implemented relative to the power machine 400, the battery assembly 418, and the controls subassembly 420. In other implementations, the method 750 can be implemented in other contexts, relative to other components.

In particular, at operation 754, the battery assembly can be installed. More specifically, in some embodiments, the battery assembly may be lifted, e.g., via lift points, into a frame of the power machine and rigidly secured to the frame, e.g., using mounting structures, isolators, and fasteners. In some cases, as also discussed above, the battery assembly can be installed with a particularly favorable (e.g., rearward, low) orientation, using particular isolation (or other mounts). At operation 758, a frame plate can be installed in the power machine by rigidly securing the frame plate to the frame of the power machine. Generally, the frame plate can be secured to the frame above the battery assembly, but other configurations are possible. Further, the frame plate may generally be installed after the associated battery assembly, to facilitate easier installation of the battery assembly, although other approaches are also possible.

At operation 762, the controls subassembly can be lifted into the power machine. For example, the controls subassembly can be lifted into the machine, via lift points, so that it is substantially aligned with the frame plate before being lowered onto the frame plate. In some embodiments, a controls subassembly can be assembled into a unitary component before being lifted into alignment with a frame plate. For example, a plurality of control modules (e.g., for electronic power and control or for cooling) can be secured to a unitary support structure outside of a power machine, so that the modules can be collectively lifted via the support structure for installation, with subsequent operations required only to secure the support structure and connect relevant wires or other conduits.

At operation 766, the controls subassembly can be secured to the frame plate, e.g., using fasteners and isolators. As noted above, in some cases, use of a separate frame plate to support a controls subassembly relative to a main frame of a power machine can provide certain benefits relative to conventional approaches, including by facilitating easy installation of a pre-assembled unitary controls subassembly. Finally, at operation 770, the controls subassembly can be electrically connected to components of the power machine. For example, electrical wires may be routed from the controls subassembly to components dispersed throughout the power machine. Additionally, in some embodiments, the controls subassembly may include a cooling system. Thus, coolant hoses may be routed throughout the power machine for cooling the components. In some embodiments, a controls subassembly can be electrically (or otherwise) connected for control of components of a power machine after the controls subassembly is secured to the power machine.

In some embodiments, as noted above, electrical power or control signals can be routed through the interior volume of a lift arm. This may be useful, for example, in order to protect wires for control of implements, lift actuators, or other components from pinching, wear, or undesired contacts. In this regard, referring now to FIG. 27, the lift arm structure 430 according to the illustrated embodiment further includes a connector opening 776 that may be outfitted with a connector 780 for transmitting power and control signals to an electronically powered or controlled implement or other electrical components arranged at the front of the power machine 400. For example, returning to FIG. 16B, electrical wires, represented by arrows 784, may be routed from an electrical source, e.g., the controls subassembly 420 to the connector 780. Particularly, the connector 780 can be used to provide power and control signals from the controls subassembly 420 to high-powered electronic components and attachments, such as, e.g., electronic actuators or motors of an implement that are configured to execute work operations. As previously discussed with respect to FIG. 19, the controls subassembly 420 and battery assembly 418 are disposed proximate the rear end 410A of the frame 410. Accordingly, referring to FIG. 16B, the electrical wires, e.g., as shown by the arrows 784, can be routed through the lift arm structure 430 toward the front end 410B of the frame 410 to the connector opening 776. In this regard, because the connector opening 776 is disposed at a second end 788 of the lift arm structure 430, particularly on a front face 789 of the lift arm structure 430, the connector 780 can be disposed proximate the tilt actuators 433, the implement carrier 472 and an implement 792 connected thereto, which can simplify and shorten (and generally protect) the electrical connection between the implement 792 and the controls subassembly 420. Further, by providing the connector opening 776 on the front face 789 of the lift arm structure 430, the connector 780 is generally accessible from the front frame end 410B (see, e.g., FIG. 22) of the power machine 400. While the lift arm structure 430 is illustrated with the connector 780 having a particular configuration in FIG. 27, power machines according to embodiments of the present disclosure may use any type of connector commonly known and used in the art. Accordingly, a connector opening may be sized and shaped differently in alternative embodiments to accommodate different connectors.

Figure 28:
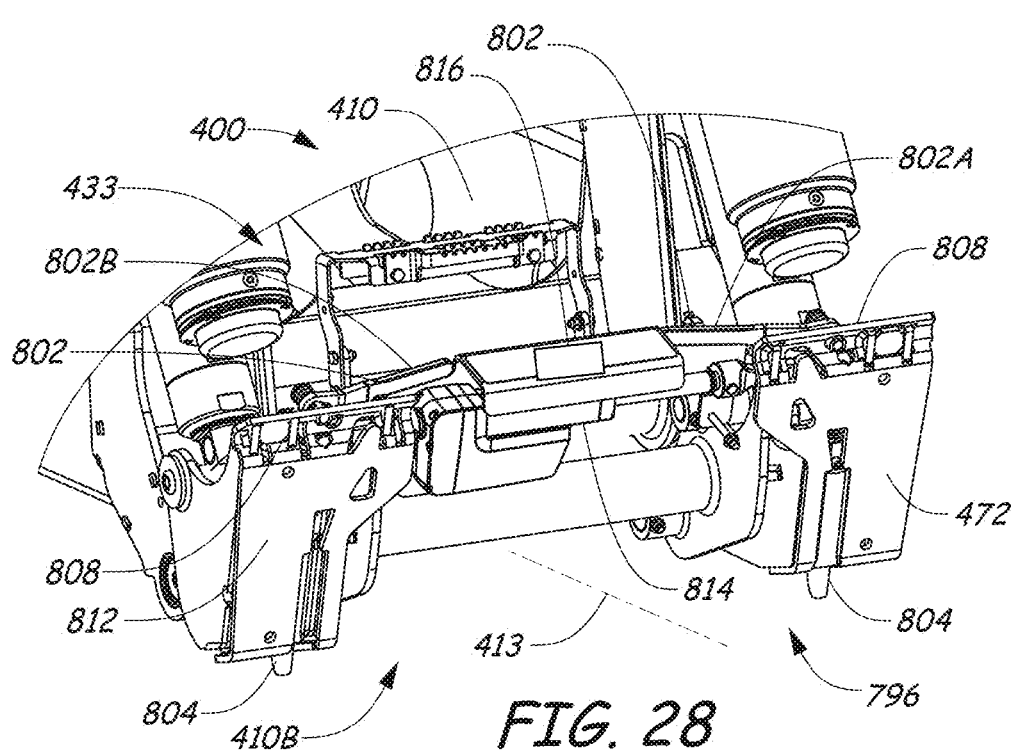
FIG. 28 is a perspective partial view showing generally a front of the power machine of FIG. 13A, including an implement carrier.

In some embodiments, electronic (or other) actuators and controls can also be used to improve performance of a power machine relative to the attachment or implements to a lift arm. Turning to FIG. 28, for example, an implement interface 796, which includes the implement carrier 472, is configured similarly to the implement interface 370 of FIG. 12, but differs in some aspects. For example, the implement carrier 472 includes a pair of engagement levers 802 for securing an implement to the implement carrier 472. The levers 802 are configured to be rotated between a locked configuration (shown in FIG. 20) and an unlocked configured (not shown) to operatively extend and retract corresponding pins 804. In the locked configuration, the levers 802 extend generally inwardly, i.e., toward the central axis 413, and the corresponding pins 804 are in an extended position. To move the pins to a retracted position, the levers are configured to be pivoted outwardly, e.g., lever 802A is configured to be rotated clockwise, and lever 802B is configured to be rotated counterclockwise as shown in FIG. 28, until the pins 804 are substantially retracted. When the pins 804 are retracted, an implement, e.g., a bucket or pallet, may be secured to the implement carrier 472 by engaging the implement a support edge 808 and a support face 812 of the implement carrier 472. Once the implement is supported by the support edge 808 and engaging the support face 812, the engagement levers 800 can be pivoted toward the locked configuration, i.e., inwardly, thereby extending the pins 804 to engage corresponding openings on the implement, thereby locking the implement to the implement carrier.

While the embodiment illustrated includes two levers used to selectively control two pins, alternative embodiments may include more or fewer pins and levers. Additionally, other attachment arrangements are possible, including those that use engagement members other than levers and pins (e.g., cams, gears, slides, etc.) and those that that use direct movement of engagement members to secure an implement (e.g., levers that pivot into or out of direct engagement with an implement).

In some embodiments, an actuator can be configured to move engagement members for an implement. For example, as shown in FIG. 28, an electrical linear actuator 814 is configured to move the levers 802 to engage or disengage the pins 804 relative to an implement, including as based on operator commands or other signals relayed by the controls subassembly 420 (see FIG. 25A). Although the actuator 814 is configured to move the pins 804 via the levers 802, other configurations may include actuators configured to directly move similar pins, to otherwise engage or disengage relevant engagement members (e.g., of the types listed above), or to include engagement members (e.g., as attachments to extendable portions of the actuators) that can directly engage with or disengage from an implement.

In some embodiments, one or more sensors can configured to detect an indicator of force applied by an actuator to an engagement member in order to provide information regarding engagement of an implement. For example, current sensors 816 (or other sensors) can be configured to monitor current (or other indicators) of a force (e.g., torque) that is applied by the actuator 814 electrical attachment actuator to move the levers 802 between the locked and unlocked configurations. Analysis of these indicators (or of the force they indicate), including by comparison to a baseline value or desired range, or by detecting changes over time can then be used to evaluate an operational state of the relevant engagement member(s) or implement(s). For example, an unexpected spike in required actuation force may indicate a misalignment of an engagement member of implement, or other similar malfunction (e.g., a stuck pin or lever), whereas an increase over time in required actuation force may indicate a need to inject grease into certain areas of the relevant mechanism, to reduce overall friction. In some cases, upon detection of a particular operational state, an appropriate remedial measure can be undertaken. For example, the actuator 814 may be automatically disengaged, as appropriate, or an alert can be provided to an operator (e.g., via the controls subassembly 420) to prompt appropriate manual intervention.

Although the sensor 816 are illustrated in FIG. 28 as distinct components, other configurations are possible. For example, some current (or other) sensors may be formed as integral software or hardware modules within a controller or other component that are configured to determine current (or other relevant parameters) for a particular actuator or other component. For example, relative to the example shown in FIG. 28, the linear actuator 814 (or, e.g., the EVCM 678 shown in FIG. 25A) may sometimes sensors formed as integrally included hardware or software modules that can detect the current flowing through the linear actuator 814 during a particular operation.

Figure 29:
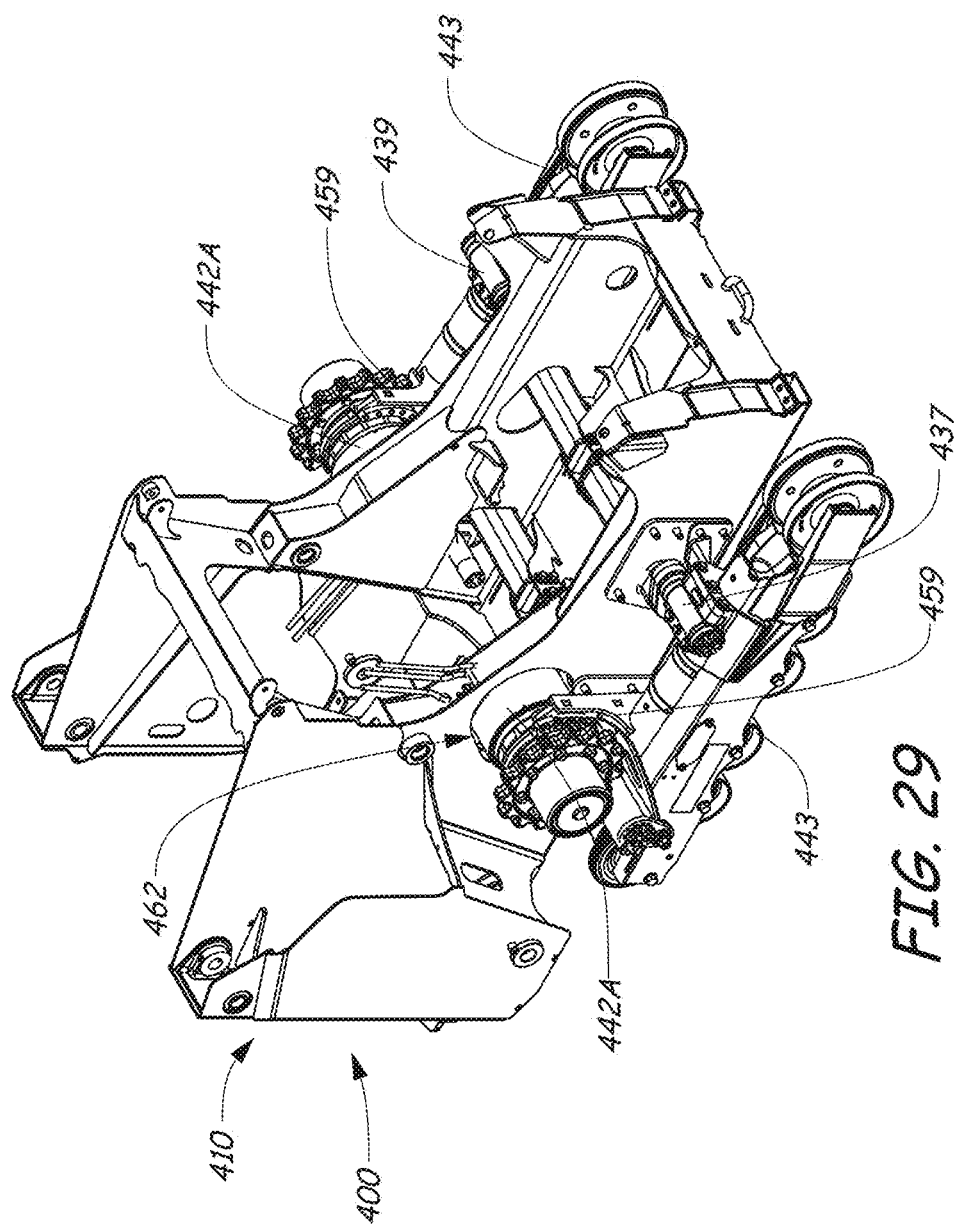
FIG. 29 is a perspective view of select components of the power machine of FIG. 13A, including a track assembly and a frame of the power machine.
Figure 30:
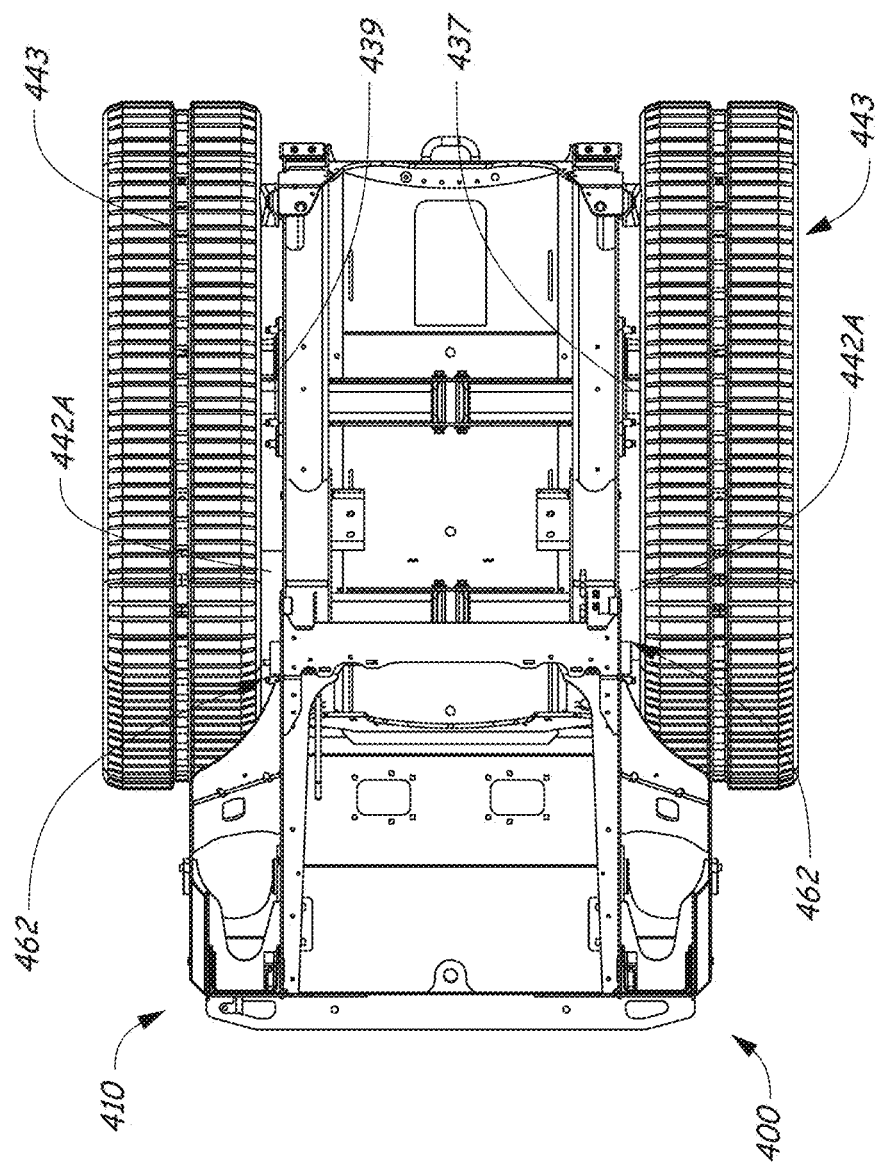
FIG. 30 is a top elevation view of the power machine of FIG. 13A.

In some embodiments, as also discussed above, drive motors or other traction actuators can beneficially be disposed on a track frame and/or extend in a laterally overlapping relationship with a main frame of a power machine. For example, as illustrated in FIGS. 29 and 30, each of the drive motors 442A is mounted to a respective track frame 443 by a support component 459 that extends vertically upward from the track frame 443. To allow appropriate spacing of the track frames 443 and related components from the frame 410, casings of the drive motors 442A extend laterally inwardly from the support components 459 to laterally overlap with the main frame 410.

In particular, the drive motors 442A are illustrated as extending through openings 462 in the main frame 410 (e.g., teardrop shaped openings, as discussed relative to FIG. 8A). The openings 462 can provide sufficient clearance so that the drive motors 442A can appropriately laterally overlap with the main frame 410 and also allow the track frames 443 (and the drive motors 442A, which are rigidly mounted to the track frame) to appropriately move relative to the main frame 410 (e.g., via movement at torsion bars 437, 439) without interference between the motors 442A and the main frame 410. Relatedly, the frame 410 of the power machine 400 can remain relatively steady as the power machine 400 travels or maneuvers over an uneven surface, which can provide enhanced comfort and operability for an operator. Additionally, the laterally inward extension of the drive motors 442A though the openings 462 can help to shield the drive motors 442A from impacts and debris during operation of the power machine 400.

As also noted above, although movable track frames can provide certain benefits, some embodiments can include track frames that are not movable relative to a main frame of a power machine. In such embodiments, electrical drive motors can be mounted to the track frames similarly to the drive motors 442A (e.g., to laterally overlap with the main frame) or otherwise can be mounted directly to a main frame of a power machine rather than to a track frame.

Thus, embodiments of the disclosed power machine and components thereof can provide improvements over conventional designs. For example, structural arrangements discussed herein can allow for relatively easy conversion from hydraulic to electrical power for particular power machine platforms. And the quick response and precise control provided by electrical actuators can allow work elements, including traction elements, lift arms, and implement carriers, to be adjusted quickly and accurately, including with complex and adaptable control strategies as implemented by electronic control modules. Further, electrical actuation and control can, in some instances, simplify automated implementation of repetitive or iterative movements of work elements, while also reducing the need for maintenance and eliminating problems associated with leakage of hydraulic fluid and other related issues. Power machines according to embodiments of the invention also provide improved installation capabilities. For example, structural arrangements discussed herein can allow for relatively easy installation of battery assemblies and controls subassemblies for electrically controlling and powering components of a power machine. Locations and arrangements of battery assemblies and controls subassemblies according to embodiments of the invention may be improved when compared to conventional designs. For example, providing a battery assembly proximate a base end and rear end of the power machine can assist with a power machine's weight balance, skid turnability, and lateral (or other) slope stability. Further, providing a controls subassembly proximate a top end of a power machine can improve accessibility of the assembly and protect the assembly.

Although the present invention has been described with reference to preferred embodiments, workers skilled in the art will recognize that changes may be made in form and detail to the disclosed embodiments without departing from the spirit and scope of the concepts discussed herein.

What is claimed is:

1. A loader comprising:
   a main frame, the main frame including a first rear pocket at a first lateral side of the main frame and a second rear pocket at an opposed second lateral side of the main frame;
   an operator station supported by a front portion of the main frame forward of the first and second rear pockets;
   a battery assembly supported by a rear portion of the main frame, at least partly behind and below the operator station;
   tractive assemblies supported by the main frame with the tractive assemblies aligned forward of the first and second rear pockets along a front-to-back direction of the loader, the tractive assemblies being configured to be powered by the battery assembly;
   a lift arm structure supported by the main frame, the lift arm structure including:
      a first lift arm extending along the first lateral side of the main frame and a second lift arm extending along the second lateral side of the main frame, with proximal ends of the first and second lift arms pivotably secured to the main frame at the rear portion of the main frame; and
      one or more tilt actuators supported by the first and second lift arms and operable to tilt an implement at distal ends of the first and second lift arms;
   a first electrical lift actuator secured to the main frame at a first pinned connection within the first rear pocket behind the tractive assemblies, and extending out of the first rear pocket to the first pinned connection with the first lift arm; and
   a second electrical lift actuator secured to the main frame with a second pinned connection within the second rear pocket behind the tractive assemblies, and extending out of the second rear pocket to the second pinned connection with the second lift arm, each of the first and second electrical lift actuators including an electrical motor powered by the battery assembly and a screw extender powered by the electrical motor, each of the first and second electrical lift actuators being pinned at a proximal end within the corresponding first or second rear pocket, and wherein, for each of the first and second electrical lift actuators:

the screw extender is pinned at a distal end of the screw extender to the corresponding first or second lift arm and controllably extends and retracts, under power from the battery assembly, along a first axis between the distal end and the proximal end of the corresponding first or second lift actuator; and the electrical motor extends from the proximal end of the corresponding first or second lift actuator along a second axis that is offset from and parallel to the first axis.

2. The loader of claim 1, wherein the tractive assemblies include:

a first track frame that is movably secured the first lateral side of the main frame and a second track frame that is movably secured to the second lateral side of the main frame; and first and second electrical drive motors are mounted to the first and second track frames, respectively, to power movement of the loader over terrain; and wherein at least part of each of the first and second electrical drive motors extends laterally inboard from the corresponding first or second track frame toward the main frame, to overlap in a lateral direction with the first or second rear pocket, respectively, and to extend through the first or second lateral side, respectively, of the main frame.

3. The loader of claim 1, wherein a center of gravity of the battery assembly is disposed rearward of the operation station and one or more of:

rearward of drive motors supported by the main frame to power operation of the tractive assemblies; or forward from a rear end of the main frame by less than 50% of a total front-to-back length of the main frame.

4. The loader of claim 1, wherein, for each of the first and second electrical lift actuators, with the lift arm structure in a fully lowered orientation, an axial direction of the electrical motor angles forwardly from the proximal end of the corresponding first or second electrical lift actuator.

5. The loader of claim 1, wherein, at all operational orientations of the lift arm structure, for each of the first and second electrical lift actuators, the electrical motor is located behind one or more of:

the first or second pinned connection, respectively, of the corresponding first or second electrical lift actuator within the first or second rear pockets; or the first or second pinned connection between the first or second electrical lift actuator, respectively, and the corresponding first or second lift arm.

6. The loader of claim 1, wherein, for each of the first and second lift arms, respectively, with the lift arm structure in a fully lowered configuration, the proximal end of first or second lift arm is aligned above the corresponding first or second rear pocket.

7. The loader of claim 6, wherein first portions of the first and second lift arms are pivotally secured to the main frame in vertical alignment with the first and second rear pockets, respectively; and wherein, with the lift arm structure in the fully lowered orientation, proximal ends of second portions of the first and second lift arms are pivotally supported by the first portions of the first and second lift arms, respectively, rearwardly of the first and second pinned connections of the first and second electrical lift actuators.

8. The loader of claim 7, wherein the first and second lift arms are further supported by first and second control links that are pivotally secured to the main frame forward of the first and second pinned connections, respectively, of the first and second electrical lift actuators.

9. The loader of claim 1, wherein the first and second lift arms are supported relative to the main frame by first and second control links that extend inboard, respectively, of the first and second electrical lift actuators.

10. The loader of claim 9, wherein, with the lift arm structure in a fully lowered orientation, the first and second control links extend transversely across the screw extenders of the first and second electrical lift actuators, respectively, to pinned connections with the first and second lift arms that are vertically aligned, respectively, with the first and second rear pockets.

11. The loader of claim 1, wherein the main frame further includes a cross bar that extends laterally across the main frame to connect inboard walls of the first and second rear pockets; and wherein the cross bar is above the battery assembly and behind the operator station.

12. The loader of claim 1, wherein a top wall of the battery assembly is positioned at between about 40% of a total height of the main frame and about 60% of the total height of the main frame.

13. The loader of claim 12, further comprising:

a support shelf that extends between the first and second rear pockets, above the top wall of the battery assembly and rearward of the operator station, and supports an electronic control system for the first and second electrical lift actuators.

14. A power machine comprising:

a main frame that includes a rear portion defining a power source bay and a tower structure along a lateral side of the power source bay, the tower structure including an inboard wall and an outboard wall that define a rear frame pocket;

a power source supported by the main frame within the power source bay;

means for transmitting power from the power source to an interior of the rear frame pocket;

a lift actuator assembly that includes:

means for converting the transmitted power to rotational power, located within the rear frame pocket and aligned to rotate along a rotational axis; and means for converting the rotational power to extension and retraction along an extending axis, operably connected within the rear frame pocket to the means for converting the transmitted power, the rotational axis being located alongside and rearward of the extension axis; and a lift arm structure including a lift arm secured to the means for converting the rotational power such that the means for converting the rotational power extends toward the lift arm and retracts away from the lift arm, to be raised and lowered relative to the main frame using the transmitted power from the power source.

15. The power machine of claim 14, wherein, within the rear frame pocket, the means for converting the transmitted power is rearward of the means for converting the rotational power.

16. The power machine of claim 15, wherein the means for converting the transmitted power and the means for converting the rotational power are secured at a common pinned connection within the rear frame pocket, with the means for converting the transmitted power fully enclosed by the rear frame pocket; and wherein the means for converting the rotational power is partly enclosed by the rear frame pocket, and extends upwardly out of the rear frame pocket to engage the lift arm at all operational positions of the lift arm.

\* \* \* \* \*